US012559675B2

(12) United States Patent
Takezawa et al.

(10) Patent No.: US 12,559,675 B2
(45) Date of Patent: Feb. 24, 2026

(54) RESIN COMPOSITION AND MOLDED OBJECT

(71) Applicant: DIC Corporation, Tokyo (JP)

(72) Inventors: Yutaka Takezawa, Ichihara (JP); Naoto Sakurai, Sakura (JP); Kyouichi Toyomura, Tokyo (JP)

(73) Assignee: DIC Corporation, Tokyo (JP)

( * ) Notice: Subject to any disclaimer, the term of this patent is extended or adjusted under 35 U.S.C. 154(b) by 532 days.

(21) Appl. No.: 18/025,922

(22) PCT Filed: Sep. 9, 2021

(86) PCT No.: PCT/JP2021/033078
§ 371 (c)(1),
(2) Date: Mar. 13, 2023

(87) PCT Pub. No.: WO2022/059582
PCT Pub. Date: Mar. 24, 2022

(65) Prior Publication Data
US 2024/0034927 A1 Feb. 1, 2024

(30) Foreign Application Priority Data
Sep. 17, 2020 (JP) ................................ 2020-156297

(51) Int. Cl.
*C09K 11/06* (2006.01)
*C08K 5/55* (2006.01)
(Continued)

(52) U.S. Cl.
CPC ................ *C09K 11/06* (2013.01); *C08K 5/55* (2013.01); *C08L 23/06* (2013.01); *C08L 63/00* (2013.01);
(Continued)

(58) Field of Classification Search
CPC .......... C09K 11/06; C09K 11/02; C08K 5/55; C08L 23/06; C08L 77/00; C08L 75/04
(Continued)

(56) References Cited

U.S. PATENT DOCUMENTS 5,553,714 A 9/1996 Cushman et al.
2009/0176313 A1 7/2009 Suzuki et al.
(Continued)

FOREIGN PATENT DOCUMENTS

JP 2003-176289 A 6/2003
JP 2010-090313 A 4/2010
(Continued)

OTHER PUBLICATIONS

Database WPI Week 201240 Thomson, Scientific, London, GB (2012). (cited in the Sep. 4, 2024 Search Report issued for EP21869269.7).
(Continued)

*Primary Examiner* — Anita Nassiri-Motlagh
(74) *Attorney, Agent, or Firm* — Troutman Pepper Locke LLP

(57) ABSTRACT

The present invention provides a resin composition which emits near-infrared fluorescence, has high light-emitting efficiency, and can be relatively easily produced, and a molded object obtained from the resin composition. More specifically, the present invention provides a resin composition containing a near-infrared fluorescent material (A), a thermoplastic resin (B) other than a polyamide resin, and a resin (C) different from the thermoplastic resin (B), in which the resin (C) forms a continuous phase, and a dispersed phase containing the near-infrared fluorescent material (A) and the thermoplastic resin (B) is formed in the continuous phase.

20 Claims, 1 Drawing Sheet

(51) Int. Cl.

| | |
|---|---|
| ***C08L 23/06*** | (2006.01) |
| ***C08L 63/00*** | (2006.01) |
| ***C08L 75/04*** | (2006.01) |
| ***C08L 77/00*** | (2006.01) |
| ***C09K 11/02*** | (2006.01) |

(52) U.S. Cl.

CPC ............... *C08L 75/04* (2013.01); *C08L 77/00* (2013.01); *C09K 11/02* (2013.01); *C08L 2205/025* (2013.01); *C08L 2205/22* (2013.01); *C08L 2310/00* (2013.01); *C09K 2211/1007* (2013.01); *C09K 2211/1018* (2013.01)

(58) Field of Classification Search

USPC .................................................... 252/301.35

See application file for complete search history.

(56) References Cited

U.S. PATENT DOCUMENTS

| | | | |
|---|---|---|---|
| 2011/0012075 | A1 | 1/2011 | Nii et al. |
| 2011/0195235 | A1 | 8/2011 | Kato et al. |
| 2013/0249137 | A1 | 9/2013 | Takiff et al. |
| 2013/0252000 | A1 | 9/2013 | Takiff et al. |
| 2013/0253312 | A1 | 9/2013 | Sato et al. |
| 2016/0271273 | A1 | 9/2016 | Sakurai et al. |
| 2021/0030895 | A1 | 2/2021 | Sakurai et al. |

FOREIGN PATENT DOCUMENTS

| | | | |
|---|---|---|---|
| JP | 2011-241160 | A | 12/2011 |
| JP | 2012 097183 | A | 5/2012 |
| JP | 2012-115535 | A | 6/2012 |
| JP | 2013-060399 | A | 4/2013 |
| JP | 5177427 | B2 | 4/2013 |
| JP | 5380019 | B2 | 1/2014 |
| WO | 2015/056779 | A1 | 4/2015 |

OTHER PUBLICATIONS

Supplementary European Search Report dated Sep. 4, 2024, issued for EP21869269.7.

Decision of Rejection mailed Sep. 2, 2025, issued for CN202180063861.2 and English translation thereof.

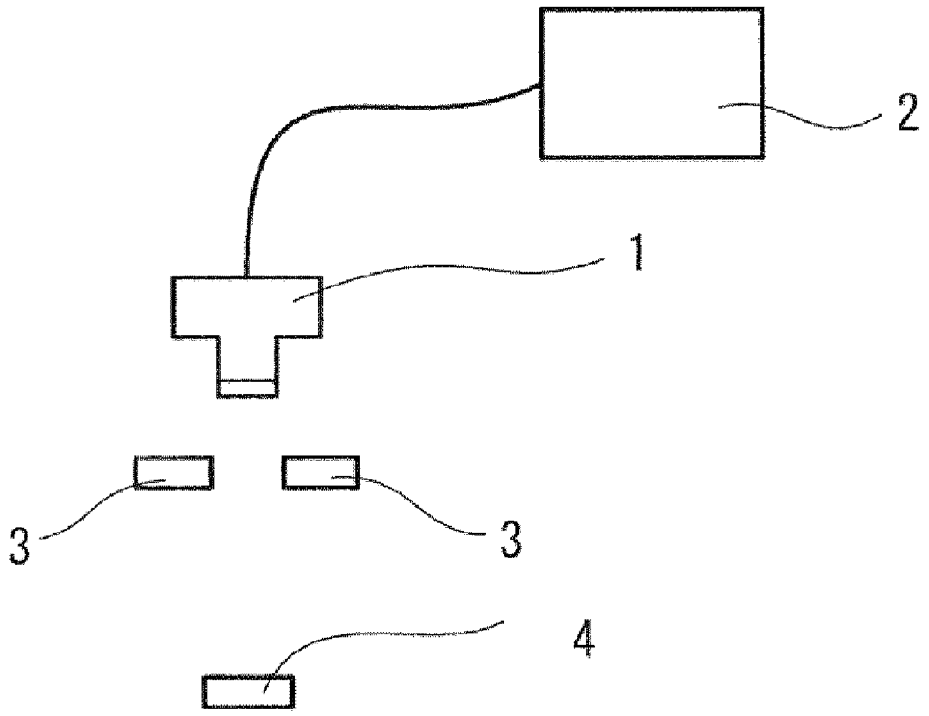
2
1
3
3
4

RESIN COMPOSITION AND MOLDED OBJECT

TECHNICAL FIELD

The present invention relates to a resin composition and a molded object obtained from the resin composition.

BACKGROUND ART

Near-infrared fluorescent pigments are used in industrial products mainly for identification and forgery prevention of various products, and in recent years, they are also used in medical applications such as probes for biological imaging and testing agents. As characteristics of the near-infrared wavelength region, it is known that the near-infrared wavelength region cannot be visually observed with the naked eye of a human being, has little influence on a living body, and has high permeability to a living body such as skin. Such a feature can be utilized by incorporating a near-infrared fluorescent pigment into the medical tool itself. For example, a system has been disclosed in which a near-infrared fluorescent pigment is incorporated into a medical tool such as a shunt tube, and the position of the medical tool implanted in a living body is confirmed by irradiation with near-infrared light from outside the living body (see, for example, PTL 1).

In order to visualize a medical implant embedded under the skin or the like, excitation with near-infrared light having high skin permeability is required, and fluorescence emitted from the medical implant also needs to be in the near-infrared region having high skin permeability. That is, usually, in order to secure visibility, the near-infrared fluorescent pigment itself incorporated into the medical implant needs to strongly absorb light in the near-infrared region, and in addition, needs to emit strong fluorescence. Therefore, the near-infrared fluorescent pigment contained in the resin composition used as a raw material of the medical implant preferably has a maximum absorption wavelength in the near-infrared region in the resin.

Near-infrared fluorescent pigments include inorganic fluorescent pigments and organic fluorescent pigments. In general, inorganic near-infrared fluorescent pigments have an advantage in that the emission wavelength can be easily adjusted within a desired range by using various metals, but rare earths such as rare earth elements, which are rare and expensive, and nanoparticles having a uniform particle size are required. On the other hand, organic near-infrared fluorescent pigments have characteristics in that they can be relatively easily synthesized and the wavelength can be easily adjusted, but almost no organic near-infrared fluorescent pigments that can be stably mixed into a resin are known.

If a near-infrared fluorescent pigment can be mixed and dispersed in a resin, various molded objects that emit near-infrared fluorescence can be produced using the resin as a raw material. As a resin in which a near-infrared fluorescent pigment is dispersed, for example, PTL 2 discloses a near-infrared fluorescent resin obtained by copolymerizing a reactive group-containing near-infrared fluorescent pigment obtained by introducing a polyester reactive group into a phthalocyanine pigment, a naphthalocyanine pigment, or a squaraine pigment into polyethylene terephthalate (PET).

On the other hand, as an organic fluorescent pigment having a high emission quantum yield, a boron complex of a π-conjugated compound is known, and for example, BODIPY pigments having a boron dipyrromethene skeleton in which a disubstituted boron atom and dipyrromethene (or a derivative thereof) form a complex are known (for example, see NPL 1). As a BODIPY pigment emitting near-infrared fluorescence, PTL 3 discloses a BODIPY pigment having a heterocyclic ring in the BODIPY skeleton. Further, NPL 2 discloses a near-infrared fluorescent pigment of a diketopyrrolopyrrole (DPP)-based boron complex having two boron complex units in the molecule, which is obtained by boron-complexing a DPP derivative. These BODIPY pigments and DPP-based boron complexes are mainly used as biomarkers for labeling biomolecules such as nucleic acids and proteins, tumor tissues, and the like, and there are almost no reports on resins containing BODIPY pigments and DPP-based boron complexes. As a resin composition containing a BODIPY pigment, PTL 4 discloses that a resin emitting fluorescence in a visible light region is obtained by copolymerizing a siloxane-containing BODIPY pigment in which an organosiloxanyl group is introduced via an alkylene group into a silicone resin. Further, PTL 5 discloses a composition emitting fluorescence in a visible light region, which is mixed with a polymer together with a solvent in order to increase compatibility of a BODIPY pigment emitting visible light. In addition, PTL 6 discloses an optical filter which contains a BODIPY pigment having at least one electron-withdrawing group and a resin and has high absorptivity of light in the visible light region, and PTL 7 discloses a color conversion material which contains a BODIPY pigment and a resin and converts short-wavelength light into long-wavelength light.

Furthermore, PTL 8 discloses a DPP-based boron complex as a compound having absorption in an infrared region and having no absorption in a visible light region, and PTL 9 discloses an infrared absorbing composition containing the compound and a hydrophobic polymer.

CITATION LIST

Patent Literature

PTL 1: JP2012-115535A
PTL 2: JP2003-176289A
PTL 3: JP5177427B
PTL 4: JP2013-060399A
PTL 5: US2013/0249137A
PTL 6: US2013/0252000A
PTL 7: JP2011-241160A
PTL 8: JP5380019B
PTL 9: JP2010-090313A

Non-Patent Literature

NPL 1: Tomimori et al., Tetrahedron, 2011, Vol. 67, pp. 3187-3193
NPL 2: Fischer et al., Angewandte Chemie International Edition, 2007, Vol. 46, pp. 3750-3753

SUMMARY OF INVENTION

Technical Problem

PTL 3 discloses BODIPY pigments emitting near-infrared fluorescence, but does not describe whether or not these pigments can be incorporated into a resin.

On the other hand, since phthalocyanine pigments and the like have a low emission quantum yield of the pigment skeleton itself, the reactive group-containing near-infrared fluorescent material described in PTL 2, which is composed of these pigments, has a problem that a sufficient emission intensity cannot be obtained.

In addition, the siloxane-containing BODIPY pigment described in PTL 4 has good compatibility with a silicone monomer solution before curing, and a silicone resin in which the pigment is uniformly dispersed is obtained by curing, but there is a problem in that the compatibility with other resins and resin solutions is low. In addition, the resin composition described in PTL 5 has a problem in safety because the solvent may remain in the resin. Moreover, PTL 4, PTL 5, PTL 6, and PTL 7 do not describe a BODIPY pigment that emits near-infrared fluorescence, and do not describe application to medical use. Similarly, PTL 8 and PTL 9 do not describe a DPP-based boron complex that emits near-infrared light, and do not report application to medical use.

Further, a fluorescent pigment directly covalently bonded to a polymer of a resin, such as the fluorescent pigments described in PTL 2 and PTL 4, is difficult to produce and has low versatility. In addition, the introduction of a reactive group into a pigment has a problem in that the synthetic route becomes complicated, the production cost increases, and the pigment is not very suitable for industrial mass production. In view of versatility, it is preferable that a resin that emits near-infrared fluorescence can be produced only by mixing and dispersing a near-infrared fluorescent pigment in a resin. In particular, in the case of dispersion in a thermoplastic resin or the like, a method of melt-kneading a resin and a pigment is considered, but even when melt-kneading is performed at a temperature lower than the decomposition point of the pigment, depending on the type of the resin or the pigment and kneading conditions, fluorescence may not be emitted due to poor dispersion, decomposition of the pigment, or the like. For example, it has been found that when the pigment is kneaded with a resin having an amino group such as a polyamide resin or a thermosetting resin, the pigment may be deactivated.

As described above, it is difficult to predict whether or not the pigment can be dispersed in the thermoplastic resin or the like from the thermal physical properties of the pigment or the like.

Therefore, an object of the present invention is to provide a resin composition that emits near-infrared fluorescence, has high light-emitting efficiency, and can be relatively easily produced, and a molded object obtained from the resin composition.

Solution to Problem

A resin composition and a molded object according to the present invention are the following [1] to [12].

[1] A resin composition, containing: a near-infrared fluorescent material (A); a thermoplastic resin (B) other than a polyamide resin; and a resin (C) different from the thermoplastic resin (B), in which the resin (C) forms a continuous phase, and a dispersed phase containing the near-infrared fluorescent material (A) and the thermoplastic resin (B) is formed in the continuous phase.

[2] The resin composition as set forth in [1], in which the near-infrared fluorescent material (A) is at least one compound selected from the group consisting of compounds represented by the following General Formulas ($II_1$), ($II_2$), ($II_3$), and ($II_4$) and the resin composition has a maximum fluorescence wavelength of 650 nm or longer.

[Chem. 1]

($II_1$)

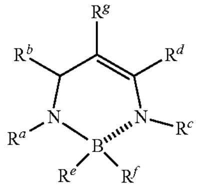

[In Formula ($II_1$), $R^a$ and $R^b$ form an aromatic 5-membered ring, an aromatic 6-membered ring, or a condensed aromatic ring formed by condensation of two or three 5-membered rings or 6-membered rings together with the nitrogen atom to which $R^a$ is bonded and the carbon atom to which $R^b$ is bonded; $R^c$ and $R^d$ form an aromatic 5-membered ring, an aromatic 6-membered ring, or a condensed aromatic ring formed by condensation of two or three 5-membered rings or 6-membered rings together with the nitrogen atom to which $R^c$ is bonded and the carbon atom to which $R^d$ is bonded; each of $R^e$ and $R^f$ independently represents a halogen atom or an oxygen atom; and $R^g$ represents a hydrogen atom or an electron-withdrawing group; provided that, in a case where $R^e$ and $R^f$ are oxygen atoms, $R^e$, the boron atom bonded to $R^e$, $R^a$, and the nitrogen atom to which $R^a$ is bonded may together form a ring, and $R^f$, the boron atom bonded to $R^f$, $R^c$, and the nitrogen atom to which $R^c$ is bonded may together form a ring; in a case where $R^e$ is an oxygen atom and does not form a ring, $R^e$ is an oxygen atom having a substituent, and in a case where $R^f$ is an oxygen atom and does not form a ring, $R^f$ is an oxygen atom having a substituent.]

[Chem. 2]

($II_2$)

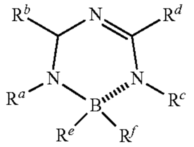

[In Formula ($II_2$), each of $R^a$ to $R^f$ is the same as that in Formula ($II_1$).]

[Chem. 3]

($II_3$)

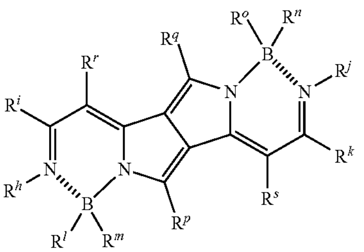

[In Formula ($II_3$), $R^h$ and $R^i$ form an aromatic 5-membered ring, an aromatic 6-membered ring, or a condensed aromatic ring formed by condensation of two or three 5-membered rings or 6-membered rings together with the nitrogen atom to which $R^h$ is bonded and the carbon atom to which $R^i$ is bonded; $R^j$ and $R^k$ form an aromatic 5-membered ring, an aromatic 6-membered ring, or a condensed aromatic ring formed by condensation of two or three 5-membered rings or 6-membered rings together with the nitrogen atom to which $R^j$ is bonded and the carbon atom to which $R^k$ is bonded; each of $R^l$, $R^m$, $R^n$, and $R^o$ independently represents a halogen atom, a $C_{1-20}$ alkyl group, a $C_{1-20}$ alkoxy group, an aryl group, or a heteroaryl group; each of $R^p$ and $R^q$ independently represents a hydrogen atom, a halogen atom, a $C_{1-20}$ alkyl group, a $C_{1-20}$ alkoxy group, an aryl group, or a heteroaryl group; and each of $R^r$ and $R^s$ independently represents a hydrogen atom or an electron-withdrawing group.]

[Chem. 4]

($II_4$)

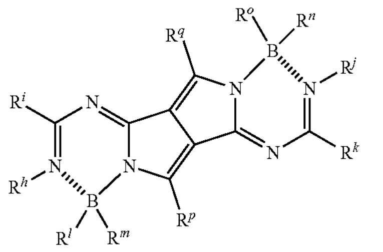

[In Formula ($II_4$), each of $R^h$ to $R^q$ is the same as that in Formula ($II_3$).]

[3] The resin composition as set forth in [2], in which the near-infrared fluorescent material (A) contains at least one compound selected from the group consisting of compounds represented by any one of the following General Formulas ($II_3$-1) to ($II_3$-6) and compounds represented by any one of the following General Formulas ($II_4$-1) to ($II_4$-6).

[Chem. 5]

($II_3$-1)

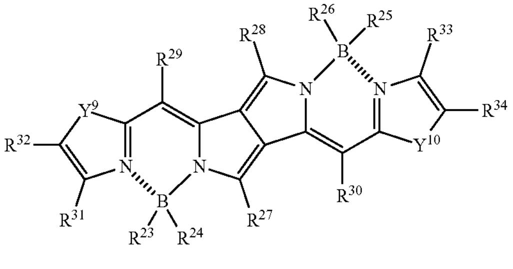

[In Formula ($II_3$-1), each of $R^{23}$, $R^{24}$, $R^{25}$, and $R^{26}$ independently represents a halogen atom, a $C_{1-20}$ alkyl group, a $C_{1-20}$ alkoxy group, an aryl group, or a heteroaryl group; each of $R^{27}$ and $R^{28}$ independently represents a hydrogen atom, a halogen atom, a $C_{1-20}$ alkyl group, a $C_{1-20}$ alkoxy group, an aryl group, or a heteroaryl group; each of $R^{29}$ and $R^{30}$ independently represents a hydrogen atom or an electron-withdrawing group; each of $Y^9$ and $Y^{10}$ independently represents a sulfur atom, an oxygen atom, a nitrogen atom, or a phosphorus atom; (p4) each of $R^{31}$ and $R^{32}$ independently represents a hydrogen atom, a halogen atom, a $C_{1-20}$ alkyl group, a $C_{1-20}$ alkoxy group, an aryl group, or a heteroaryl group, or (p5) $R^{31}$ and $R^{32}$ together form an aromatic 5-membered ring which may have a substituent or an aromatic 6-membered ring which may have a substituent; and (q4) each of $R^{33}$ and $R^{34}$ independently represents a hydrogen atom, a halogen atom, a $C_{1-20}$ alkyl group, a $C_{1-20}$ alkoxy group, an aryl group, or a heteroaryl group, or (q5) $R^{33}$ and $R^{34}$ together form an aromatic 5-membered ring which may have a substituent or an aromatic 6-membered ring which may have a substituent.]

[Chem. 6]

($II_3$-2)

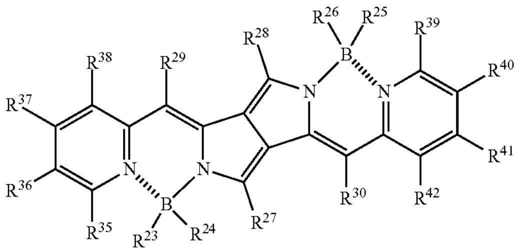

($II_3$-3)

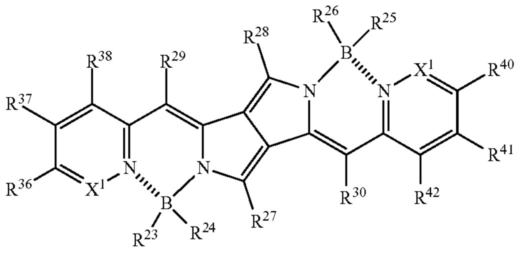

($II_3$-4)

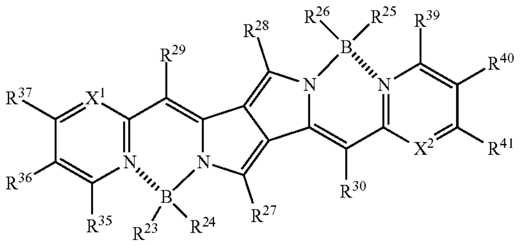

($II_3$-5)

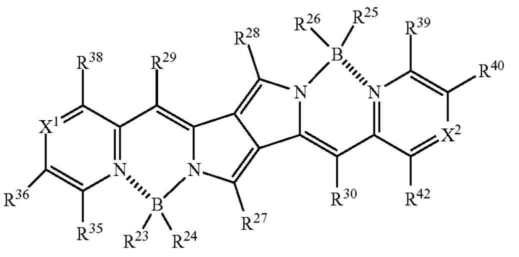

($II_3$-6)

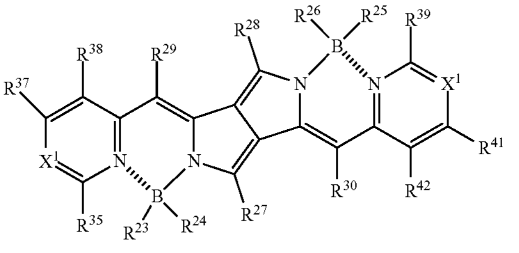

[In Formulas (II$_3$-2) to (II$_3$-6), each of $R^{23}$ to $R^{30}$ is the same as that in Formula (II$_3$-1); each of $X^1$ and $X^2$ independently represents a nitrogen atom or a phosphorus atom; (p6) each of $R^{35}$, $R^{36}$, $R^{37}$, and $R^{38}$ independently represents a hydrogen atom, a halogen atom, a $C_{1-20}$ alkyl group, a $C_{1-20}$ alkoxy group, an aryl group, or a heteroaryl group, or (p7) $R^{35}$ and $R^{36}$ together form an aromatic 5-membered ring which may have a substituent or an aromatic 6-membered ring which may have a substituent, and each of $R^{37}$ and $R^{38}$ independently represents a hydrogen atom, a halogen atom, a $C_{1-20}$ alkyl group, a $C_{1-20}$ alkoxy group, an aryl group, or a heteroaryl group, or (p8) $R^{36}$ and $R^{37}$ together form an aromatic 5-membered ring which may have a substituent or an aromatic 6-membered ring which may have a substituent, and each of $R^{35}$ and $R^{38}$ independently represents a hydrogen atom, a halogen atom, a $C_{1-20}$ alkyl group, a $C_{1-20}$ alkoxy group, an aryl group, or a heteroaryl group, or (p9) $R^{37}$ and $R^{38}$ together form an aromatic 5-membered ring which may have a substituent or an aromatic 6-membered ring which may have a substituent, and each of $R^{35}$ and $R^{36}$ independently represents a hydrogen atom, a halogen atom, a $C_{1-20}$ alkyl group, a $C_{1-20}$ alkoxy group, an aryl group, or a heteroaryl group; and (q6) each of $R^{39}$, $R^{40}$, $R^{41}$, and $R^{42}$ independently represents a hydrogen atom, a halogen atom, a $C_{1-20}$ alkyl group, a $C_{1-20}$ alkoxy group, an aryl group, or a heteroaryl group, or (q7) $R^{39}$ and $R^{40}$ together form an aromatic 5-membered ring which may have a substituent or an aromatic 6-membered ring which may have a substituent, and each of $R^{41}$ and $R^{42}$ independently represents a hydrogen atom, a halogen atom, a $C_{1-20}$ alkyl group, a $C_{1-20}$ alkoxy group, an aryl group, or a heteroaryl group, or (q8) $R^{40}$ and $R^{41}$ together form an aromatic 5-membered ring which may have a substituent or an aromatic 6-membered ring which may have a substituent, and each of $R^{39}$ and $R^{42}$ independently represents a hydrogen atom, a halogen atom, a $C_{1-20}$ alkyl group, a $C_{1-20}$ alkoxy group, an aryl group, or a heteroaryl group, or (q9) $R^{41}$ and $R^{42}$ together form an aromatic 5-membered ring which may have a substituent or an aromatic 6-membered ring which may have a substituent, and each of $R^{39}$ and $R^{40}$ independently represents a hydrogen atom, a halogen atom, a $C_{1-20}$ alkyl group, a $C_{1-20}$ alkoxy group, an aryl group, or a heteroaryl group.]

[Chem. 7]

(II$_4$-1)

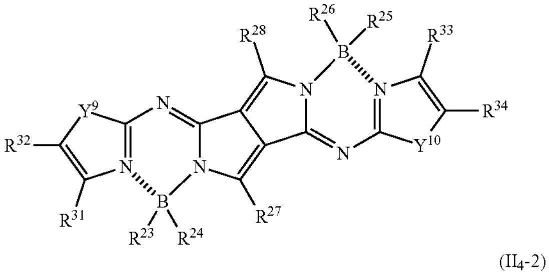

(II$_4$-2)

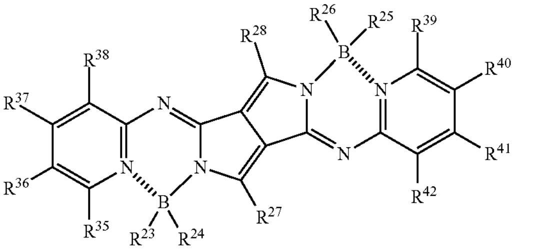

-continued (II$_4$-3)

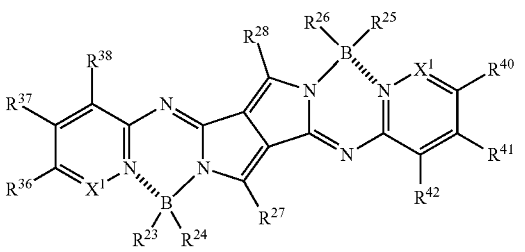

(II$_4$-4)

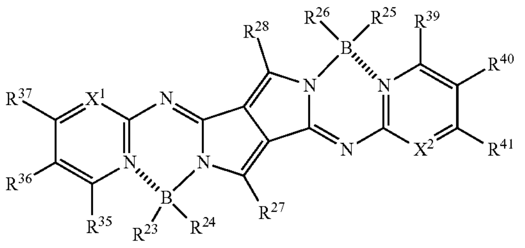

(II$_4$-5)

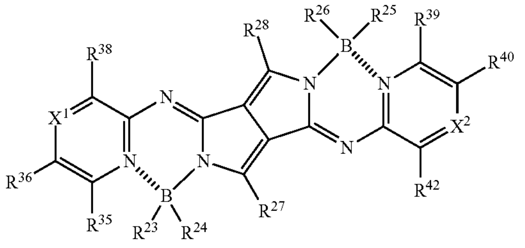

(II$_4$-6)

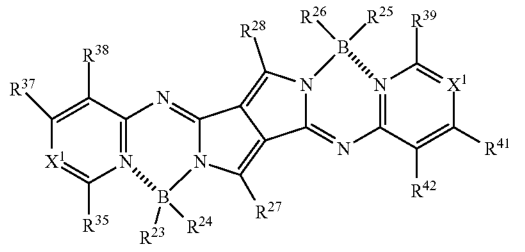

[In Formulas (II$_4$-1) to (II$_4$-6), each of $R^{23}$ to $R^{28}$ is the same as that in Formula (II$_3$-1), and in Formula (II$_4$-1, each of $R^{31}$ to $R^{34}$, $Y^9$, and $Y^{10}$ is the same as that in Formula (II$_3$-1), in Formulas (II$_4$-2) to (II$_4$-6), each of $R^{23}$ to $R^{42}$ is the same as that in Formula (II$_3$-2), and in Formulas (II$_4$-3) to (II$_4$-6), each of $X^1$ and $X^2$ is the same as that in Formula (II$_3$-3).]

[4] The resin composition as set forth in [3], in which the near-infrared fluorescent material (A) contains at least one compound selected from the group consisting of compounds represented by any one of the following General Formulas (II$_3$-7) to (II$_3$-9) and (II$_4$-7) to (II$_4$-9).

[Chem. 8]

(II$_3$-7)

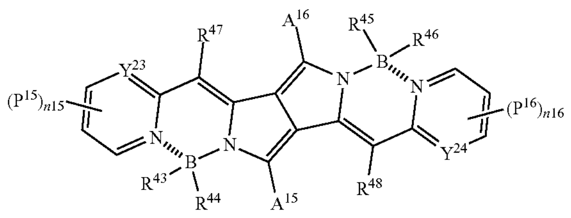

(II$_3$-8)

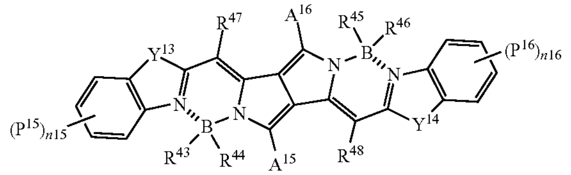

(II$_3$-9)

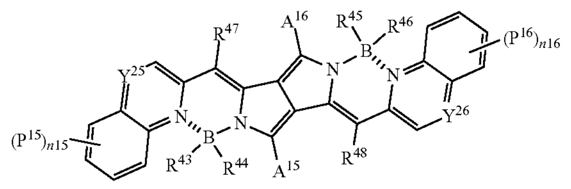

(II$_4$-7)

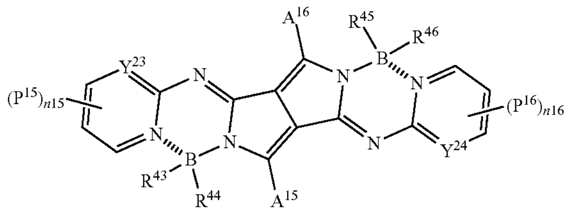

(II$_4$-8)

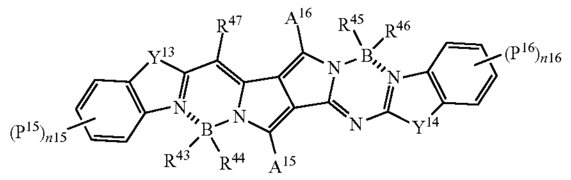

(II$_4$-9)

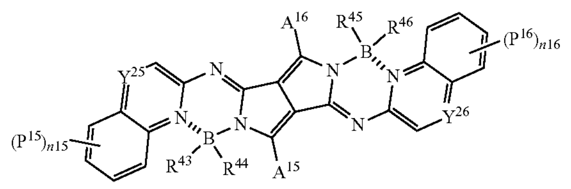

[In the formulas, each of $Y^{23}$ and $Y^{24}$ independently represents a carbon atom or a nitrogen atom; each of $Y^{13}$ and $Y^{14}$ independently represents an oxygen atom or a sulfur atom; each of $Y^{25}$ and $Y^{26}$ independently represents a carbon atom or a nitrogen atom; each of $R^{47}$ and $R^{48}$ independently represents a hydrogen atom or an electron-withdrawing group; each of $R^{43}$, $R^{44}$, $R^{45}$, and $R^{46}$ independently represents a halogen atom or an aryl group which may have a substituent; each of $P^{15}$ and $P^{16}$ independently represents a halogen atom, a $C_{1-20}$ alkyl group, a $C_{1-20}$ alkoxy group, an amino group, a monoalkylamino group, or a dialkylamino group; each of n15 and n16 independently represents an integer of 0 to 3; and each of $A^{15}$ and $A^{16}$ independently represents a phenyl group which may have one to three substituents selected from the group consisting of a hydrogen atom, a halogen atom, a $C_{1-20}$ alkyl group, a $C_{1-20}$ alkoxy group, an amino group, a monoalkylamino group, and a dialkylamino group.]

[5] The resin composition as set forth in any one of [1] to [4], in which a content of the near-infrared fluorescent material (A) with respect to a total of 100% by mass of the near-infrared fluorescent material (A) and the thermoplastic resin (B) other than the polyamide resin is 0.001% by mass or more and 0.5% by mass or less.

[6] The resin composition as set forth in any one of [1] to [5], in which the thermoplastic resin (B) includes at least one selected from the group consisting of a thermoplastic polyurethane (TPU) resin, a polycarbonate (PC) resin, a vinyl chloride resin, an acrylic resin, a polyester resin, a polystyrene resin, an olefin resin, and a polyacetal (POM) resin.

[7] The resin composition as set forth in any one of [1] to [6], in which the resin (C) includes at least one selected from the group consisting of a polyamide resin, a polyethylene resin, a polypropylene resin, a thermosetting resin, and a crosslinked polyethylene resin.

[8] The resin composition as set forth in [7], in which the resin (C) includes a polyamide resin.

[9] The resin composition as set forth in [7], in which the resin (C) includes a thermosetting resin.

[10] The resin composition as set forth in any one of [1] to [9], in which a total content of the near-infrared fluorescent material (A) and the thermoplastic resin (B) is 5% by mass or more and 60% by mass or less with respect to a total of 100% by mass of the near-infrared fluorescent material (A), the thermoplastic resin (B), and the resin (C).

[11] The resin composition as set forth in any one of [1] to [10], which is used as a medical material.

[12] A molded object obtained from the resin composition as set forth in any one of [1] to [11].

[13] The molded object as set forth in [12], in which at least a part of the molded object is a medical tool used in the body of a patient.

Advantageous Effects of Invention

According to the present invention, it is possible to provide a resin composition which emits near-infrared fluorescence, has high light-emitting efficiency, and can be relatively easily produced, and a molded object obtained from the resin composition.

BRIEF DESCRIPTION OF DRAWINGS

FIG. 1 is a schematic view of an apparatus used for measurement of light-emitting efficiency.

DESCRIPTION OF EMBODIMENTS

The present invention is a resin composition containing a near-infrared fluorescent material (A), a thermoplastic resin (B) other than a polyamide resin (hereinafter, also simply referred to as a thermoplastic resin (B)), and a resin (C) different from the thermoplastic resin (B), in which the resin (C) forms a continuous phase, and a dispersed phase containing the near-infrared fluorescent material (A) and the thermoplastic resin (B) is formed in the continuous phase.

According to the resin composition of the present invention having such a constitution, it is possible to suppress the deactivation of the near-infrared fluorescent material (A), and excellent effects that the light-emitting efficiency of near-infrared fluorescence is high and the production is relatively easy are obtained. In addition, a molded object obtained from the resin composition also has excellent effects that the light-emitting efficiency of near-infrared fluorescence is high and the production is relatively easy.

In the resin composition of the present invention, it can be confirmed by a digital microscope or the like that the near-infrared fluorescent material (A) and the thermoplastic resin (B) form a dispersed phase (so-called island portion of a sea-island structure) and the resin (C) forms a continuous phase (so-called sea portion of a sea-island structure).

Hereinafter, preferred embodiments of the present invention will be described. In the description herein, "X to Y" indicating a range means "X or more and Y or less". Further, in the description herein, operations and measurements of physical properties and the like are performed under conditions of room temperature (20 to 25° C.) and relative humidities of 40 to 50% RH, unless otherwise specified.

[Constitution of Resin Composition]

<Near-Infrared Fluorescent Material (A)>

The near-infrared fluorescent material (A) contained in the resin composition according to the present invention is a compound having a fluorescence maximum wavelength in a near-infrared region. When the resin composition according to the present invention is used, for example, as a material of a medical tool or a security tool used in a living body, the resin composition containing the near-infrared fluorescent material (A) and a molded object obtained therefrom can be excited and detected with invisible light in the near-infrared region, and thus excitation light and fluorescence can be detected without changing the color tone of a biological tissue or the like.

Examples of the near-infrared fluorescent material (A) include compounds such as a polymethine-based pigment, an anthraquinone-based pigment, a dithiol metal salt-based pigment, a cyanine-based pigment, a phthalocyanine-based pigment, an indophenol-based pigment, a cyamine-based pigment, a styryl-based pigment, an aluminum-based pigment, a diimmonium-based pigment, an azo-based pigment, an azo-boron-based pigment, a boron dipyrromethene (BODIPY)-based pigment described in WO2007/126052 and the like, a diketopyrrolopyrrole (DPP)-based boron complex, a squalium-based pigment, and a perylene-based pigment. These near-infrared fluorescent materials (A) may be used alone or in combination of two or more thereof.

As the near-infrared fluorescent material (A) contained in the resin composition according to the present invention, among the above-described materials, a cyanine-based pigment, an azo-boron-based pigment, a borondipyrromethene (BODIPY)-based pigment, a diketopyrrolopyrrole (DPP)-based boron complex, a phthalocyanine-based pigment, or a squarylium-based pigment is preferable from the viewpoint of light-emitting efficiency, and in particular, a BODIPY pigment represented by the following General Formula ($II_1$) or the following General Formula ($II_2$), or a DPP-based boron complex represented by the following General Formula ($II_3$) or the following General Formula ($II_4$) is preferable from the viewpoint of heat resistance. This is because when the light-emitting efficiency is low, sufficient emission intensity may not be obtained, and when the heat resistance is low, the material may be decomposed at the time of kneading with the resin.

<Compound Represented by General Formula ($II_1$), General Formula ($II_2$), General Formula ($II_3$), or General Formula ($II_4$)>

As the near-infrared fluorescent material (A) used in the present invention, the compound represented by the following General Formula ($II_1$) or General Formula ($II_2$) is preferable. The compound is hereinafter referred to as a "BODIPY pigment used in the present invention" sometimes.

[Chem. 9]

($II_1$)

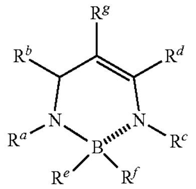

($II_2$)

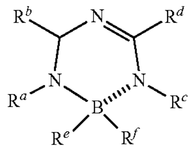

As the near-infrared fluorescent material used in the present invention, the compound represented by the following General Formula ($II_3$) or General Formula ($II_4$) is also preferable. The compound is hereinafter referred to as a "DPP-based boron complex used in the present invention" sometimes.

[Chem. 10]

($II_3$)

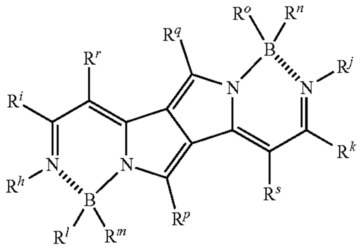

($II_4$)

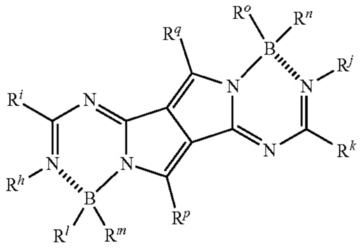

In General Formula ($II_1$) or General Formula ($II_2$), $R^a$ and $R^b$ form an aromatic ring consisting of one to three rings together with the nitrogen atom to which $R^a$ is bonded and the carbon atom to which $R^b$ is bonded. Similarly, in General Formula ($II_1$) or General Formula ($II_2$), $R^c$ and $R^d$ form an aromatic ring consisting of one to three rings together with the nitrogen atom to which $R^c$ is bonded and the carbon atom to which $R^d$ is bonded. Each ring of the aromatic ring formed by $R^a$ and $R^b$ and the aromatic ring formed by $R^c$ and $R^d$ is a 5-membered ring or a 6-membered ring. The compound represented by General Formula ($II_1$) or General Formula ($II_2$) has a ring structure formed by condensation of the aromatic ring formed by $R^a$ and $R^b$ and the aromatic ring formed by $R^c$ and $R^d$ by a ring including the boron atom bonded to the two nitrogen atoms. That is, the compound represented by General Formula ($II_1$) or General Formula ($II_2$) has a rigid condensed ring structure configured of a wide conjugate plane.

In General Formula ($II_3$) or General Formula ($II_4$), $R^h$ and $R^i$ form an aromatic ring consisting of one to three rings together with the nitrogen atom to which $R^h$ is bonded and the carbon atom to which $R^i$ is bonded. Similarly, in General Formula ($II_3$) or General Formula ($II_4$), $R^j$ and $R^k$ form an aromatic ring consisting of one to three rings together with the nitrogen atom to which $R^j$ is bonded and the carbon atom to which $R^k$ is bonded. Each ring of the aromatic ring formed by $R^h$ and $R^i$ and the aromatic ring formed by $R^j$ and $R^k$ is a 5-membered ring or a 6-membered ring. The compound represented by General Formula ($II_3$) or General Formula ($II_4$) has a ring structure formed by condensation between the 5-membered hetero rings of: three rings formed by condensation of the aromatic ring formed by $R^h$ and $R^i$, the ring including the boron atom bonded to the two nitrogen atoms, and a 5-membered hetero ring including one nitrogen atom; and three rings formed by condensation of the aromatic ring formed by $R^j$ and $R^k$, the ring including the boron atom bonded to the two nitrogen atoms, and a 5-membered hetero ring including one nitrogen atom, that is, a ring structure formed by condensation of at least 6 rings. In this manner, the compound represented by General Formula ($II_3$) or General Formula ($II_4$) has a rigid condensed ring structure configured of a very wide conjugate plane.

Each of the aromatic ring formed by $R^a$ and $R^b$, the aromatic ring formed by $R^c$ and $R^d$, the aromatic ring formed by $R^h$ and $R^i$, and the aromatic ring formed by $R^j$ and $R^k$ is not particularly limited as long as it has aromaticity. Examples of the aromatic ring include a pyrrole ring, an imidazole ring, a pyrazole ring, an oxazole ring, a thiazole ring, a pyridine ring, a pyrimidine ring, a pyridazine ring, an isoindole ring, an indole ring, an indazole ring, a purine ring, a perimidine ring, a thienopyrrole ring, a furopyrrole ring, a pyrrolothiazole ring, and a pyrrolooxazole ring. Since the maximum fluorescence wavelength becomes a longer wavelength to the near-infrared region, in particular, in the case of General Formula ($II_1$) or General Formula ($II_3$), the number of condensed rings of the aromatic ring is preferably 2 or 3, and more preferably 2 from the viewpoint of complexity of synthesis. Here, even in a case where the number of condensed rings of the aromatic ring is 1, it is also possible to make wavelengths be longer by devising the substituent on the ring or the substituent on the boron. In addition, in particular, in the case of General Formula ($II_2$) or General Formula ($II_4$), it is possible to make wavelengths be longer to the near-infrared region by simply bonding a substituted aryl group or a heteroaryl group thereto.

Each of the aromatic ring formed by $R^a$ and $R^b$, the aromatic ring formed by $R^c$ and $R^d$, the aromatic ring formed by $R^h$ and $R^i$, and the aromatic ring formed by $R^j$ and $R^k$ may not have a substituent or may have one or plural substituents. The substituent of the aromatic ring may be an "arbitrary group which does not inhibit fluorescence of a compound".

In a case where the resin composition according to the present invention is used as a medical material (raw material for medical tools), the near-infrared fluorescent material to be contained is preferably a near-infrared fluorescent material of which mutagenicity, cytotoxicity, sensitization, skin irritation, and the like are negative in the required biological safety testing. In addition, from the viewpoint of safety, the near-infrared fluorescent material is preferably not eluted from a molded object obtained by processing the resin composition according to the present invention by body fluid such as blood or tissue fluid. Thus, the near-infrared fluorescent material used in the present invention preferably has a low solubility in biological components such as blood. However, even when the near-infrared fluorescent material itself used in the present invention is water-soluble, in a case where the resin component itself in the resin composition according to the present invention is hardly eluted into the body fluid or the like, and where the content of the near-infrared fluorescent material itself is a very small amount, the molded object of the resin composition according to the present invention can be used while avoiding elution of the near-infrared fluorescent material even in vivo. Considering these, in the BODIPY pigment used in the present invention, as the substituent of the aromatic ring formed by $R^a$ and $R^b$ or the aromatic ring formed by $R^c$ and $R^d$, a substituent which is less likely to express mutagenicity or the like or decreases water solubility is preferably selected. Similarly, in the DPP-based boron complex used in the present invention, as the substituent of the aromatic ring formed by $R^h$ and $R^i$ or the aromatic ring formed by $R^j$ and $R^k$, a substituent which is less likely to express mutagenicity or the like or decreases water solubility is preferably selected.

Examples of the substituent include a halogen atom, a nitro group, a cyano group, a hydroxy group, a carboxyl group, an aldehyde group, a sulfonic acid group, an alkylsulfonyl group, a halogenosulfonyl group, a thiol group, an alkylthio group, an isocyanate group, a thioisocyanate group, an alkyl group, an alkenyl group, an alkynyl group, an alkoxy group, an alkoxycarbonyl group, an alkylamidecarbonyl group, an alkylcarbonylamide group, an acyl group, an amino group, a monoalkylamino group, a dialkylamino group, a silyl group, a monoalkylsilyl group, a dialkylsilyl group, a trialkylsilyl group, a monoalkoxysilyl group, a dialkoxysilyl group, a trialkoxysilyl group, an aryl group, and a heteroaryl group. The substituent of the aromatic ring formed by $R^a$ and $R^b$, the aromatic ring formed by $R^c$ and $R^d$, the aromatic ring formed by $R^h$ and $R^i$, or the aromatic ring formed by $R^j$ and $R^k$ is preferably a cyano group, a hydroxy group, a carboxyl group, an alkylthio group, an alkyl group, an alkoxy group, an alkoxycarbonyl group, an amide group, an alkylsulfonyl group, fluorine, chlorine, an aryl group, or a heteroaryl group, from the viewpoint of safety with respect to a living body, and these substituents may further have a substituent. Here, since, even in the case of a substituent other than these substituents, it is possible to improve safety by further introducing a suitable substituent, the present invention is not limited to these substituents.

Examples of the halogen atom include a fluorine atom, a chlorine atom, a bromine atom, and an iodine atom, and a fluorine atom, a chlorine atom, or a bromine atom is preferable, and a fluorine atom is more preferable.

The alkyl group, the alkenyl group, and the alkynyl group may be linear, branched, or cyclic (aliphatic cyclic group). Each of these groups preferably has 1 to 20 carbon atoms, more preferably 1 to 12 carbon atoms, still more preferably 1 to 8 carbon atoms, and particularly preferably 1 to 6 carbon atoms. Examples of the alkyl group include a methyl group, an ethyl group, a propyl group, an isopropyl group, a n-butyl group, an isobutyl group, a t-butyl group (tert-butyl group), a pentyl group, an isoamyl group, a hexyl group, a heptyl group, an octyl group, a nonyl group, a decyl group, an undecyl group, and a dodecyl group. Examples of the alkenyl group include a vinyl group, an allyl group, a 1-propenyl group, an isopropenyl group, a 2-butenyl group, a 1,3-butadienyl group, a 2-pentenyl group, and a 2-hexenyl group. Examples of the alkynyl group include an ethynyl group, a 1-propynyl group, a 2-propynyl group, an isopropynyl group, a 1-butynyl group, and an isobutynyl group.

Examples of the alkyl group portion in an alkylsulfonyl group, an alkylthio group, an alkoxy group, an alkoxycarbonyl group, an alkylamidecarbonyl group, an alkylcarbonylamide group, a monoalkylamino group, a dialkylamino group, a monoalkylsilyl group, a dialkylsilyl group, a trialkylsilyl group, a monoalkoxysilyl group, a dialkoxysilyl group, and a trialkoxysilyl group include the same as the alkyl groups described above. Examples of the alkoxy group include a methoxy group, an ethoxy group, a propyloxy group, an isopropyloxy group, a n-butyloxy group, an isobutyloxy group, a t-butyloxy group, a pentyloxy group, an isoamyloxy group, a hexyloxy group, a heptyloxy group, an octyloxy group, a nonyloxy group, a decyloxy group, an undecyloxy group, and a dodecyloxy group. In addition, examples of the monoalkylamino group include a methylamino group, an ethylamino group, a propylamino group, an isopropylamino group, a butylamino group, an isobutylamino group, a t-butylamino group, a pentylamino group, and a hexylamino group, and examples of the dialkylamino group include a dimethylamino group, a diethylamino group, a dipropylamino group, a diisopropylamino group, a dibutylamino group, a diisobutylamino group, a dipentylamino group, a dihexylamino group, an ethylmethylamino group, a methylpropylamino group, a butylmethylamino group, an ethylpropylamino group, and a butylethylamino group.

Examples of the aryl group include a phenyl group, a naphthyl group, an indenyl group, and a biphenyl group. The aryl group is preferably a phenyl group.

Examples of the heteroaryl group include 5-membered ring heteroaryl groups such as a pyrrolyl group, an imidazolyl group, a pyrazolyl group, a thienyl group, a furanyl group, an oxazolyl group, an isoxazolyl group, a thiazolyl group, an isothiazolyl group, and a thiadiazole group; 6-membered ring heteroaryl groups such as a pyridinyl group, a pyrazinyl group, a pyrimidinyl group, and a pyridazinyl group; and condensed heteroaryl groups such as an indolyl group, an isoindolyl group, an indazolyl group, a quinolizinyl group, a quinolinyl group, an isoquinolinyl group, a benzofuranyl group, an isobenzofuranyl group, a chromenyl group, a benzoxazolyl group, a benzisoxazolyl group, a benzothiazolyl group, and a benzisothiazolyl group.

Each of the alkyl group, the alkenyl group, the alkynyl group, the aryl group, and the heteroaryl group may be an unsubstituted group, or may be a group in which one or more hydrogen atoms are substituted with substituents. Examples of the substituent include a halogen atom, an alkyl group, an alkoxy group, a nitro group, a cyano group, a hydroxy group, an amino group, a thiol group, a carboxyl group, an aldehyde group, a sulfonic acid group, an isocyanate group, a thioisocyanate group, an aryl group, and a heteroaryl group.

The absorption wavelength and the fluorescence wavelength of the fluorescent material are dependent on the surrounding environment. Therefore, the absorption wavelength of the fluorescent material in the resin becomes shorter in some cases and becomes longer in some cases, than that in a solution. In a case where the absorption wavelength of the BODIPY pigment or the DPP-based boron complex used in the present invention becomes a longer wavelength, the maximum absorption wavelength becomes so as to be in the near-infrared region even in various resins, and thus, this is preferable. The maximum absorption wavelength of the fluorescent material can become a longer wavelength by narrowing the band gap between the highest occupied molecular orbital (HOMO) and the lowest unoccupied molecular orbital (LUMO) by introducing an electron-donating group and an electron-withdrawing group into a suitable position in the molecule.

For example, in the compound represented by General Formula ($II_1$), the maximum absorption wavelength and the maximum fluorescence wavelength of the compound can become longer wavelengths by introducing electron-donating groups into the aromatic ring formed by $R^a$ and $R^b$ and the aromatic ring formed by $R^c$ and $R^d$ and introducing an electron-withdrawing group into $R^g$. Similarly, in the compound represented by General Formula ($II_3$), the maximum absorption wavelength and the maximum fluorescence wavelength of the compound can become longer wavelengths by introducing electron-donating groups into the aromatic ring formed by $R^h$ and $R^i$ and the aromatic ring formed by $R^j$ and $R^k$, introducing, in a case where each of $R^p$ and $R^q$ has an aromatic ring, an electron-donating group into the aromatic ring, or introducing an electron-withdrawing group into $R^r$ and $R^s$. By suitably combining these designs, it is possible to adjust to a target wavelength.

The compound represented by General Formula ($II_2$) having an aza BODIPY skeleton has a skeleton having absorption at a relatively long wavelength even in a case where the aromatic ring formed by $R^a$ and $R^b$ and the aromatic ring formed by $R^c$ and $R^d$ are unsubstituted. In the skeleton, the crosslinking portion of the pyrrole is a nitrogen atom, and thus, it is not possible to introduce a substituent on the nitrogen, unlike the compound represented by General Formula ($II_1$), but the maximum absorption wavelength and the maximum fluorescence wavelength of the compound can become longer wavelengths by introducing electron-donating groups into the pyrrole portions (the aromatic ring formed by $R^a$ and $R^b$ and the aromatic ring formed by $R^c$ and $R^d$). Similarly, in the case of the compound represented by General Formula ($II_4$), the maximum absorption wavelength and the maximum fluorescence wavelength of the compound can become longer wavelengths by introducing electron-donating groups into the pyrrole portions (the aromatic ring formed by $R^h$ and $R^i$ and the aromatic ring formed by $R^j$ and $R^k$), or in a case where each of $R^p$ and $R^q$ has an aromatic ring, introducing an electron-donating group into the aromatic ring.

Therefore, as the substituent of the aromatic ring formed by $R^a$ and $R^b$, the aromatic ring formed by $R^c$ and $R^d$, the aromatic ring formed by $R^h$ and $R^i$, and the aromatic ring formed by $R^j$ and $R^k$, among "arbitrary groups which do not inhibit fluorescence of a compound", a group which functions as an electron-donating group with respect to the aromatic ring is preferable. By introducing an electron-donating group into the aromatic ring, fluorescence of the compound represented by General Formula ($II_1$), General Formula ($II_2$), General Formula ($II_3$), or General Formula ($II_4$) becomes a longer wavelength side. Examples of the group which functions as an electron-donating group include an alkyl group; an alkoxy group such as a methoxy group; an aryl group (aromatic ring group) such as a phenyl group, a p-alkoxyphenyl group, a p-dialkylaminophenyl group, or a dialkoxyphenyl group; and a heteroaryl group (heteroaromatic ring group) such as a 2-thienyl group or a 2-furanyl group. As the alkyl group, the alkyl group in a substituent of the phenyl group, and the alkyl group portion in the alkoxy group, a linear or branched alkyl group having 1 to 10 carbon atoms is preferable. Moreover, the number of carbon atoms in the alkyl group portion or the presence or absence of a branch may be appropriately selected in view of the physical properties of the fluorescent material. From the viewpoint of solubility, compatibility, or the like, it is preferable in some cases that the alkyl group portion has 6 or more carbon atoms or it is preferable in some cases that the alkyl group portion is branched. As the substituent of the aromatic ring formed by $R^a$ and $R^b$, the aromatic ring formed by $R^c$ and $R^d$, the aromatic ring formed by $R^h$ and $R^i$, and the aromatic ring formed by $R^j$ and $R^k$, a $C_{1-6}$ alkyl group, a $C_{1-6}$ alkoxy group, an aryl group, or a heteroaryl group is preferable, a methyl group, an ethyl group, a methoxy group, a phenyl group, a p-methoxyphenyl group, a p-ethoxyphenyl group, a p-dimethylaminophenyl group, a dimethoxyphenyl group, a thienyl group, or a furanyl group is more preferable, and a methyl group, an ethyl group, a methoxy group, a phenyl group, or a p-methoxyphenyl group is still more preferable. Since the BODIPY skeleton and the DPP skeleton have high planarity, the molecules thereof are likely to be aggregated to each other by π-π stacking. By introducing an aryl group or a heteroaryl group having a bulky substituent into the BODIPY skeleton or the DPP skeleton, it is possible to suppress aggregation of the molecules, and it is possible to increase the emission quantum yield of the resin composition according to the present invention.

In General Formula ($II_1$) or General Formula ($II_2$), the aromatic ring formed by $R^a$ and $R^b$ and the aromatic ring formed by $R^c$ and $R^d$ may be different from each other or the same type. In General Formula ($II_3$) or General Formula ($II_4$), the aromatic ring formed by $R^h$ and $R^i$ and the aromatic ring formed by $R^j$ and $R^k$ may be different from each other or the same type. Since the BODIPY pigment or the DPP-based boron complex used in the present invention can be easily synthesized and tends to have a higher emission quantum yield, the aromatic ring formed by $R^a$ and $R^b$ and the aromatic ring formed by $R^c$ and $R^d$, or the aromatic ring formed by $R^h$ and $R^i$ and the aromatic ring formed by $R^j$ and $R^k$ are preferably the same type.

In General Formula ($II_1$) or General Formula ($II_2$), each of $R^e$ and $R^f$ independently represents a halogen atom or an oxygen atom. In a case where each of $R^e$ and $R^f$ is a halogen atom, a fluorine atom, a chlorine atom, a bromine atom, or an iodine atom is preferable, a fluorine atom or a chlorine atom is more preferable, and a fluorine atom is particularly preferable since it has a strong bond to the boron atom. Since a compound in which each of $R^e$ and $R^f$ is a fluorine atom has high heat resistance, the compound is advantageous in the case of being melt-kneaded together with a resin at a high temperature. Moreover, in the compound represented by General Formula ($II_1$) or General Formula ($II_2$), even in a case where each of $R^e$ and $R^f$ is not a halogen atom or an oxygen atom and is a substituent containing an atom capable of being bonded to the boron atom, it can be contained in a resin in the same manner as the BODIPY pigment used in the present invention. As the substituent, any substituent is acceptable as long as it does not inhibit fluorescence.

In General Formula ($II_1$) or General Formula ($II_2$), in a case where each of $R^e$ and $R^f$ is an oxygen atom, $R^e$, the boron atom bonded to $R^e$, $R^a$, and the nitrogen atom to which $R^a$ is bonded may together form a ring, and $R^f$, the boron atom bonded to $R^f$, $R^c$, and the nitrogen atom to which $R^c$ is bonded may together form a ring. That is, in the case of forming a ring structure, the ring formed by $R^e$, the boron atom bonded to $R^e$, and the nitrogen atom to which $R^a$ is bonded is condensed with the aromatic ring formed by $R^a$ and $R^b$, and the ring formed by $R^f$, the boron atom bonded to $R^f$, and the nitrogen atom to which $R^c$ is bonded is condensed with the aromatic ring formed by $R^c$ and $R^d$. The ring formed by $R^e$ and the like and the ring formed by $R^f$ and the like are preferably 6-membered rings.

In General Formula ($II_1$) or General Formula ($II_2$), in a case where $R^e$ is an oxygen atom and a case where $R^e$ does not form a ring, $R^e$ is an oxygen atom having a substituent (an oxygen atom bonded to a substituent). Examples of the substituent include a $C_{1-20}$ alkyl group, an aryl group, a heteroaryl group, an alkylcarbonyl group, an arylcarbonyl group, or a heteroarylcarbonyl group. Similarly, in General Formula ($II_1$) or General Formula ($II_2$), in a case where $R^f$ is an oxygen atom and a case where $R^f$ does not form a ring, $R^f$ is an oxygen atom having a substituent (an oxygen atom bonded to a substituent). Examples of the substituent include a $C_{1-20}$ alkyl group, an aryl group, a heteroaryl group, an alkylcarbonyl group, an arylcarbonyl group, or a heteroarylcarbonyl group. Moreover, in a case where both of $R^e$ and $R^f$ are oxygen atoms having a substituent, the substituent which $R^e$ has and the substituent which $R^f$ has may be the same as or different from each other.

In General Formula ($II_1$) or General Formula ($II_2$), in a case where each of $R^e$ and $R^f$ is an oxygen atom, $R^e$, $R^f$, and the boron atom bonded to $R^e$ and $R^f$ may together form a ring. Examples of the ring structure include a structure in which $R^e$ and $R^f$ are connected to the same aryl ring or heteroaryl ring and a structure in which $R^e$ and $R^f$ are connected by an alkylene group.

In General Formula ($II_3$) or General Formula ($II_4$), each of $R^l$, $R^m$, $R^n$, and $R^o$ independently represents a halogen atom, a $C_{1-20}$ alkyl group, a $C_{1-20}$ alkoxy group, an aryl group, or a heteroaryl group. In a case where each of $R^l$, $R^m$, $R^n$, and $R^o$ is a halogen atom, a fluorine atom, a chlorine atom, a bromine atom, or an iodine atom is preferable, a fluorine atom or a chlorine atom is more preferable, and a fluorine atom is particularly preferable since it has a strong bond to the boron atom. Since a compound in which each of $R^l$, $R^m$, $R^n$, and $R^o$ is a fluorine atom has high heat resistance, the compound is advantageous in the case of being melt-kneaded together with a resin at a high temperature.

Moreover, in the present invention and the description herein, the "$C_{1-20}$ alkyl group" means an alkyl group having 1 to 20 carbon atoms, and the "$C_{1-20}$ alkoxy group" means an alkoxy group having 1 to 20 carbon atoms.

In a case where $R^l$, $R^m$, $R^n$, or $R^o$ is a $C_{1-20}$ alkyl group, the alkyl group may be linear, may be branched, or may be cyclic (aliphatic cyclic group). Examples of the alkyl group include a methyl group, an ethyl group, a propyl group, an isopropyl group, a n-butyl group, an isobutyl group, a t-butyl group, a pentyl group, an isoamyl group, a hexyl group, a heptyl group, an octyl group, a nonyl group, a decyl group, an undecyl group, and a dodecyl group.

In a case where $R^l$, $R^m$, $R^n$, or $R^o$ is a $C_{1-20}$ alkoxy group, the alkyl group portion of the alkoxy group may be linear, may be branched, or may be cyclic (aliphatic cyclic group). Examples of the alkoxy group include a methoxy group, an ethoxy group, a propyloxy group, an isopropyloxy group, a n-butyloxy group, an isobutyloxy group, a t-butyloxy group, a pentyloxy group, an isoamyloxy group, a hexyloxy group, a heptyloxy group, an octyloxy group, a nonyloxy group, a decyloxy group, an undecyloxy group, and a dodecyloxy group.

In a case where $R^l$, $R^m$, $R^n$, or $R^o$ is an aryl group, examples of the aryl group include a phenyl group, a naphthyl group, an indenyl group, and a biphenyl group.

In a case where $R^l$, $R^m$, $R^n$, or $R^o$ is a heteroaryl group, examples of the heteroaryl group include 5-membered ring heteroaryl groups such as a pyrrolyl group, an imidazolyl group, a pyrazolyl group, a thienyl group, a furanyl group, an oxazolyl group, an isoxazolyl group, a thiazolyl group, an isothiazolyl group, and a thiadiazole group; 6-membered ring heteroaryl groups such as a pyridinyl group, a pyrazinyl group, a pyrimidinyl group, and a pyridazinyl group; and condensed heteroaryl groups such as an indolyl group, an isoindolyl group, an indazolyl group, a quinolizinyl group, a quinolinyl group, an isoquinolinyl group, a benzofuranyl group, an isobenzofuranyl group, a chromenyl group, a benzoxazolyl group, a benzisoxazolyl group, a benzothiazolyl group, and a benzisothiazolyl group.

Each of the $C_{1-20}$ alkyl group, the $C_{1-20}$ alkoxy group, the aryl group, and the heteroaryl group represented by $R^l$, $R^m$, $R^n$, or $R^o$ may be an unsubstituted group, or may be a group in which one or more hydrogen atoms are substituted with substituents. Examples of the substituent include a halogen atom, an alkyl group, an alkoxy group, a nitro group, a cyano group, a hydroxy group, an amino group, a thiol group, a carboxyl group, an aldehyde group, a sulfonic acid group, an isocyanate group, a thioisocyanate group, an aryl group, and a heteroaryl group.

As the compound represented by General Formula ($II_3$) or General Formula ($II_4$), a compound in which each of $R^l$, $R^m$, $R^n$, and $R^o$ is a halogen atom, an unsubstituted aryl group, or an aryl group having a substituent is preferable, a compound in which each of $R^l$, $R^m$, $R^n$, and $R^o$ is a fluorine atom, a chlorine atom, a bromine atom, an unsubstituted phenyl group, or a phenyl group substituted with a $C_{1-20}$ alkyl group or a $C_{1-20}$ alkoxy group is preferable, a compound in which each of $R^l$, $R^m$, $R^n$, and $R^o$ is a fluorine atom, a chlorine atom, an unsubstituted phenyl group, or a phenyl group substituted with a $C_{1-10}$ alkyl group or a $C_{1-10}$ alkoxy group is more preferable, and a compound in which each of $R^l$, $R^m$, $R^n$, and $R^o$ is a fluorine atom or an unsubstituted phenyl group is particularly preferable.

In General Formula ($II_3$) or General Formula ($II_4$), each of $R^p$ and $R^q$ independently represents a hydrogen atom, a halogen atom, a $C_{1-20}$ alkyl group, a $C_{1-20}$ alkoxy group, an aryl group, or a heteroaryl group. Examples of the halogen atom, the $C_{1-20}$ alkyl group, the $C_{1-20}$ alkoxy group, the aryl group, or the heteroaryl group represented by $R^p$ or $R^q$ include the same as those represented by $R^l$, $R^m$, $R^n$, or $R^o$ in General Formula ($II_3$).

As the compound represented by General Formula ($II_3$) or General Formula ($II_4$), a compound in which each of $R^p$ and $R^q$ is a hydrogen atom or an aryl group is preferable, a compound in which each of $R^p$ and $R^q$ is a hydrogen atom, an unsubstituted phenyl group, or a phenyl group substituted with a $C_{1-20}$ alkyl group or a $C_{1-20}$ alkoxy group is preferable, a compound in which each of $R^p$ and $R^q$ is a hydrogen atom, an unsubstituted phenyl group, or a phenyl group substituted with a $C_{1-20}$ alkoxy group is more preferable, and a compound in which each of $R^p$ and $R^q$ is a hydrogen atom, an unsubstituted phenyl group, or a phenyl group substituted with a $C_{1-10}$ alkoxy group is particularly preferable.

In General Formula ($II_1$), $R^g$ represents a hydrogen atom or an electron-withdrawing group. In addition, in General Formula ($II_3$), each of $R^r$ and $R^s$ independently represents a hydrogen atom or an electron-withdrawing group. Examples of the electron-withdrawing group include a methyl halide group such as a trifluoromethyl group; a nitro group; a cyano group; an aryl group; a heteroaryl group; an alkynyl group; an alkenyl group; a substituent having a carbonyl group such as a carboxyl group, an acyl group, a carbonyloxy group, an amide group, and an aldehyde group; a sulfoxide group; a sulfonyl group; an alkoxymethyl group; and an aminomethyl group, and an aryl group or a heteroaryl group having the electron-withdrawing group as a substituent can also be used. Among these electron-withdrawing groups, from the viewpoint of making the maximum fluorescence wavelength to be longer, a trifluoromethyl group, a nitro group, a cyano group, or a sulfonyl group which can function as a strong electron-withdrawing group is preferable.

As the BODIPY pigment used in the present invention, a compound represented by the following General Formula ($II_1$-0) or General Formula ($II_2$-0) is preferable. A compound having a boron dipyrromethene skeleton is preferable since the maximum fluorescence wavelength becomes a longer wavelength, and, in particular, a compound satisfying the following (p2), (p3), (q2), or (q3), in which the pyrrole ring is condensed with an aromatic ring or a heteroaromatic ring is preferable as the near-infrared fluorescent material used in the present invention since the maximum wavelength becomes a longer wavelength.

[Chem. 11]

($II_1$-0)

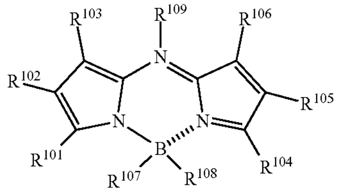

($II_2$-0)

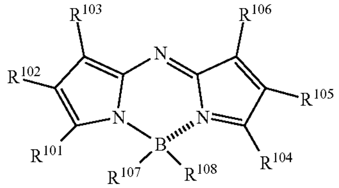

In General Formula ($II_1$-0) or General Formula ($II_2$-0), $R^{101}$, $R^{102}$, and $R^{103}$ satisfy any one of the following (p1) to (p3):

(p1) each of $R^{101}$, $R^{102}$, and $R^{103}$ independently represents a hydrogen atom, a halogen atom, a $C_{1-20}$ alkyl group, a $C_{1-20}$ alkoxy group, an aryl group, or a heteroaryl group;

(p2) $R^{101}$ and $R^{102}$ together form an aromatic 5-membered ring or an aromatic 6-membered ring, and $R^{103}$ represents a hydrogen atom, a halogen atom, a $C_{1-20}$ alkyl group, a $C_{1-20}$ alkoxy group, an aryl group, or a heteroaryl group; or (p3) $R^{102}$ and $R^{103}$ together form an aromatic 5-membered ring or an aromatic 6-membered ring, and $R^{101}$ represents a hydrogen atom, a halogen atom, a $C_{1-20}$ alkyl group, a $C_{1-20}$ alkoxy group, an aryl group, or a heteroaryl group.

In General Formula ($II_1$-0) or General Formula ($II_2$-0), $R^{104}$, $R^{105}$, and $R^{106}$ satisfy any one of the following (q1) to (q3):

(q1) each of $R^{104}$, $R^{105}$, and $R^{106}$ independently represents a hydrogen atom, a halogen atom, a $C_{1-20}$ alkyl group, a $C_{1-20}$ alkoxy group, an aryl group, or a heteroaryl group;

(q2) $R^{104}$ and $R^{105}$ together form an aromatic 5-membered ring or an aromatic 6-membered ring, and $R^{106}$ represents a hydrogen atom, a halogen atom, a $C_{1-20}$ alkyl group, a $C_{1-20}$ alkoxy group, an aryl group, or a heteroaryl group; or (q3) $R^{105}$ and $R^{106}$ together form an aromatic 5-membered ring or an aromatic 6-membered ring, and $R^{104}$ represents a hydrogen atom, a halogen atom, a $C_{1-20}$ alkyl group, a $C_{1-20}$ alkoxy group, an aryl group, or a heteroaryl group.

As the halogen atom, the $C_{1-20}$ alkyl group, the $C_{1-20}$ alkoxy group, the aryl group, or the heteroaryl group in (p1) to (p3) or (q1) to (q3), those exemplified as the "arbitrary group which does not inhibit fluorescence of a compound" represented by each of $R^a$ and $R^b$ can be used.

In (p2) and (p3) or (q2) and (q3), as the aromatic 5-membered ring or the aromatic 6-membered ring formed together by $R^{101}$ and $R^{102}$, the aromatic 5-membered ring or the aromatic 6-membered ring formed together by $R^{104}$ and $R^{105}$, the aromatic 5-membered ring or the aromatic 6-membered ring formed together by $R^{102}$ and $R^{103}$, or the aromatic 5-membered ring or the aromatic 6-membered ring formed together by $R^{105}$ and $R^{106}$ a ring represented by any one of the following General Formulas (C-1) to (C-9) is preferable, and a ring represented by any one of the following General Formulas (C-1), (C-2), and (C-9) is more preferable. In the following General Formulas (C-1) to (C-9), the place to which an asterisk is attached is a portion to which the boron dipyrromethene skeleton in General Formula ($II_1$-0) or General Formula ($II_2$-0) is bonded.

[Chem. 12]

(C-1)

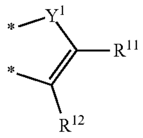

(C-2)

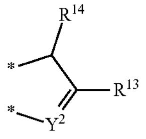

(C-3)

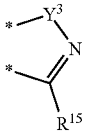

(C-4)

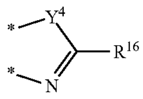

(C-5)

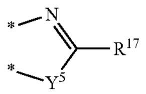

(C-6)

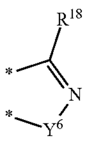

-continued (C-7)

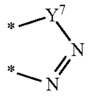

(C-8)

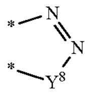

(C-9)

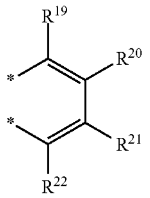

In General Formulas (C-1) to (C-8), each of $Y^1$ to $Y^8$ independently represents a sulfur atom, an oxygen atom, a nitrogen atom, or a phosphorus atom. Each of $Y^1$ to $Y^8$ is independently preferably a sulfur atom, an oxygen atom, or a nitrogen atom, and independently more preferably a sulfur atom or an oxygen atom.

In General Formulas (C-1) to (C-9), each of $R^{11}$ to $R^{22}$ independently represents a hydrogen atom or the arbitrary group which does not inhibit fluorescence of the compound described above. As the "arbitrary group which does not inhibit fluorescence of a compound", those exemplified as the "arbitrary group which does not inhibit fluorescence of a compound" represented by each of $R^a$ and $R^b$ can be used. Each of $R^{11}$ to $R^{22}$ is independently preferably a hydrogen atom, an unsubstituted aryl group, an aryl group having a substituent, an unsubstituted heteroaryl group, or a heteroaryl group having a substituent, more preferably a hydrogen atom, an (unsubstituted) phenyl group, a p-methoxyphenyl group, a p-ethoxyphenyl group, a p-dimethylaminophenyl group, a dimethoxyphenyl group, a thienyl group, or a furanyl group, and still more preferably a hydrogen atom, an (unsubstituted) phenyl group, or a p-methoxyphenyl group. Since the electron donating property can be increased and aggregation of a BODIPY skeleton can be suppressed by a bulky substituent, the compound is particularly preferably substituted with at least one of the unsubstituted aryl group, the aryl group having a substituent, the unsubstituted heteroaryl group, and the heteroaryl group having a substituent.

In the compound of General Formula ($II_1$-0) or General Formula ($II_2$-0), $R^{101}$ and $R^{104}$, $R^{102}$ and $R^{105}$, and $R^{103}$ and $R^{106}$ may be different from each other, respectively, but are preferably the same group. That is, in a case where $R^{101}$, $R^{102}$, and $R^{103}$ satisfy (p1), $R^{104}$, $R^{105}$, and $R^{106}$ preferably satisfy (q1), in a case where $R^{101}$, $R^{102}$, and $R^{103}$ satisfy (p2), $R^{104}$, $R^{105}$, and $R^{106}$ preferably satisfy (q2), and in a case where $R^{101}$, $R^{102}$, and $R^{103}$ satisfy (p3), $R^{104}$, $R^{105}$, and $R^{106}$ preferably satisfy (q3).

As the compound of General Formula ($II_1$-0) or General Formula ($II_2$-0), a compound in which $R^{101}$ and $R^{102}$ form a ring, and $R^{104}$ and $R^{105}$ form a ring, or a compound in which $R^{102}$ and $R^{103}$ form a ring, and $R^{105}$ and $R^{106}$ form a ring is preferable. That is, it is preferable that $R^{101}$, $R^{102}$, and $R^{103}$ satisfy (p2) or (p3), and $R^{104}$, $R^{105}$, and $R^{106}$ satisfy (q2) or (q3). This is because the maximum fluorescence wavelength becomes a longer wavelength side by further condensing an aromatic ring or a heteroaromatic ring to the boron dipyrromethene skeleton.

In General Formula ($II_1$-0) or General Formula ($II_2$-0), each of $R^{107}$ and $R^{108}$ represents a halogen atom or an oxygen atom. In a case where $R^{107}$ and $R^{108}$ are oxygen atoms, $R^{107}$, the boron atom bonded to $R^{107}$, the nitrogen atom to which the boron atom is bonded, $R^{101}$, and the carbon atom bonded to $R^{101}$ may together form a ring, and $R^{108}$, the boron atom bonded to $R^{108}$, the nitrogen atom to which the boron atom is bonded, $R^{104}$, and the carbon atom bonded to $R^{104}$ may together form a ring. That is, each of the ring formed by $R^{107}$, the boron atom, $R^{101}$, and the like and the ring formed by $R^{108}$, the boron atom, $R^{104}$, and the like is condensed with the boron dipyrromethene skeleton. Each of the ring formed by $R^{107}$, the boron atom, $R^{101}$, and the like and the ring formed by $R^{108}$, the boron atom, $R^{104}$, and the like is preferably a 6-membered ring.

In General Formula ($II_1$-0) or General Formula ($II_2$-0), in a case where $R^{107}$ is an oxygen atom and does not form a ring, $R^{107}$ is an oxygen atom having a substituent (an oxygen atom bonded to a substituent). Examples of the substituent include a $C_{1-20}$ alkyl group, an aryl group, or a heteroaryl group. Similarly, in General Formula ($II_1$-0) or General Formula ($II_2$-0), in a case where $R^{108}$ is an oxygen atom and does not form a ring, $R^{108}$ is an oxygen atom having a substituent (an oxygen atom bonded to a substituent). Examples of the substituent include a $C_{1-20}$ alkyl group, an aryl group, or a heteroaryl group. Moreover, in a case where both of $R^{107}$ and $R^{108}$ are oxygen atoms having a substituent, the substituent which $R^{107}$ has and the substituent which $R^{108}$ has may be the same as or different from each other.

In General Formula ($II_1$-0), $R^{109}$ represents a hydrogen atom or an electron-withdrawing group. Examples of the electron-withdrawing group include the same as the groups exemplified as $R^g$. Among these, from the viewpoint of making the maximum fluorescence wavelength to be longer, a fluoroalkyl group, a nitro group, a cyano group, an aryl group, or a sulfonyl group which can function as a strong electron-withdrawing group is preferable, a trifluoromethyl group, a nitro group, a cyano group, a phenyl group, or a sulfonyl group is more preferable, and from the viewpoint of safety with respect to a living body, a trifluoromethyl group, a cyano group, a phenyl group, or a sulfonyl group is still more preferable. However, the present invention is not limited to these substituents.

As the BODIPY pigment used in the present invention, among the compounds represented by General Formula ($II_1$-0) or General Formula ($II_2$-0), a compound in which $R^{101}$ and $R^{102}$ together form a ring in which, in the ring represented by General Formula (C-1), one of $R^{11}$ and $R^{12}$ is a hydrogen atom, and the remaining one is a phenyl group, a thienyl group, or a furanyl group in which one to three hydrogen atoms may be substituted with a halogen atom, a $C_{1-20}$ alkyl group, or a $C_{1-20}$ alkoxy group, $R^{104}$ and $R^{105}$ together form the same type of ring as the ring formed by $R^{101}$ and $R^{102}$, each of $R^{103}$ and $R^{106}$ is a hydrogen atom, and each of $R^{107}$ and $R^{108}$ is a halogen atom; a compound in which $R^{101}$ and $R^{102}$ together form a ring in which, in the ring represented by General Formula (C-2), one of $R^{13}$ and $R^{14}$ is a hydrogen atom, and the remaining one is a phenyl group, a thienyl group, or a furanyl group in which one to three hydrogen atoms may be substituted with a halogen atom, a $C_{1-20}$ alkyl group, or a $C_{1-20}$ alkoxy group, $R^{104}$ and $R^{105}$ together form the same type of ring as the ring formed by $R^{101}$ and $R^{102}$, each of $R^{103}$ and $R^{106}$ is a hydrogen atom, and each of $R^{107}$ and $R^{108}$ is a halogen atom; a compound in which $R^{102}$ and $R^{103}$ together form a ring in which, in the ring represented by General Formula (C-1), one of $R^{11}$ and $R^{12}$ is a hydrogen atom, and the remaining one is a phenyl group, a thienyl group, or a furanyl group in which one to three hydrogen atoms may be substituted with a halogen atom, a $C_{1-20}$ alkyl group, or a $C_{1-20}$ alkoxy group, $R^{105}$ and $R^{106}$ together form the same type of ring as the ring formed by $R^{102}$ and $R^{103}$, each of $R^{101}$ and $R^{104}$ is a hydrogen atom, and each of $R^{107}$ and $R^{108}$ is a halogen atom; a compound in which $R^{102}$ and $R^{103}$ together form a ring in which, in the ring represented by the following General Formula (C-2), one of $R^{13}$ and $R^{14}$ is a hydrogen atom, and the remaining one is a phenyl group, a thienyl group, or a furanyl group in which one to three hydrogen atoms may be substituted with a halogen atom, a $C_{1-20}$ alkyl group, or a $C_{1-20}$ alkoxy group, $R^{105}$ and $R^{106}$ together form the same type of ring as the ring formed by $R^{101}$ and $R^{102}$, each of $R^{101}$ and $R^{104}$ is a hydrogen atom, and each of $R^{107}$ and $R^{108}$ is a halogen atom; or a compound in which $R^{102}$ and $R^{103}$ together form a ring in which, in the ring represented by the following General Formula (C-9), one of $R^{19}$ to $R^{22}$ is a phenyl group, a thienyl group, or a furanyl group in which one to three hydrogen atoms may be substituted with a halogen atom, a $C_{1-20}$ alkyl group, or a $C_{1-20}$ alkoxy group, and the remaining three are hydrogen atoms, $R^{105}$ and $R^{106}$ together form the same type of ring as that formed by $R^{101}$ and $R^{102}$, each of $R^{101}$ and $R^{104}$ is a phenyl group, a thienyl group, or a furanyl group which may be substituted with a hydrogen atom, a halogen atom, a $C_{1-20}$ alkyl group, or a $C_{1-20}$ alkoxy group, and each of $R^{107}$ and $R^{108}$ is a halogen atom, is preferable. In a case where the compound is a compound represented by General Formula ($II_1$-0), $R^{109}$ is still more preferably a trifluoromethyl group, a cyano group, a nitro group, or a phenyl group, and a trifluoromethyl group or a phenyl group is particularly preferable.

As the near-infrared fluorescent material according to the present invention, a compound represented by any one of the following General Formulas ($II_3$-1) to ($II_3$-6) or a compound represented by any one of General Formulas ($II_4$-1) to ($II_4$-6) is also preferable since the maximum wavelength is a longer wavelength.

[Chem. 13]

($II_3$-1)

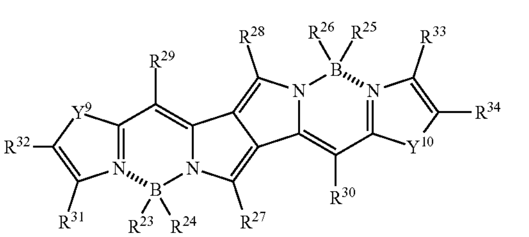

($II_3$-2)

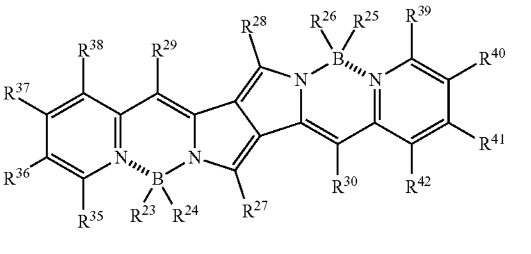

-continued ($II_3$-3)

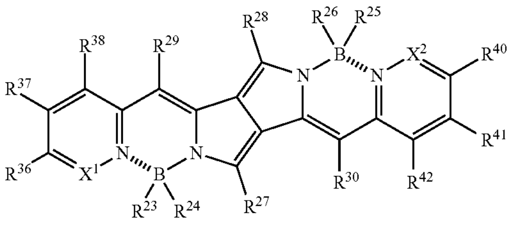

($II_3$-4)

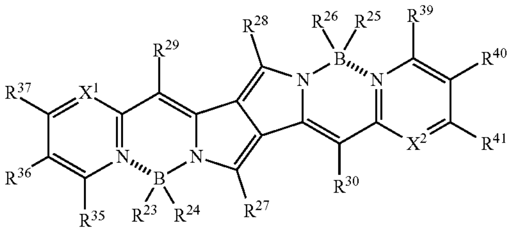

($II_3$-5)

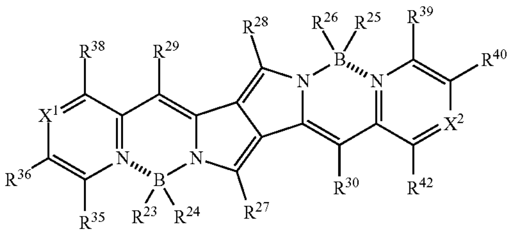

($II_3$-6)

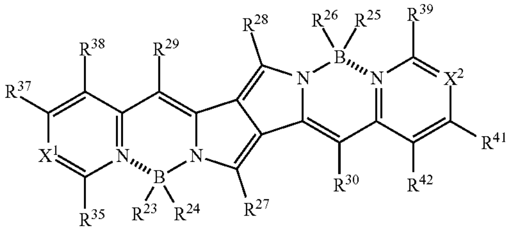

[Chem. 14]

($II_4$-1)

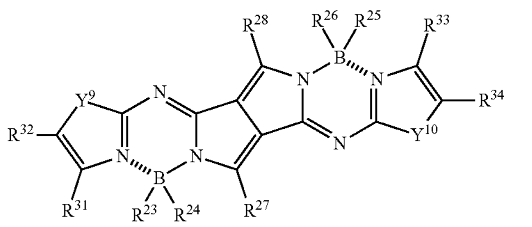

($II_4$-2)

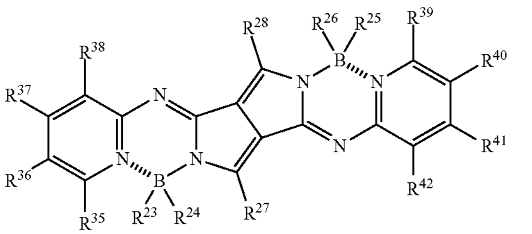

-continued ($II_4$-3)

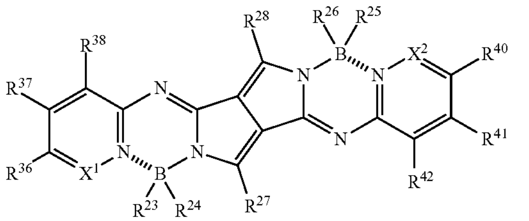

($II_4$-4)

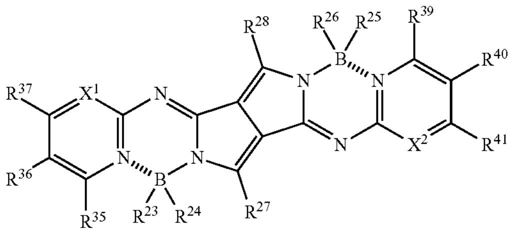

($II_4$-5)

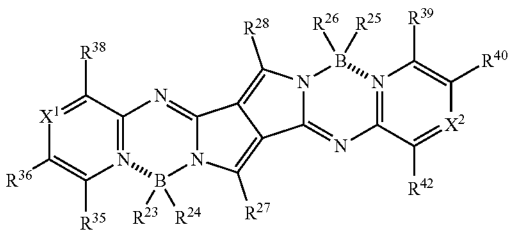

($II_4$-6)

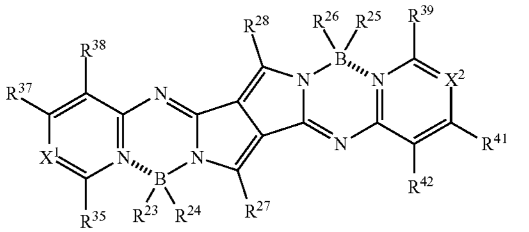

In General Formulas ($II_3$-1) to ($II_3$-6) and General Formulas ($II_4$-1) to ($II_4$-6), each of $R^{23}$, $R^{24}$, $R^{25}$, and $R^{26}$ independently represents a halogen atom, a $C_{1-20}$ alkyl group, a $C_{1-20}$ alkoxy group, an aryl group, or a heteroaryl group. Examples of the halogen atom, the $C_{1-20}$ alkyl group, the $C_{1-20}$ alkoxy group, the aryl group, or the heteroaryl group represented by each of $R^{23}$, $R^{24}$, $R^{25}$, and $R^{26}$ include the same as those represented by each of $R^l$, $R^m$, $R^n$, and $R^o$ in General Formula ($II_3$). As the compound represented by any one of General Formulas ($II_3$-1) to ($II_3$-6) or the compound represented by any one of General Formulas ($II_4$-1) to ($II_4$-6), from the viewpoint of high thermal stability of a compound, a compound in which each of $R^{23}$, $R^{24}$, $R^{25}$, and $R^{26}$ is a halogen atom, an unsubstituted aryl group, or an aryl group having a substituent is preferable, specifically, a compound in which each of $R^{23}$, $R^{24}$, $R^{25}$, and $R^{26}$ is a fluorine atom, a chlorine atom, a bromine atom, an unsubstituted phenyl group, or a phenyl group substituted with a $C_{1-20}$ alkyl group or a $C_{1-20}$ alkoxy group is preferable, a compound in which each of $R^{23}$, $R^{24}$, $R^{25}$, and $R^{26}$ is a fluorine atom, a chlorine atom, an unsubstituted phenyl group, or a phenyl group substituted with a $C_{1-10}$ alkyl group or a $C_{1-10}$ alkoxy group is more preferable, and from the viewpoint of obtaining a compound having both high light-emitting efficiency and thermal stability, a compound in which each of $R^{23}$, $R^{24}$, $R^{25}$, and $R^{26}$ is a fluorine atom or an unsubstituted phenyl group is particularly preferable.

In General Formulas ($II_3$-1) to ($II_3$-6) and General Formulas ($II_4$-1) to ($II_4$-6), each of $R^{27}$ and $R^{28}$ independently represents a hydrogen atom, a halogen atom, a $C_{1-20}$ alkyl group, a $C_{1-20}$ alkoxy group, an aryl group, or a heteroaryl group. Examples of the halogen atom, the $C_{1-20}$ alkyl group, the $C_{1-20}$ alkoxy group, the aryl group, or the heteroaryl group represented by $R^{27}$ or $R^{28}$ include the same as those represented by $R^p$ or $R^q$ in General Formula ($II_3$). As the compound represented by any one of General Formulas ($II_3$-1) to ($II_3$-6) or the compound represented by any one of General Formulas ($II_4$-1) to ($II_4$-6), a compound in which each of $R^{27}$ and $R^{28}$ is a hydrogen atom or an aryl group is preferable, from the viewpoint of obtaining a compound having high light-emitting efficiency, a compound in which each of $R^{27}$ and $R^{28}$ is a hydrogen atom, an unsubstituted phenyl group, or a phenyl group substituted with a $C_{1-20}$ alkyl group or a $C_{1-20}$ alkoxy group is preferable, a compound in which each of $R^{27}$ and $R^{28}$ is a hydrogen atom, an unsubstituted phenyl group, or a phenyl group substituted with a linear or branched $C_{1-20}$ alkoxy group is more preferable, and from the viewpoint of obtaining a compound having high light-emitting efficiency and excellent compatibility with respect to a resin, a compound in which each of $R^{27}$ and $R^{28}$ is a hydrogen atom, an unsubstituted phenyl group, or a phenyl group substituted with a linear or branched $C_{1-10}$ alkoxy group is particularly preferable.

In General Formulas ($II_3$-1) to ($II_3$-6), each of $R^{29}$ and $R^{30}$ independently represents a hydrogen atom or an electron-withdrawing group. Examples of the electron-withdrawing group represented by $R^{29}$ or $R^{30}$ include the same as those represented by $R^r$ or $R^s$ in General Formula ($II_3$). As the compound represented by any one of General Formulas ($II_3$-1) to ($II_3$-6), from the viewpoint of obtaining a compound having high light-emitting efficiency, a compound in which each of $R^{29}$ and $R^{30}$ is a fluoroalkyl group, a nitro group, a cyano group, or an aryl group which can function as a strong electron-withdrawing group is preferable, a compound in which each of $R^{29}$ and $R^{30}$ is a trifluoromethyl group, a nitro group, a cyano group, or a phenyl group which may have a substituent is more preferable, and from the viewpoint of obtaining a compound having high light-emitting efficiency and excellent compatibility with respect to a resin, a compound in which each of $R^{29}$ and $R^{30}$ is a trifluoromethyl group or a cyano group is still more preferable.

In General Formula ($II_3$-1) and General Formula ($II_4$-1), each of $Y^9$ and $Y^{10}$ independently represents a sulfur atom, an oxygen atom, a nitrogen atom, or a phosphorus atom. As the compound represented by General Formula ($II_3$-1) or General Formula ($II_4$-1), from the viewpoint of obtaining a compound having high light-emitting efficiency, a compound in which each of $Y^9$ and $Y^{10}$ is independently a sulfur atom, an oxygen atom, or a nitrogen atom is preferable, a compound in which each of $Y^9$ and $Y^{10}$ is independently a sulfur atom or an oxygen atom is more preferable, and from the viewpoint of obtaining a compound having both high light-emitting efficiency and thermal stability, a compound in which both $Y^9$ and $Y^{10}$ are a sulfur atom or an oxygen atom is still more preferable.

In General Formulas ($II_3$-3) to ($II_3$-6) and General Formulas ($II_4$-3) to ($II_4$-6), each of $X^1$ and $X^2$ independently represents a nitrogen atom or a phosphorus atom. As the compound represented by General Formulas ($II_3$-3) to ($II_3$-6) and General Formulas ($II_4$-3) to ($II_4$-6), from the viewpoint of obtaining a compound having high light-emitting efficiency, a compound in which both $X^1$ and $X^2$ are a nitrogen atom or a phosphorus atom is preferable, and from the viewpoint of obtaining a compound having both high light-emitting efficiency and thermal stability, a compound in which both $X^1$ and $X^2$ are a nitrogen atom is more preferable.

In General Formula ($II_3$-1) and General Formula ($II_4$-1), $R^{31}$ and $R^{32}$ satisfy the following (p4) or (p5):

(p4) each of $R^{31}$ and $R^{32}$ independently represents a hydrogen atom, a halogen atom, a $C_{1-20}$ alkyl group, a $C_{1-20}$ alkoxy group, an aryl group, or a heteroaryl group; or (p5) $R^{31}$ and $R^{32}$ together form an aromatic 5-membered ring which may have a substituent or an aromatic 6-membered ring which may have a substituent.

In General Formula ($II_3$-1) and General Formula ($II_4$-1), $R^{33}$ and $R^{34}$ satisfy the following (q4) or (q5):

(q4) each of $R^{33}$ and $R^{34}$ independently represents a hydrogen atom, a halogen atom, a $C_{1-20}$ alkyl group, a $C_{1-20}$ alkoxy group, an aryl group, or a heteroaryl group; or (q5) $R^{33}$ and $R^{34}$ together form an aromatic 5-membered ring which may have a substituent or an aromatic 6-membered ring which may have a substituent.

In General Formulas ($II_3$-2) to ($II_3$-6) and General Formulas ($II_4$-2) to ($II_4$-6), $R^{35}$, $R^{36}$, $R^{37}$, and $R^{38}$ satisfy any one of the following (p6) to (p9):

(p6) each of $R^{35}$, $R^{36}$, $R^{37}$, and $R^{38}$ independently represents a hydrogen atom, a halogen atom, a $C_{1-20}$ alkyl group, a $C_{1-20}$ alkoxy group, an aryl group, or a heteroaryl group;

(p7) $R^{35}$ and $R^{36}$ together form an aromatic 5-membered ring which may have a substituent or an aromatic 6-membered ring which may have a substituent, and each of $R^{37}$ and $R^{38}$ independently represents a hydrogen atom, a halogen atom, a $C_{1-20}$ alkyl group, a $C_{1-20}$ alkoxy group, an aryl group, or a heteroaryl group;

(p8) $R^{36}$ and $R^{37}$ together form an aromatic 5-membered ring which may have a substituent or an aromatic 6-membered ring which may have a substituent, and each of $R^{35}$ and $R^{38}$ independently represents a hydrogen atom, a halogen atom, a $C_{1-20}$ alkyl group, a $C_{1-20}$ alkoxy group, an aryl group, or a heteroaryl group; or (p9) $R^{37}$ and $R^{38}$ together form an aromatic 5-membered ring which may have a substituent or an aromatic 6-membered ring which may have a substituent, and each of $R^{35}$ and $R^{36}$ independently represents a hydrogen atom, a halogen atom, a $C_{1-20}$ alkyl group, a $C_{1-20}$ alkoxy group, an aryl group, or a heteroaryl group.

In General Formulas ($II_3$-2) to ($II_3$-6) and General Formulas ($II_4$-2) to ($II_4$-6), $R^{39}$, $R^{40}$, $R^{41}$, and $R^{42}$ satisfy any one of the following (q6) to (q9):

(q6) each of $R^{39}$, $R^{40}$, $R^{41}$, and $R^{42}$ independently represents a hydrogen atom, a halogen atom, a $C_{1-20}$ alkyl group, a $C_{1-20}$ alkoxy group, an aryl group, or a heteroaryl group;

(q7) $R^{39}$ and $R^{40}$ together form an aromatic 5-membered ring which may have a substituent or an aromatic 6-membered ring which may have a substituent, and each of $R^{41}$ and $R^{42}$ independently represents a hydrogen atom, a halogen atom, a $C_{1-20}$ alkyl group, a $C_{1-20}$ alkoxy group, an aryl group, or a heteroaryl group;

(q8) $R^{40}$ and $R^{41}$ together form an aromatic 5-membered ring which may have a substituent or an aromatic 6-membered ring which may have a substituent, and each of $R^{39}$ and $R^{42}$ independently represents a hydrogen atom, a halogen atom, a $C_{1-20}$ alkyl group, a $C_{1-20}$ alkoxy group, an aryl group, or a heteroaryl group; or (q9) $R^{41}$ and $R^{42}$ together form an aromatic 5-membered ring which may have a substituent or an aromatic 6-membered ring which may have a substituent, and each of $R^{39}$ and $R^{40}$ independently represents a hydrogen atom, a halogen atom, a $C_{1-20}$ alkyl group, a $C_{1-20}$ alkoxy group, an aryl group, or a heteroaryl group.

As the halogen atom, the $C_{1-20}$ alkyl group, the $C_{1-20}$ alkoxy group, the aryl group, or the heteroaryl group in (p4), (p6) to (p9), and (q4), (q6) to (q9), those exemplified as the "arbitrary group which does not inhibit fluorescence of a compound" represented by each of $R^a$ and $R^b$ can be used.

In (p5), (p7) to (p9), (q5), (q7) to (q9), as the aromatic 5-membered ring or the aromatic 6-membered ring formed together by $R^{31}$ and $R^{32}$, the aromatic 5-membered ring or the aromatic 6-membered ring formed together by $R^{33}$ and $R^{34}$, the aromatic 5-membered ring or the aromatic 6-membered ring formed together by $R^{35}$ and $R^{36}$, the aromatic 5-membered ring or the aromatic 6-membered ring formed together by $R^{36}$ and $R^{37}$, the aromatic 5-membered ring or the aromatic 6-membered ring formed together by $R^{37}$ and $R^{38}$, the aromatic 5-membered ring or the aromatic 6-membered ring formed together by $R^{39}$ and $R^{40}$, the aromatic 5-membered ring or the aromatic 6-membered ring formed together by $R^{40}$ and $R^{41}$, or the aromatic 5-membered ring or the aromatic 6-membered ring formed together by $R^{41}$ and $R^{42}$, the ring represented by any one of General Formulas (C-1) to (C-9) is preferable, and the ring represented by General Formula (C-9) is more preferable since a compound having high thermal stability is obtained.

As the compound represented by ($II_3$-1), a compound in which all of $R^{23}$, $R^{24}$, $R^{25}$ and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $R^{29}$ and $R^{30}$ are each a trifluoromethyl group, a nitro group, a cyano group, or a phenyl group; both $Y^9$ and $Y^{10}$ are each a sulfur atom or an oxygen atom; $R^{31}$ and $R^{32}$ are each independently a hydrogen atom or a $C_{1-20}$ alkyl group, or $R^{31}$ and $R^{32}$ together form a phenyl group which may have a substituent; and $R^{33}$ and $R^{34}$ are each independently a hydrogen atom or a $C_{1-20}$ alkyl group, or $R^{33}$ and $R^{34}$ together form a phenyl group which may have a substituent is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $R^{29}$ and $R^{30}$ are each a trifluoromethyl group, a nitro group, or a cyano group; both $Y^9$ and $Y^{10}$ are each a sulfur atom or an oxygen atom; $R^{31}$ and $R^{32}$ are each independently a hydrogen atom or a $C_{1-20}$ alkyl group, or $R^{31}$ and $R^{32}$ together form an unsubstituted phenyl group or a phenyl group substituted with a $C_{1-10}$ alkyl group; and $R^{33}$ and $R^{34}$ are each independently a hydrogen atom or a $C_{1-20}$ alkyl group, or $R^{33}$ and $R^{34}$ together form an unsubstituted phenyl group or a phenyl group substituted with a $C_{1-10}$ alkyl group is more preferable since the light-emitting efficiency is high and the compatibility with respect to a resin is excellent.

As the compound represented by ($II_3$-2), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $R^{29}$ and $R^{30}$ are each a trifluoromethyl group, a nitro group, a cyano group, or a phenyl group; $R^{35}$, $R^{36}$, $R^{37}$, and $R^{38}$ are each independently a hydrogen atom or a $C_{1-20}$ alkyl group, or $R^{35}$ and $R^{36}$ together form a phenyl group which may have a substituent, and $R^{37}$ and $R^{38}$ are each independently a hydrogen atom or a $C_{1-20}$ alkyl group, or $R^{36}$ and $R^{37}$ together form a phenyl group which may have a substituent, and $R^{35}$ and $R^{38}$ are each independently a hydrogen atom or a $C_{1-20}$ alkyl group, or $R^{37}$ and $R^{38}$ together form a phenyl group which may have a substituent, and $R^{35}$ and $R^{36}$ are each independently a hydrogen atom or a $C_{1-20}$ alkyl group; and $R^{39}$, $R^{40}$, $R^{41}$, and $R^{42}$ are each independently a hydrogen atom or a $C_{1-20}$ alkyl group, or $R^{39}$ and $R^{40}$ together form a phenyl group which may have a substituent, and $R^{41}$ and $R^{42}$ are each independently a hydrogen atom or a $C_{1-20}$ alkyl group, or $R^{40}$ and $R^{41}$ together form a phenyl group which may have a substituent, and $R^{39}$ and $R^{42}$ are each independently a hydrogen atom or a $C_{1-20}$ alkyl group, or $R^{41}$ and $R^{42}$ together form a phenyl group which may have a substituent, and $R^{39}$ and $R^{40}$ are each independently a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $R^{29}$ and $R^{30}$ are each a trifluoromethyl group, a nitro group, or a cyano group; $R^{35}$, $R^{36}$, $R^{37}$, and $R^{38}$ are each independently a hydrogen atom or a $C_{1-20}$ alkyl group, or $R^{35}$ and $R^{36}$ together form an unsubstituted phenyl group or a phenyl group substituted with a $C_{1-10}$ alkyl group, and $R^{37}$ and $R^{38}$ are each independently a hydrogen atom or a $C_{1-20}$ alkyl group, or $R^{36}$ and $R^{37}$ together form an unsubstituted phenyl group or a phenyl group substituted with a $C_{1-10}$ alkyl group, and $R^{35}$ and $R^{38}$ are each independently a hydrogen atom or a $C_{1-20}$ alkyl group, or $R^{37}$ and $R^{38}$ together form an unsubstituted phenyl group or a phenyl group substituted with a $C_{1-10}$ alkyl group, and $R^{35}$ and $R^{36}$ are each independently a hydrogen atom or a $C_{1-20}$ alkyl group; and $R^{39}$, $R^{40}$, $R^{41}$, and $R^{42}$ are each independently a hydrogen atom or a $C_{1-20}$ alkyl group, or $R^{39}$ and $R^{40}$ together form an unsubstituted phenyl group or a phenyl group substituted with a $C_{1-10}$ alkyl group, and $R^{41}$ and $R^{42}$ are each independently a hydrogen atom or a $C_{1-20}$ alkyl group, or $R^{40}$ and $R^{41}$ together form an unsubstituted phenyl group or a phenyl group substituted with a $C_{1-10}$ alkyl group, and $R^{39}$ and $R^{42}$ are each independently a hydrogen atom or a $C_{1-20}$ alkyl group, or $R^{41}$ and $R^{42}$ together form an unsubstituted phenyl group or a phenyl group substituted with a $C_{1-10}$ alkyl group, and $R^{39}$ and $R^{40}$ are each independently a hydrogen atom or a $C_{1-20}$ alkyl group is more preferable since the light-emitting efficiency is high and the compatibility with respect to a resin is excellent.

As the compound represented by ($II_3$-3), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $R^{29}$ and $R^{30}$ are each a trifluoromethyl group, a nitro group, a cyano group, or a phenyl group; both $X^1$ and $X^2$ are each a nitrogen atom; $R^{36}$, $R^{37}$, and $R^{38}$ are each independently a hydrogen atom or a $C_{1-20}$ alkyl group, or $R^{36}$ and $R^{37}$ together form a phenyl group which may have a substituent, and $R^{38}$ is a hydrogen atom or a $C_{1-20}$ alkyl group, or $R^{37}$ and $R^{38}$ together form a phenyl group which may have a substituent, and $R^{36}$ is a hydrogen atom or a $C_{1-20}$ alkyl group; and $R^{40}$, $R^{41}$, and $R^{42}$ are each independently a hydrogen atom or a $C_{1-20}$ alkyl group, or $R^{40}$ and $R^{41}$ together form a phenyl group which may have a substituent, and $R^{42}$ is a hydrogen atom or a $C_{1-20}$ alkyl group, or $R^{41}$ and $R^{42}$ together form a phenyl group which may have a substituent, and $R^{40}$ is a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $R^{29}$ and $R^{30}$ are each a trifluoromethyl group, a nitro group, or a cyano group; both $X^1$ and $X^2$ are each a nitrogen atom; $R^{36}$, $R^{37}$, and $R^{38}$ are each independently a hydrogen atom or a $C_{1-20}$ alkyl group, or $R^{36}$ and $R^{37}$ together form an unsubstituted phenyl group or a phenyl group substituted with a $C_{1-10}$ alkyl group, and $R^{38}$ is a hydrogen atom or a $C_{1-20}$ alkyl group, or $R^{37}$ and $R^{38}$ together form an unsubstituted phenyl group or a phenyl group substituted with a $C_{1-10}$ alkyl group, and $R^{36}$ is a hydrogen atom or a $C_{1-20}$ alkyl group; and $R^{40}$, $R^{41}$ and $R^{42}$ are each independently a hydrogen atom or a $C_{1-20}$ alkyl group, or $R^{40}$ and $R^{41}$ together form an unsubstituted phenyl group or a phenyl group substituted with a $C_{1-10}$ alkyl group, and $R^{42}$ is a hydrogen atom or a $C_{1-20}$ alkyl group, or $R^{41}$ and $R^{42}$ together form an unsubstituted phenyl group or a phenyl group substituted with a $C_{1-10}$ alkyl group, and $R^{40}$ is a hydrogen atom or a $C_{1-20}$ alkyl group is more preferable since the light-emitting efficiency is high and the compatibility with respect to a resin is excellent.

As the compound represented by ($II_3$-4), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $R^{29}$ and $R^{30}$ are each a trifluoromethyl group, a nitro group, a cyano group, or a phenyl group; both $X^1$ and $X^2$ are each a nitrogen atom; $R^{35}$, $R^{36}$, and $R^{37}$ are each independently a hydrogen atom or a $C_{1-20}$ alkyl group, or $R^{35}$ and $R^{36}$ together form a phenyl group which may have a substituent, and $R^{37}$ is a hydrogen atom or a $C_{1-20}$ alkyl group, or $R^{36}$ and $R^{37}$ together form a phenyl group which may have a substituent, and $R^{35}$ is a hydrogen atom or a $C_{1-20}$ alkyl group; and $R^{39}$, $R^{40}$, and $R^{41}$ are each independently a hydrogen atom or a $C_{1-20}$ alkyl group, or $R^{39}$ and $R^{40}$ together form a phenyl group which may have a substituent, and $R^{41}$ is a hydrogen atom or a $C_{1-20}$ alkyl group, or $R^{40}$ and $R^{41}$ together form a phenyl group which may have a substituent, and $R^{39}$ is a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $R^{29}$ and $R^{30}$ are each a trifluoromethyl group, a nitro group, or a cyano group; both $X^1$ and $X^2$ are each a nitrogen atom; $R^{35}$, $R^{36}$, and $R^{37}$ are each independently a hydrogen atom or a $C_{1-20}$ alkyl group, or $R^{35}$ and $R^{36}$ together form an unsubstituted phenyl group or a phenyl group substituted with a $C_{1-10}$ alkyl group, and $R^{37}$ is a hydrogen atom or a $C_{1-20}$ alkyl group, or $R^{36}$ and $R^{37}$ together form an unsubstituted phenyl group or a phenyl group substituted with a $C_{1-10}$ alkyl group, and $R^{35}$ is a hydrogen atom or a $C_{1-20}$ alkyl group; and $R^{39}$, $R^{40}$, and $R^{41}$ are each independently a hydrogen atom or a $C_{1-20}$ alkyl group, or $R^{39}$ and $R^{40}$ together form an unsubstituted phenyl group or a phenyl group substituted with a $C_{1-10}$ alkyl group, and $R^{41}$ is a hydrogen atom or a $C_{1-20}$ alkyl group, or $R^{40}$ and $R^{41}$ together form an unsubstituted phenyl group or a phenyl group substituted with a $C_{1-10}$ alkyl group, and $R^{39}$ is a hydrogen atom or a $C_{1-20}$ alkyl group is more preferable since the light-emitting efficiency is high and the compatibility with respect to a resin is excellent.

As the compound represented by ($II_3$-5), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $R^{29}$ and $R^{30}$ are each a trifluoromethyl group, a nitro group, a cyano group, or a phenyl group; both $X^1$ and $X^2$ are each a nitrogen atom; $R^{35}$, $R^{36}$, and $R^{38}$ are each independently a hydrogen atom or a $C_{1-20}$ alkyl group, or $R^{35}$ and $R^{36}$ together form a phenyl group which may have a substituent, and $R^{38}$ is a hydrogen atom or a $C_{1-20}$ alkyl group; and $R^{39}$, $R^{40}$, and $R^{42}$ are each independently a hydrogen atom or a $C_{1-20}$ alkyl group, or $R^{39}$ and $R^{40}$ together form a phenyl group which may have a substituent, and $R^{42}$ is a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $R^{29}$ and $R^{30}$ are each a trifluoromethyl group, a nitro group, or a cyano group; both $X^1$ and $X^2$ are each a nitrogen atom; $R^{35}$, $R^{36}$, and $R^{38}$ are each independently a hydrogen atom or a $C_{1-20}$ alkyl group, or $R^{35}$ and $R^{36}$ together form an unsubstituted phenyl group or a phenyl group substituted with a $C_{1-10}$ alkyl group, and $R^{38}$ is a hydrogen atom or a $C_{1-20}$ alkyl group; and $R^{39}$, $R^{40}$, and $R^{42}$ are each independently a hydrogen atom or a $C_{1-20}$ alkyl group, or $R^{39}$ and $R^{40}$ together form an unsubstituted phenyl group or a phenyl group substituted with a $C_{1-10}$ alkyl group, and $R^{42}$ is a hydrogen atom or a $C_{1-20}$ alkyl group is preferable since the light-emitting efficiency is high and the compatibility with respect to a resin is excellent.

As the compound represented by ($II_3$-6), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $R^{29}$ and $R^{30}$ are each a trifluoromethyl group, a nitro group, a cyano group, or a phenyl group; both $X^1$ and $X^2$ are each a nitrogen atom; $R^{35}$, $R^{37}$, and $R^{38}$ are each independently a hydrogen atom or a $C_{1-20}$ alkyl group, or $R^{37}$ and $R^{38}$ together form a phenyl group which may have a substituent, and $R^{35}$ is a hydrogen atom or a $C_{1-20}$ alkyl group; and $R^{39}$, $R^{41}$, and $R^{42}$ are each independently a hydrogen atom or a $C_{1-20}$ alkyl group, or $R^{41}$ and $R^{42}$ together form a phenyl group which may have a substituent, and $R^{39}$ is a hydrogen atom or a $C_{1-20}$ alkyl group is preferable, and a compound in which all of $R^{23}$, $R^{24}$, $R^{25}$ and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $R^{29}$ and $R^{30}$ are each a trifluoromethyl group, a nitro group, or a cyano group; both $X^1$ and $X^2$ are each a nitrogen atom; $R^{35}$, $R^{37}$, and $R^{38}$ are each independently a hydrogen atom or a $C_{1-20}$ alkyl group, or $R^{37}$ and $R^{38}$ together form an unsubstituted phenyl group or a phenyl group substituted with a $C_{1-10}$ alkyl group, and $R^{35}$ is a hydrogen atom or a $C_{1-20}$ alkyl group; and $R^{39}$, $R^{41}$, and $R^{42}$ are each independently a hydrogen atom or a $C_{1-20}$ alkyl group, or $R^{41}$ and $R^{42}$ together form an unsubstituted phenyl group or a phenyl group substituted with a $C_{1-10}$ alkyl group, and $R^{39}$ is a hydrogen atom or a $C_{1-20}$ alkyl group is more preferable since the light-emitting efficiency is high and the compatibility with respect to a resin is excellent.

As the compound represented by ($II_4$-1), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $Y^9$ and $Y^{10}$ are each a sulfur atom or an oxygen atom; $R^{31}$ and $R^{32}$ are each independently a hydrogen atom or a $C_{1-20}$ alkyl group, or $R^{31}$ and $R^{32}$ together form a phenyl group which may have a substituent; and $R^{33}$ and $R^{34}$ are each independently a hydrogen atom or a $C_{1-20}$ alkyl group, or $R^{33}$ and $R^{34}$ together form a phenyl group which may have a substituent is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $Y^9$ and $Y^{10}$ are each a sulfur atom or an oxygen atom; $R^{31}$ and $R^{32}$ are each independently a hydrogen atom or a $C_{1-20}$ alkyl group, or $R^{31}$ and $R^{32}$ together form an unsubstituted phenyl group or a phenyl group substituted with a $C_{1-10}$ alkyl group; and $R^{33}$ and $R^{34}$ are each independently a hydrogen atom or a $C_{1-20}$ alkyl group, or $R^{33}$ and $R^{34}$ together form an unsubstituted phenyl group or a phenyl group substituted with a $C_{1-10}$ alkyl group is more preferable since the light-emitting efficiency is high and the compatibility with respect to a resin is excellent.

As the compound represented by ($II_4$-2), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; $R^{35}$, $R^{36}$, $R^{37}$, and $R^{38}$ are each independently a hydrogen atom or a $C_{1-20}$ alkyl group, or $R^{35}$ and $R^{36}$ together form a phenyl group which may have a substituent, and $R^{37}$ and $R^{38}$ are each independently a hydrogen atom or a $C_{1-20}$ alkyl group, or $R^{36}$ and $R^{37}$ together form a phenyl group which may have a substituent, and $R^{35}$ and $R^{38}$ are each independently a hydrogen atom or a $C_{1-20}$ alkyl group, or $R^{37}$ and $R^{38}$ together form a phenyl group which may have a substituent, and $R^{35}$ and $R^{36}$ are each independently a hydrogen atom or a $C_{1-20}$ alkyl group; and $R^{39}$, $R^{40}$, $R^{41}$, and $R^{42}$ are each independently a hydrogen atom or a $C_{1-20}$ alkyl group, or $R^{39}$ and $R^{40}$ together form a phenyl group which may have a substituent, and $R^{41}$ and $R^{42}$ are each independently a hydrogen atom or a $C_{1-20}$ alkyl group, or $R^{40}$ and $R^{41}$ together form a phenyl group which may have a substituent, and $R^{39}$ and $R^{42}$ are each independently a hydrogen atom or a $C_{1-20}$ alkyl group, or $R^{41}$ and $R^{42}$ together form a phenyl group which may have a substituent, and $R^{39}$ and $R^{42}$ are each independently a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; $R^{35}$, $R^{36}$, $R^{37}$, and $R^{38}$ are each independently a hydrogen atom or a $C_{1-20}$ alkyl group, or $R^{35}$ and $R^{36}$ together form an unsubstituted phenyl group or a phenyl group substituted with a $C_{1-10}$ alkyl group, and $R^{37}$ and $R^{38}$ are each independently a hydrogen atom or a $C_{1-20}$ alkyl group, or $R^{36}$ and $R^{37}$ together form an unsubstituted phenyl group or a phenyl group substituted with a $C_{1-10}$ alkyl group, and $R^{35}$ and $R^{38}$ are each independently a hydrogen atom or a $C_{1-20}$ alkyl group, or $R^{37}$ and $R^{38}$ together form an unsubstituted phenyl group or a phenyl group substituted with a $C_{1-10}$ alkyl group, and $R^{35}$ and $R^{36}$ are each independently a hydrogen atom or a $C_{1-20}$ alkyl group; and $R^{39}$, $R^{40}$, $R^{41}$, and $R^{42}$ are each independently a hydrogen atom or a $C_{1-20}$ alkyl group, or $R^{39}$ and $R^{40}$ together form an unsubstituted phenyl group or a phenyl group substituted with a $C_{1-10}$ alkyl group, and $R^{41}$ and $R^{42}$ are each independently a hydrogen atom or a $C_{1-20}$ alkyl group, or $R^{40}$ and $R^{41}$ together form an unsubstituted phenyl group or a phenyl group substituted with a $C_{1-10}$ alkyl group, and $R^{39}$ and $R^{42}$ are each independently a hydrogen atom or a $C_{1-20}$ alkyl group, or $R^{41}$ and $R^{42}$ together form an unsubstituted phenyl group or a phenyl group substituted with a $C_{1-10}$ alkyl group, and $R^{39}$ and $R^{42}$ are each independently a hydrogen atom or a $C_{1-20}$ alkyl group is more preferable since the light-emitting efficiency is high and the compatibility with respect to a resin is excellent.

As the compound represented by ($II_4$-3), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $X^1$ and $X^2$ are each a nitrogen atom; $R^{36}$, $R^{37}$, and $R^{38}$ are each independently a hydrogen atom or a $C_{1-20}$ alkyl group, or $R^{36}$ and $R^{37}$ together form a phenyl group which may have a substituent, and $R^{38}$ is a hydrogen atom or a $C_{1-20}$ alkyl group, or $R^{37}$ and $R^{38}$ together form a phenyl group which may have a substituent, and $R^{36}$ is a hydrogen atom or a $C_{1-20}$ alkyl group; and $R^{40}$, $R^{41}$, and $R^{42}$ are each independently a hydrogen atom or a $C_{1-20}$ alkyl group, or $R^{40}$ and $R^{41}$ together form a phenyl group which may have a substituent, and $R^{42}$ is a hydrogen atom or a $C_{1-20}$ alkyl group, or $R^{41}$ and $R^{42}$ together form a phenyl group which may have a substituent, and $R^{40}$ is a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; $R^{36}$, $R^{37}$, and $R^{38}$ are each independently a hydrogen atom or a $C_{1-20}$ alkyl group, or $R^{36}$ and $R^{37}$ together form an unsubstituted phenyl group or a phenyl group substituted with a $C_{1-10}$ alkyl group, and $R^{38}$ is a hydrogen atom or a $C_{1-20}$ alkyl group, or $R^{37}$ and $R^{38}$ together form an unsubstituted phenyl group or a phenyl group substituted with a $C_{1-10}$ alkyl group, and $R^{36}$ is a hydrogen atom or a $C_{1-20}$ alkyl group; and $R^{40}$, $R^{41}$, and $R^{42}$ are each independently a hydrogen atom or a $C_{1-20}$ alkyl group, or $R^{40}$ and $R^{41}$ together form an unsubstituted phenyl group or a phenyl group substituted with a $C_{1-10}$ alkyl group, and $R^{42}$ is a hydrogen atom or a $C_{1-20}$ alkyl group, or $R^{41}$ and $R^{42}$ together form an unsubstituted phenyl group or a phenyl group substituted with a $C_{1-10}$ alkyl group, and $R^{40}$ is a hydrogen atom or a $C_{1-20}$ alkyl group is more preferable since the light-emitting efficiency is high and the compatibility with respect to a resin is excellent.

As the compound represented by ($II_4$-4), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $X^1$ and $X^2$ are each a nitrogen atom; $R^{35}$, $R^{36}$, and $R^{37}$ are each independently a hydrogen atom or a $C_{1-20}$ alkyl group, or $R^{35}$ and $R^{36}$ together form a phenyl group which may have a substituent, and $R^{37}$ is a hydrogen atom or a $C_{1-20}$ alkyl group, or $R^{36}$ and $R^{37}$ together form a phenyl group which may have a substituent, and $R^{35}$ is a hydrogen atom or a $C_{1-20}$ alkyl group; and $R^{39}$, $R^{40}$, and $R^{41}$ are each independently a hydrogen atom or a $C_{1-20}$ alkyl group, or $R^{39}$ and $R^{40}$ together form a phenyl group which may have a substituent, and $R^{41}$ is a hydrogen atom or a $C_{1-20}$ alkyl group, or $R^{40}$ and $R^{41}$ together form a phenyl group which may have a substituent, and $R^{39}$ is a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $X^1$ and $X^2$ are each a nitrogen atom; $R^{35}$, $R^{36}$, and $R^{37}$ are each independently a hydrogen atom or a $C_{1-20}$ alkyl group, or $R^{35}$ and $R^{36}$ together form an unsubstituted phenyl group or a phenyl group substituted with a $C_{1-10}$ alkyl group, and $R^{37}$ is a hydrogen atom or a $C_{1-20}$ alkyl group, or $R^{36}$ and $R^{37}$ together form an unsubstituted phenyl group or a phenyl group substituted with a $C_{1-10}$ alkyl group, and $R^{35}$ is a hydrogen atom or a $C_{1-20}$ alkyl group; and $R^{39}$, $R^{40}$, and $R^{41}$ are each independently a hydrogen atom or a $C_{1-20}$ alkyl group, or $R^{39}$ and $R^{40}$ together form an unsubstituted phenyl group or a phenyl group substituted with a $C_{1-10}$ alkyl group, and $R^{41}$ is a hydrogen atom or a $C_{1-20}$ alkyl group, or $R^{40}$ and $R^{41}$ together form an unsubstituted phenyl group or a phenyl group substituted with a $C_{1-10}$ alkyl group, and $R^{39}$ is a hydrogen atom or a $C_{1-20}$ alkyl group is more preferable since the light-emitting efficiency is high and the compatibility with respect to a resin is excellent.

As the compound represented by ($II_4$-5), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $X^1$ and $X^2$ are each a nitrogen atom; $R^{35}$, $R^{36}$, and $R^{38}$ are each independently a hydrogen atom or a $C_{1-20}$ alkyl group, or $R^{35}$ and $R^{36}$ together form a phenyl group which may have a substituent, and $R^{38}$ is a hydrogen atom or a $C_{1-20}$ alkyl group; and $R^{39}$, $R^{40}$, and $R^{42}$ are each independently a hydrogen atom or a $C_{1-20}$ alkyl group, or $R^{39}$ and $R^{40}$ together form a phenyl group which may have a substituent, and $R^{42}$ is a hydrogen atom or a $C_{1-20}$ alkyl group is preferable, and a compound in which all of $R^{23}$, $R^{24}$, $R^{25}$ and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $X^1$ and $X^2$ are each a nitrogen atom; $R^{35}$, $R^{36}$, and $R^{38}$ are each independently a hydrogen atom or a $C_{1-20}$ alkyl group, or $R^{35}$ and $R^{36}$ together form an unsubstituted phenyl group or a phenyl group substituted with a $C_{1-10}$ alkyl group, and $R^{38}$ is a hydrogen atom or a $C_{1-20}$ alkyl group; and $R^{39}$, $R^{40}$, and $R^{42}$ are each independently a hydrogen atom or a $C_{1-20}$ alkyl group, or $R^{39}$ and $R^{40}$ together form an unsubstituted phenyl group or a phenyl group substituted with a $C_{1-10}$ alkyl group, and $R^{42}$ is a hydrogen atom or a $C_{1-20}$ alkyl group is more preferable since the light-emitting efficiency is high and the compatibility with respect to a resin is excellent.

As the compound represented by ($II_4$-6), a compound in which all of $R^{23}$, $R^{24}$, $R^{25}$, and $R^{26}$ are each a halogen atom, an unsubstituted phenyl group, or a phenyl group substituted with a $C_{1-10}$ alkyl group or a $C_{1-10}$ alkoxy group; both $R^{27}$ and $R^{28}$ are each a hydrogen atom, an unsubstituted phenyl group, or a phenyl group substituted with a $C_{1-20}$ alkyl group or a $C_{1-20}$ alkoxy group; both $X^1$ and $X^2$ are each a nitrogen atom; $R^{35}$, $R^{37}$, and $R^{38}$ are each independently a hydrogen atom or a $C_{1-20}$ alkyl group, or $R^{37}$ and $R^{38}$ together form a phenyl group which may have a substituent, and $R^{35}$ is a hydrogen atom or a $C_{1-20}$ alkyl group; and $R^{39}$, $R^{41}$, and $R^{42}$ are each independently a hydrogen atom or a $C_{1-20}$ alkyl group, or $R^{41}$ and $R^{42}$ together form a phenyl group which may have a substituent, and $R^{39}$ is a hydrogen atom or a $C_{1-20}$ alkyl group is preferable, and a compound in which all of $R^{23}$, $R^{24}$, $R^{25}$, and $R^{26}$ are each a halogen atom or an unsubstituted phenyl group; both $R^{27}$ and $R^{28}$ are each a hydrogen atom, an unsubstituted phenyl group, or a phenyl group substituted with a linear or branched $C_{1-20}$ alkoxy group; both $X^1$ and $X^2$ are each a nitrogen atom; $R^{35}$, $R^{37}$, and $R^{38}$ are each independently a hydrogen atom or a $C_{1-20}$ alkyl group, or $R^{37}$ and $R^{38}$ together form an unsubstituted phenyl group or a phenyl group substituted with a $C_{1-10}$ alkyl group, and $R^{35}$ is a hydrogen atom or a $C_{1-20}$ alkyl group; and $R^{39}$, $R^{41}$, and $R^{42}$ are each independently a hydrogen atom or a $C_{1-20}$ alkyl group, or $R^{41}$ and $R^{42}$ together form an unsubstituted phenyl group or a phenyl group substituted with a $C_{1-10}$ alkyl group, and $R^{39}$ is a hydrogen atom or a $C_{1-20}$ alkyl group is more preferable since the light-emitting efficiency is high and the compatibility with respect to a resin is excellent.

As the compound represented by any one of ($II_3$-1) to ($II_3$-6), a compound represented by any one of the following General Formulas ($II_3$-7) to ($II_3$-9) is preferable, and as the compound represented by any one of ($II_4$-1) to ($II_4$-6), a compound represented by any one of the following General Formulas ($II_4$-7) to ($II_4$-9) is preferable.

[Chem. 15]

($II_3$-7)

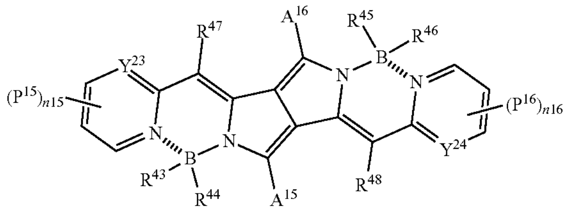

($II_3$-8)

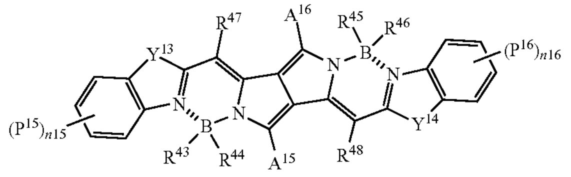

-continued (II$_3$-9)

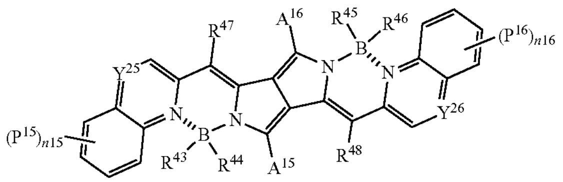

(II$_4$-7)

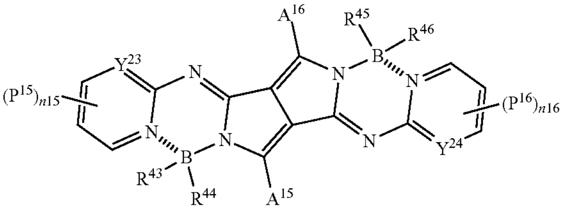

(II$_4$-8)

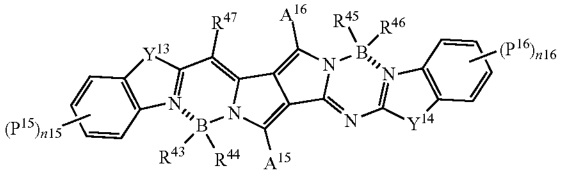

(II$_4$-9)

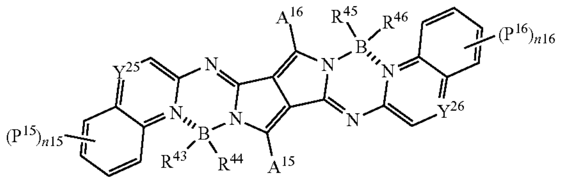

In General Formulas (II$_3$-7) and (II$_4$-7), each of $Y^{23}$ and $Y^{24}$ independently represents a carbon atom or a nitrogen atom. In General Formula (II$_3$-7) and the like, $Y^{23}$ and $Y^{24}$ are preferably the same type of atoms.

In General Formulas (II$_3$-8) and (II$_4$-8), each of $Y^{13}$ and $Y^{14}$ independently represents an oxygen atom or a sulfur atom. In General Formula (II$_3$-8) and the like, $Y^{23}$ and $Y^{24}$ are preferably the same type of atoms.

In General Formulas (II$_3$-9) and (II$_4$-9), each of $Y^{25}$ and $Y^{26}$ independently represents a carbon atom or a nitrogen atom. In General Formula (II$_3$-9) and the like, $Y^{25}$ and $Y^{26}$ are preferably the same type of atoms.

In General Formulas (II$_3$-7) to (II$_3$-9), each of $R^{47}$ and $R^{48}$ independently represents a hydrogen atom or an electron-withdrawing group, and since fluorescence intensity becomes high, each of $R^{47}$ and $R^{48}$ is preferably a trifluoromethyl group, a cyano group, a nitro group, a sulfonyl group, or a phenyl group, and particularly preferably a trifluoromethyl group or a cyano group. In General Formula (II$_3$-7) and the like, $R^{47}$ and $R^{48}$ are preferably the same type of functional groups.

In General Formulas (II$_3$-7) to (II$_3$-9) and (II$_4$-7) to (II$_4$-9), each of $R^{43}$, $R^{44}$, $R^{45}$, and $R^{46}$ represents a halogen atom or an aryl group which may have a substituent. As the aryl group, those exemplified as the "arbitrary group which does not inhibit fluorescence of a compound" represented by each of $R^a$ and $R^b$ can be used. In addition, the substituent which the aryl group may have may be an "arbitrary group which does not inhibit fluorescence of a compound", and examples thereof include a $C_{1-6}$ alkyl group, a $C_{1-6}$ alkoxy group, an aryl group, and a heteroaryl group. In General Formulas (II$_3$-7) to (II$_3$-9) and (II$_4$-7) to (II$_4$-9), $R^{43}$ to $R^{46}$ may be different groups, but it is preferable that all of them are the same group. As the compound represented by any one of General Formulas (II$_3$-7) to (II$_3$-9) and (II$_4$-7) to (II$_4$-9), a compound in which all of $R^{43}$ to $R^{46}$ are the same type of halogen atoms or phenyl groups which may have the same type of substituents is preferable, a compound in which all of $R^{43}$ to $R^{46}$ are fluorine atoms or unsubstituted phenyl groups is more preferable, and a compound in which all of $R^{43}$ to $R^{46}$ are fluorine atoms is particularly preferable.

In General Formulas (II$_3$-7) to (II$_3$-9) and (II$_4$-7) to (II$_4$-9), each of $P^{15}$ and $P^{16}$ independently represents a halogen atom, a $C_{1-20}$ alkyl group, a $C_{1-20}$ alkoxy group, an amino group, a monoalkylamino group, or a dialkylamino group. Examples of the $C_{1-20}$ alkyl group, the $C_{1-20}$ alkoxy group, the monoalkylamino group, or the dialkylamino group represented by each of $P^{15}$ and $P^{16}$ include the same as those exemplified as $R^g$, (p1) to (p3), or (q1) to (q3). Each of $P^{15}$ and $P^{16}$ is preferably a $C_{1-20}$ alkyl group, a $C_{1-20}$ alkoxy group, an (unsubstituted) phenyl group, a p-methoxyphenyl group, a p-ethoxyphenyl group, a p-dimethylaminophenyl group, a dimethoxyphenyl group, a thienyl group, or a furanyl group, more preferably a $C_{1-20}$ alkyl group, a $C_{1-20}$ alkoxy group, a phenyl group, a p-methoxyphenyl group, a p-ethoxyphenyl group, a dimethoxyphenyl group, a thienyl group, or a furanyl group from the viewpoint of safety with respect to a living body, and these substituents may further have a substituent. Here, since, even in the case of a substituent other than these substituents, it is possible to improve safety by further introducing a suitable substituent, the present invention is not limited to these substituents.

In General Formulas (II$_3$-7) to (II$_3$-9) and (II$_4$-7) to (II$_4$-9), each of n15 and n16 independently represents an integer of 0 to 3. In a case where a plurality of $P^{15}$s are present in one molecule (that is, in a case where n15 is 2 or 3), all of the plurality of $P^{15}$s may be the same type of functional groups, or may be different types of functional groups. The same applies to $P^{16}$.

In General Formulas (II$_3$-7) to (II$_3$-9) and (II$_4$-7) to (II$_4$-9), each of $A^{15}$ and $A^{16}$ independently represents a phenyl group which may have one to three substituents selected from the group consisting of a hydrogen atom, a halogen atom, a $C_{1-20}$ alkyl group, a $C_{1-20}$ alkoxy group, an amino group, a monoalkylamino group, and a dialkylamino group. Examples of the $C_{1-20}$ alkyl group, the $C_{1-20}$ alkoxy group, the monoalkylamino group, or the dialkylamino group as the substituent which the phenyl group may have are the same as those exemplified as $R^g$, (p1) to (p3), or (q1) to (q3). Each of $A^{15}$ and $A^{16}$ is preferably an unsubstituted phenyl group, a phenyl group having one or two $C_{1-20}$ alkoxy groups as the substituent, more preferably an unsubstituted phenyl group or a phenyl group having one $C_{1-20}$ alkoxy group as the substituent, and still more preferably an unsubstituted phenyl group or a phenyl group having one $C_{1-10}$ alkoxy group as the substituent. In addition, the compound represented by General Formula (II$_3$-7) and the like is preferably a compound in which $A^{15}$ and $A^{16}$ are the same type of functional groups.

Examples of the compound represented by any one of (II$_3$-1) to (II$_3$-6) include a compound represented by any one of the following General Formulas (6-1) to (6-12) and (7-1) to (7-12). In General Formulas (6-7) to (6-12) and (7-7) to (7-12), Ph means an unsubstituted phenyl group. As the DPP-based boron complex used in the present invention, in particular, compounds represented by General Formulas (6-4), (6-5), (6-7), (6-8), (7-4), (7-5), (7-7), or (7-8) are preferable, and compounds represented by General Formulas (6-4), (6-5), (6-7), or (6-8) are more preferable.

In General Formulas (6-1) to (6-12) and (7-1) to (7-12), each of $P^5$ to $P^8$ independently represents a halogen atom, a $C_{1-20}$ alkyl group, a $C_{1-20}$ alkoxy group, an amino group, a monoalkylamino group, or a dialkylamino group. Examples of the $C_{1-20}$ alkyl group, the $C_{1-20}$ alkoxy group, the monoalkylamino group, or the dialkylamino group represented by each of $P^5$ to $P^8$ include the same as those exemplified as $R^g$, (p1) to (p3), or (q1) to (q3). Each of $P^5$ to $P^8$ is preferably a $C_{1-20}$ alkyl group, a $C_{1-20}$ alkoxy group, an (unsubstituted) phenyl group, a p-methoxyphenyl group, a p-ethoxyphenyl group, a p-dimethylaminophenyl group, a dimethoxyphenyl group, a thienyl group, or a furanyl group, from the viewpoint of safety with respect to a living body, more preferably a $C_{1-20}$ alkyl group, a $C_{1-20}$ alkoxy group, a phenyl group, a p-methoxyphenyl group, a p-ethoxyphenyl group, a dimethoxyphenyl group, a thienyl group, or a furanyl group, still more preferably a $C_{1-20}$ alkyl group or a $C_{1-20}$ alkoxy group, and even more preferably a $C_{1-10}$ alkyl group or a $C_{1-10}$ alkoxy group, and these substituents may further have a substituent. Here, since, even in the case of a substituent other than these substituents, it is possible to improve safety by further introducing a suitable substituent, the present invention is not limited to these substituents.

In General Formulas (6-1) to (6-12) and (7-1) to (7-12), each of n5 to n8 independently represents an integer of 0 to 3. In a case where a plurality of $P^5$s are present in one molecule (that is, in a case where n5 is 2 or 3), all of the plurality of $P^5$s may be the same type of functional groups, or may be different types of functional groups. The same applies to $P^6$ to $P^8$.

[Chem. 16]

(6-1)

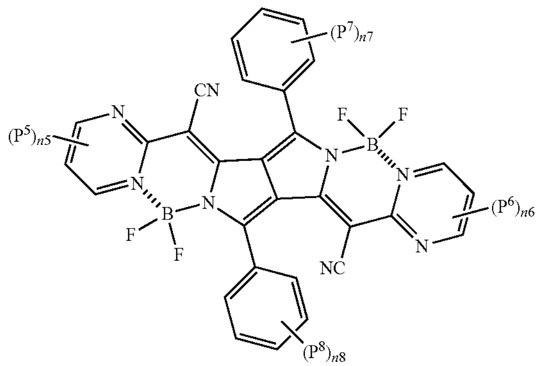

(6-2)

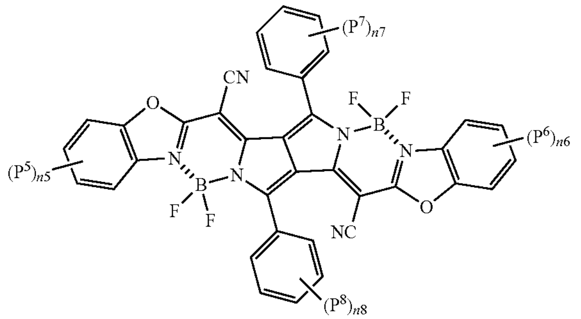

-continued (6-3)

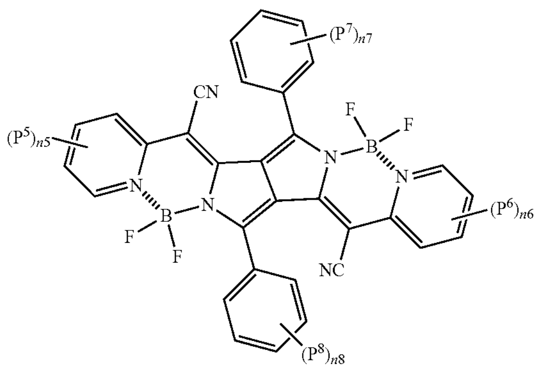

(6-4)

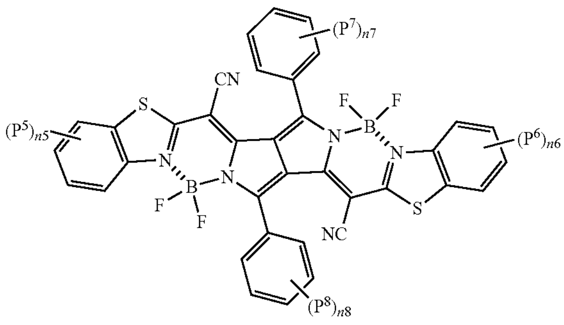

(6-5)

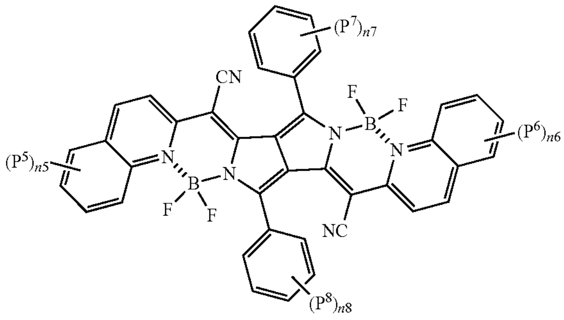

(6-6)

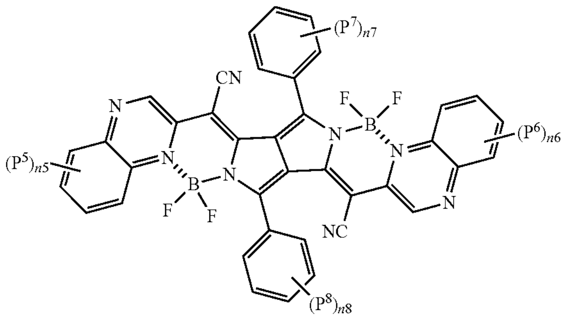

-continued
[Chem. 17]
(6-7)
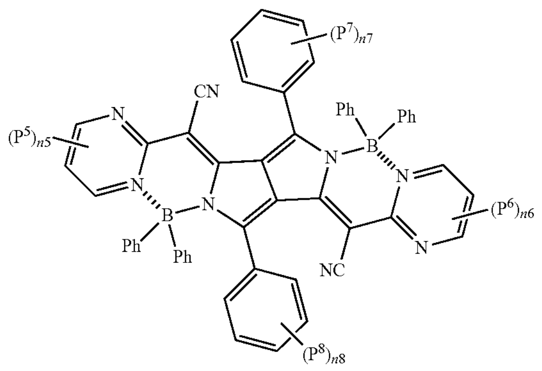
(6-8)
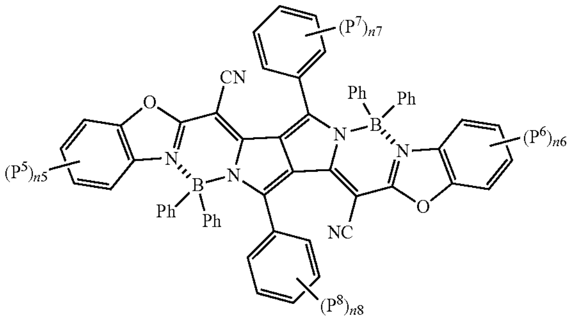
(6-9)
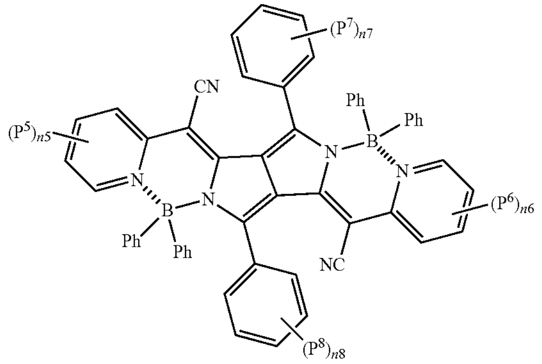
(6-10)
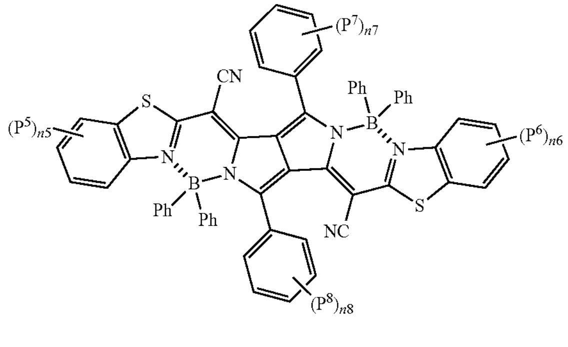
-continued
(6-11)
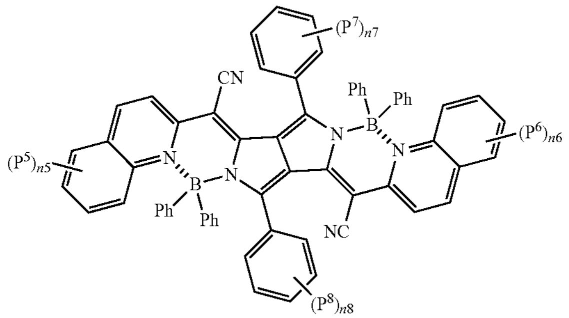
(6-12)
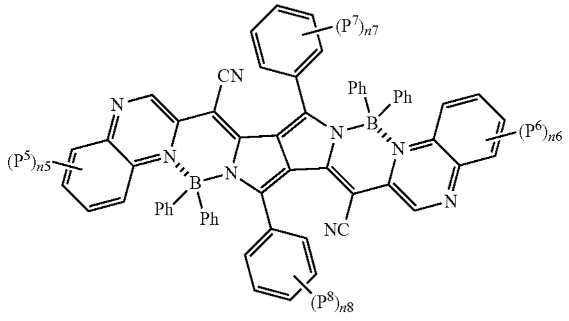
[Chem. 18]
(7-1)
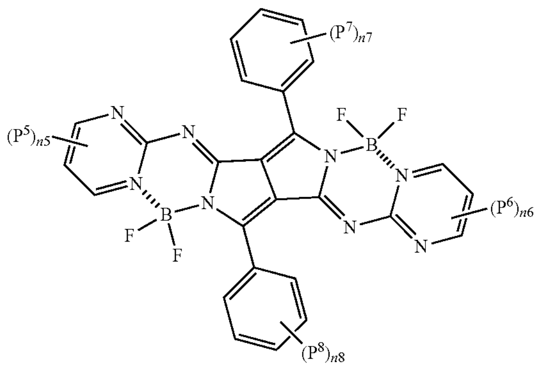
(7-2)
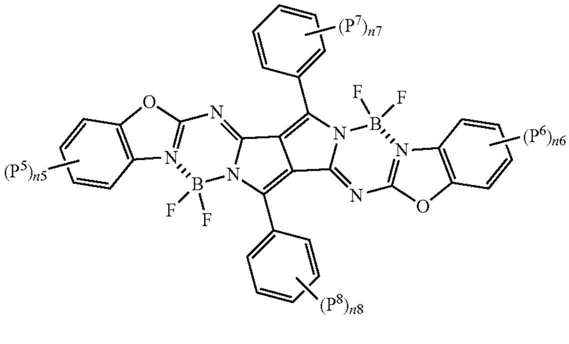

-continued
(7-3)
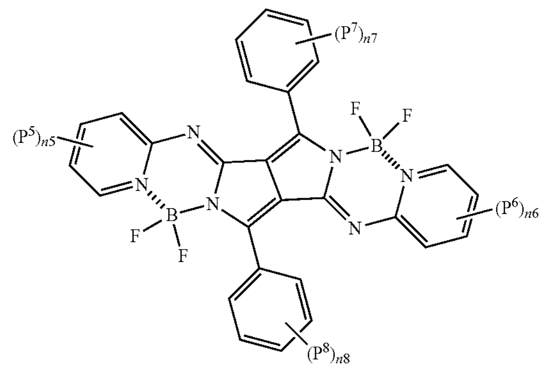
(7-4)
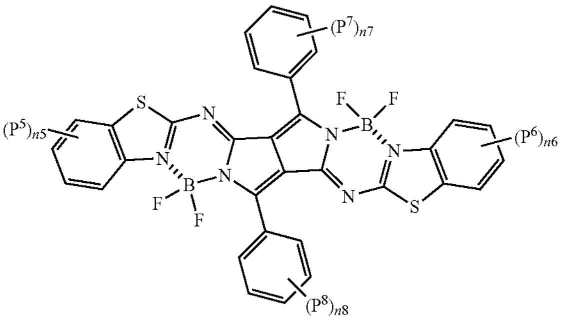
(7-5)
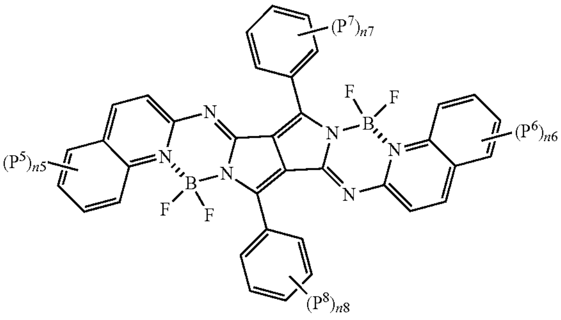
(7-6)
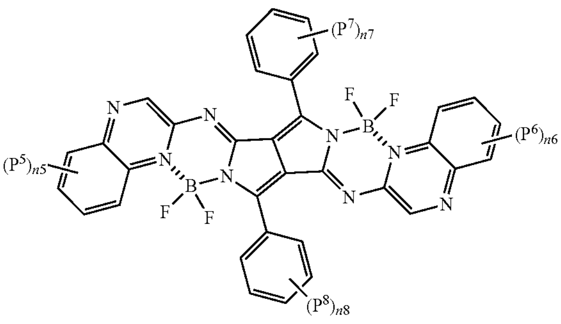
-continued
[Chem. 19]
(7-7)
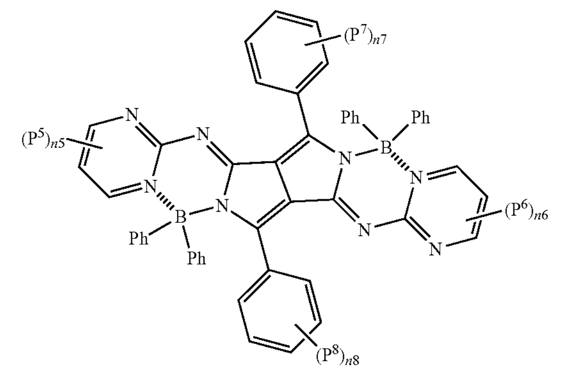
(7-8)
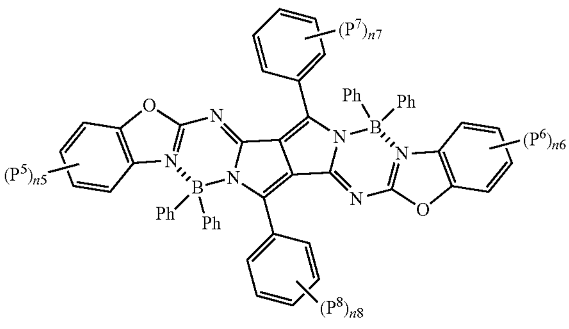
(7-9)
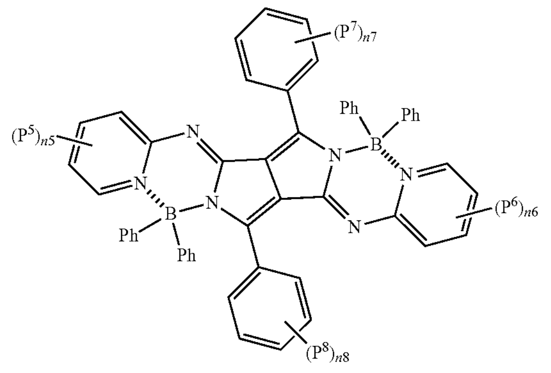
(7-10)
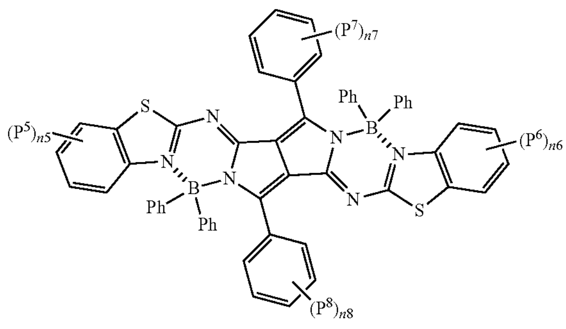

-continued (7-11)

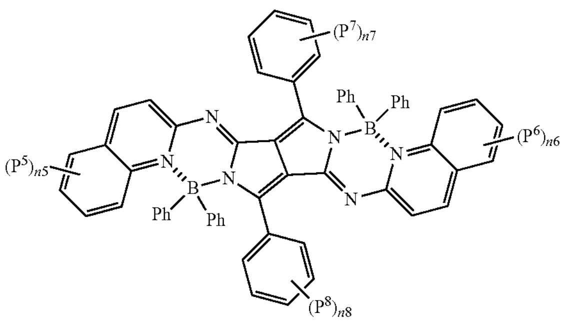

(7-12)

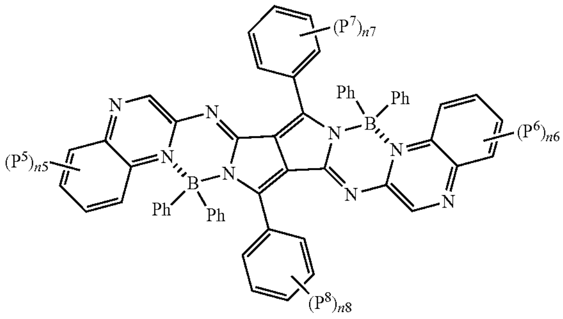

As the compounds represented by General Formulas (6-1) to (6-12) or (7-1) to (7-12), a compound in which each of $P^5$ to $P^8$ is independently a $C_{1-20}$ alkyl group or a $C_{1-20}$ alkoxy group and each of n5 to n8 is independently 0 to 2 is preferable, a compound in which each of $P^5$ and $P^6$ is independently a $C_{1-20}$ alkyl group, each of n5 and n6 is independently 0 to 2, each of $P^7$ and $P^8$ is independently a $C_{1-20}$ alkoxy group, and each of n7 and n8 is independently 0 or 1 is more preferable, and a compound in which each of $P^5$ and $P^6$ is independently a $C_{1-20}$ alkyl group, each of n5 and n6 is independently 1 or 2, each of $P^7$ and $P^8$ is independently a $C_{1-20}$ alkoxy group, and each of n7 and n8 is independently 1 is still more preferable.

Examples of the compound represented by each of General Formulas (6-1) to (6-12) include a compound represented by each of the following Formulas (6-1-1) to (6-12-1). "λ" is the peak wavelength of an absorption spectrum in a solution of each compound, and "Em" is the peak wavelength of a fluorescence spectrum.

[Chem. 20]

(6-1-1)

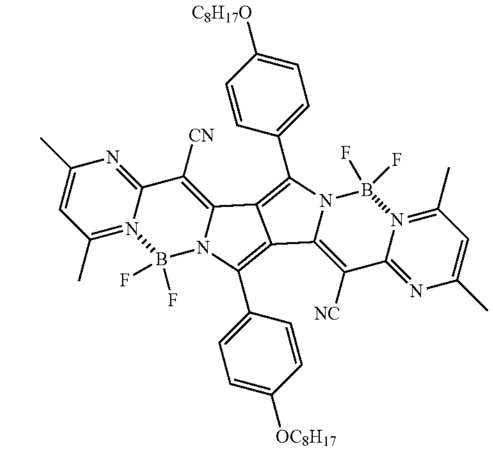

λ = 684 nm Em = 708 nm (6-2-1)

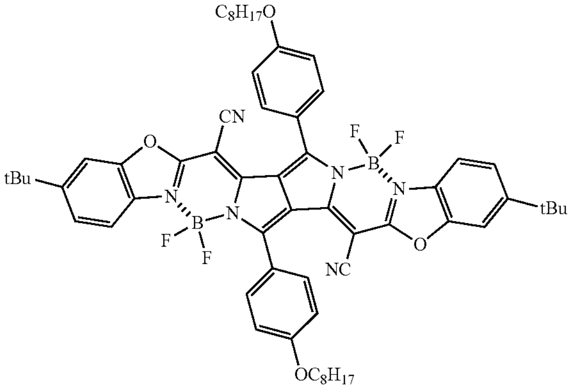

λ = 690 nm Em = 712 nm (6-3-1)

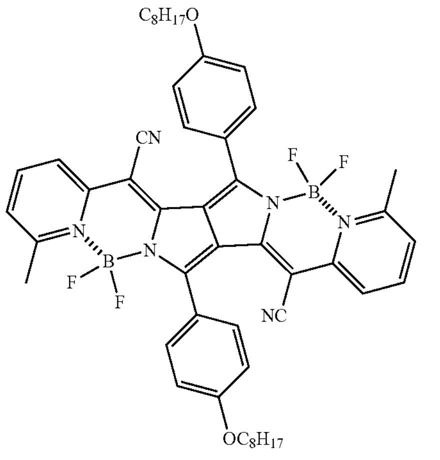

λ = 707 nm Em = 730 nm

-continued
(6-4-1)
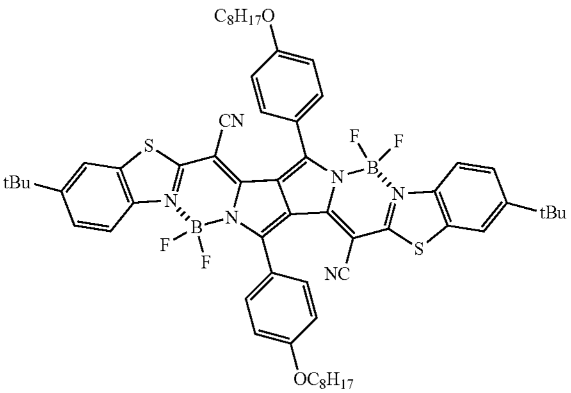
λ = 732 nm Em = 749 nm
(6-5-1)
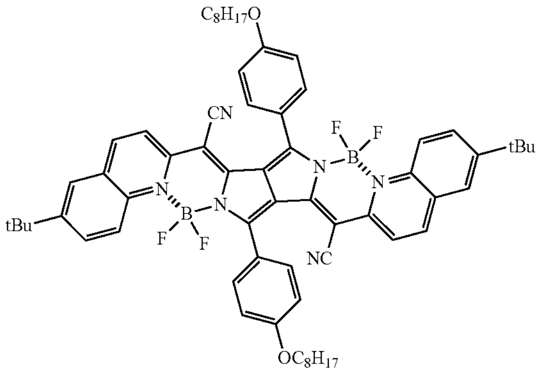
λ = 754 nm Em = 773 nm
(6-6-1)
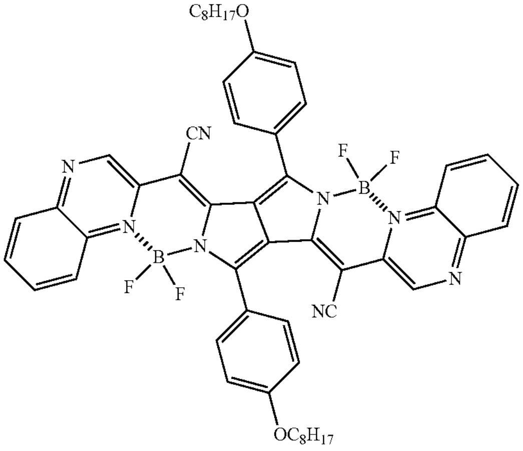
λ = 789 nm Em = 805 nm
-continued
[Chem. 21]
(6-7-1)
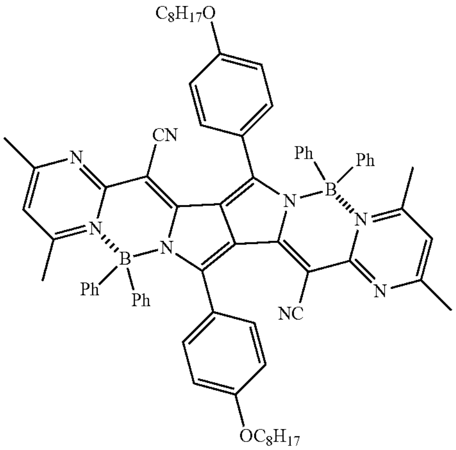
λ = 737 nm Em = 749 nm
(6-8-1)
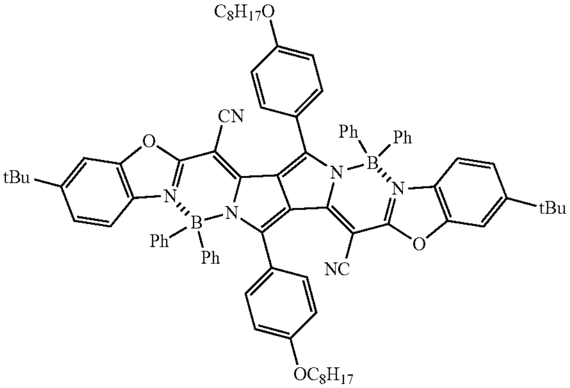
λ = 747 nm Em = 762 nm
(6-9-1)
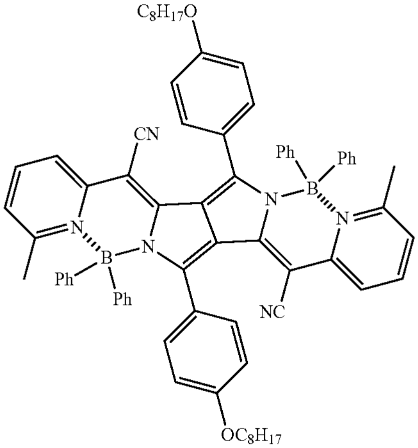
λ = 763 nm Em = 776 nm -continued (6-10-1)

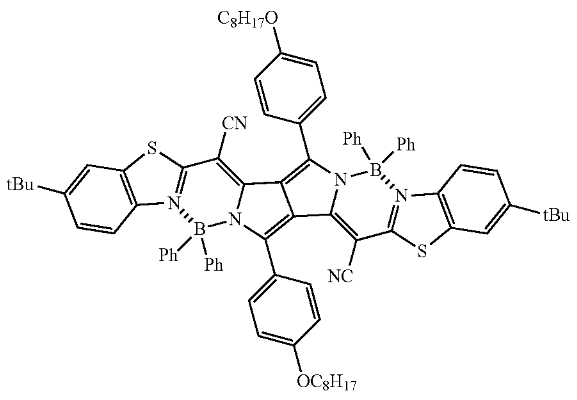

λ = 790 nm Em = 804 nm (6-11-1)

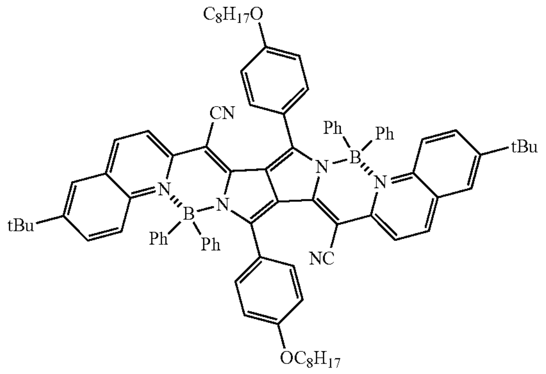

λ = 819 nm Em = 831 nm (6-12-1)

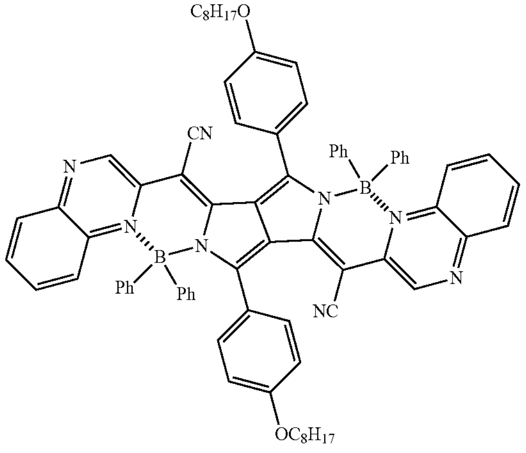

λ = 864 nm Em = 881 nm

As the near-infrared fluorescent material (A) according to the present invention, a commercially available product may be used, or a synthesized product may be used. Examples of the synthesis method include a synthesis method described in Chemistry A European Journal, 2009, Vol. 15, pages 4857 to 4864.

The content of the near-infrared fluorescent material (A) is not particularly limited as long as it is a concentration at which the near-infrared fluorescent material (A) can be mixed with the thermoplastic resin (B). However, from the viewpoint of the fluorescence intensity and the detection sensitivity thereof, the content of the near-infrared fluorescent material (A) may be in a range of preferably 0.0005% by mass or more and more preferably 0.001% by mass or more with respect to 100% by mass of the total of the near-infrared fluorescent material (A) and the thermoplastic resin (B), and from the viewpoint of the detection sensitivity due to concentration quenching or reabsorption of fluorescence, the content may be in a range of preferably 1% by mass or less, more preferably 0.8% by mass or less, and still more preferably 0.5% by mass or less.

Since the near-infrared fluorescent material used in the present invention has a high molar extinction coefficient and a high quantum yield even in a resin, even when the concentration of the near-infrared fluorescent material in the resin is relatively low, the light emission can be sufficiently visually recognized by a camera or the like. A low concentration of the near-infrared fluorescent material is preferable from the viewpoint that the possibility of elution decreases, the possibility of bleeding out from a molded object processed from the resin composition decreases, a molded object required to have transparency can be processed and the like.

<Thermoplastic Resin (B) Other than Polyamide Resin>

The thermoplastic resin (B) other than a polyamide resin contained in the resin composition according to the present invention forms a dispersed phase together with the near-infrared fluorescent material.

The thermoplastic resin (B) used in the present invention is not particularly limited as long as it is a thermoplastic resin other than a polyamide resin, and may be appropriately selected from known resins in consideration of the type of the near-infrared fluorescent substance to be blended, the product quality required when a molded object is formed, and the like. The thermoplastic resin (B) used in the present invention may be used alone or may be used in combination of two or more thereof. In the case of mixing two or more kinds, it is preferable to use resins having high compatibility in combination. Furthermore, as the thermoplastic resin (B), a commercially available product may be used, or a synthesized product may be used.

Specific examples of the thermoplastic resin (B) used in the present invention include thermoplastic polyurethane (TPU); a polycarbonate (PC) resin; a vinyl chloride resin such as polyvinyl chloride (PVC) and a vinyl chloride-vinyl acetate copolymer resin; an acrylic resin such as polyacrylic acid, polymethacrylic acid, polymethyl acrylate, polymethyl methacrylate (PMMA), and polyethyl methacrylate; a polyester resin such as polyethylene terephthalate (PET), polybutylene terephthalate, polytrimethylene terephthalate, polyethylene naphthalate, and polybutylene naphthalate; a polystyrene resin such as polystyrene (PS), imide-modified polystyrene, an acrylonitrile-butadiene-styrene (ABS) resin, an imide-modified ABS resin, a styrene-acrylonitrile copolymer (SAN) resin, and an acrylonitrile-(ethylene-propylene-diene)-styrene (AES) resin; an olefin resin such as a polyethylene (PE) resin, a polypropylene (PP) resin, and a cycloolefin resin; a polyacetal (POM) resin; a cellulose resin such as nitrocellulose and cellulose acetate; a silicone resin; and a fluororesin.

Among these thermoplastic resins (B), the thermoplastic resin (B) preferably contains at least one selected from the group consisting of a thermoplastic polyurethane (TPU) resin, a polycarbonate (PC) resin, a vinyl chloride resin, an acrylic resin, a polyester resin, a polystyrene resin, an olefin resin, and a polyacetal (POM) resin because the dispersibility of the near-infrared fluorescent material is high. In particular, when the resin composition according to the present invention is used as a medical material, the thermoplastic resin (B) is more preferably TPU, PC, PVC, PMMA, PET, PS, PE, or PP, and still more preferably TPU, PC, PMMA, PS, or PE, in view of low solubility in a body fluid such as blood, low elution in a use environment, and biocompatibility.

The content of the thermoplastic resin (B) is not particularly limited as long as it is a concentration at which the near-infrared fluorescent material (A) can be mixed with the thermoplastic resin (B). However, from the viewpoint of the fluorescence intensity and the detection sensitivity thereof, the content of the thermoplastic resin (B) may be in a range of preferably 99% by mass or more, more preferably 99.2% by mass or more, and still more preferably 99.5% by mass or more, and may be in a range of preferably 99.9995% by mass or less, and more preferably 99.999% by mass or less, with respect to 100% by mass of the total of the near-infrared fluorescent material (A) and the thermoplastic resin (B).

<Resin (C)>

The resin (C) contained in the resin composition according to the present invention is a resin different from the thermoplastic resin (B) and forms a continuous phase.

The resin (C) is not particularly limited as long as it is different from the thermoplastic resin (B), and may be a thermoplastic resin or a thermosetting resin. A polyamide resin or a thermosetting resin which can deactivate the near-infrared fluorescent material described above can also be used as the resin (C) forming the continuous phase, and a resin composition having high light-emitting efficiency of near-infrared fluorescence can be obtained.

The resin (C) may be used alone or may be used in combination of two or more thereof. As the resin (C), a commercially available product may be used, or a synthesized product may be used.

Specific examples of the resin (C) used in the present invention include a urethane resin such as a polyurethane (PU) resin and a thermoplastic polyurethane (TPU) resin; a polycarbonate (PC) resin; a vinyl chloride resin such as polyvinyl chloride (PVC) and a vinyl chloride-vinyl acetate copolymer resin; an acrylic resin such as polyacrylic acid, polymethacrylic acid, polymethyl acrylate, polymethyl methacrylate (PMMA), and polyethyl methacrylate; a polyester resin such as polyethylene terephthalate (PET), polybutylene terephthalate, polytrimethylene terephthalate, polyethylene naphthalate, and polybutylene naphthalate; a polyamide resin such as nylon (registered trademark); a polystyrene resin such as polystyrene (PS), imido-modified polystyrene, an acrylonitrile-butadiene-styrene (ABS) resin, an imido-modified ABS resin, a styrene-acrylonitrile copolymer (SAN) resin, and an acrylonitrile-(ethylene-propylene-diene)-styrene (AES) resin; an olefin resin such as a polyethylene (PE) resin, a polypropylene (PP) resin, a polybutylene resin, and a cycloolefin resin; a cellulose resin such as nitrocellulose and cellulose acetate; a silicone resin; a thermoplastic resin such as a fluororesin; an epoxy resin such as a bisphenol A-type epoxy resin, a bisphenol F-type epoxy resin, an isocyanurate-based epoxy resin, and a hydantoin-based epoxy resin; an amino resin such as a melamine resin and a urea resin; a phenol resin; and a thermosetting resin such as an unsaturated polyester resin. The epoxy resin may be in the form of an epoxy resin composition containing a curing agent.

The resin (C) may be a resin having a crosslinked structure. Examples of the resin having a crosslinked structure include crosslinked olefin resins such as a crosslinked polyethylene resin and a crosslinked polybutylene resin, and silane-modified products thereof.

Among these, from the viewpoint of deactivating the near-infrared fluorescent material (A) or improving the fluorescence intensity, the resin (C) preferably contains at least one selected from the group consisting of a polyamide resin, a polyethylene resin, a polypropylene resin, a thermosetting resin, and a crosslinked polyethylene resin. Furthermore, from the viewpoint of heat resistance and chemical resistance, the resin (C) more preferably contains a polyamide resin. In addition, from the viewpoint of insulation properties and withstand voltage, the resin (C) more preferably contains a thermosetting resin.

The content of the resin (C) in the resin composition according to the present invention is not particularly limited as long as it is a concentration at which the particles (powder) containing the near-infrared fluorescent material (A) and the thermoplastic resin (B) can be mixed with the resin (C). However, since the resin (C) can efficiently form a continuous phase and excellent light-emitting efficiency can be obtained, the content of the resin (C) may be in a range of preferably 40% by mass or more, and more preferably 50% by mass or more, and may be in a range of preferably 95% by mass or less, and more preferably 90% by mass or less, with respect to 100% by mass of the total of the near-infrared fluorescent material (A), the thermoplastic resin (B), and the resin (C).

Therefore, the total content of the near-infrared fluorescent material (A) and the thermoplastic resin (B) in the resin composition according to the present invention may be in a range of preferably 5% by mass or more, and more preferably 10% by mass or more, and may be in a range of preferably 60% by mass or less, and more preferably 50% by mass or less, with respect to 100% by mass of the total of the near-infrared fluorescent material (A), the thermoplastic resin (B), and the resin (C).

Furthermore, the content of the near-infrared fluorescent material (A) in the resin composition according to the present invention may be in a range of preferably 0.000025% by mass or more, more preferably 0.00005% by mass or more, and still more preferably 0.0001%, and may be in a range of preferably 0.6% by mass or less, more preferably 0.5% by mass or less, and still more preferably 0.48% by mass or less, with respect to 100% by mass of the total of the near-infrared fluorescent material (A), the thermoplastic resin (B), and the resin (C).

In addition, from the viewpoint of moldability and light-emitting efficiency, examples of a preferable combination of the thermoplastic resin (B) and the resin (C) include the following forms.

A form in which the thermoplastic resin (B) is a polycarbonate resin and the resin (C) is a polyamide resin.

A form in which the thermoplastic resin (B) is a polycarbonate resin and the resin (C) is a crosslinked polyethylene resin.

A form in which the thermoplastic resin (B) is a polycarbonate resin and the resin (C) is an epoxy resin.

A form in which the thermoplastic resin (B) is a polycarbonate resin and the resin (C) is a thermoplastic polyurethane resin.

A form in which the thermoplastic resin (B) is a polymethyl methacrylate resin and the resin (C) is a crosslinked polyethylene resin.

A form in which the thermoplastic resin (B) is a polystyrene resin and the resin (C) is a crosslinked polyethylene resin.

A form in which the thermoplastic resin (B) is a polypropylene resin and the resin (C) is a polyethylene resin.

<Method for Producing Resin Composition>

The method for producing the resin composition according to the present invention is not particularly limited, and any known method may be used. For example, the following method may be mentioned.

First, at least the near-infrared fluorescent material (A) and the thermoplastic resin (B) are blended as essential blending components so as to have the above contents, uniformly mixed by a tumbler, a Henschel mixer (registered trademark), or the like, and then fed into a melt-kneading extruder such as a twin-screw kneading extruder, and melt-kneaded in a temperature range equal to or higher than the melting temperature of the thermoplastic resin (B) plus 100° C., for example, 180° C. or higher and 300° C. or lower, to obtain a kneaded product of the near-infrared fluorescent material and the thermoplastic resin (B) which becomes a dispersed phase. The melting temperature of the thermoplastic resin refers to a melting point in the case of a crystalline resin and a softening point (glass transition point) in the case of an amorphous resin (the same applies hereinafter). The kneaded product can be extruded into a strand shape and then allowed to stand at room temperature or cooled by immersion in water at a temperature in a range of 5° C. or higher and 60° C. or lower, and cut into particles such as pellets or chips. Thereafter, if necessary, the obtained particles are subjected to freeze pulverization, whereby particles (powder) containing the powdery near-infrared fluorescent material (A) and the thermoplastic resin (B) having a desired size can be obtained.

At least the thus obtained particles (powder) containing the near-infrared fluorescent material (A) and the thermoplastic resin (B), and the resin (C) are blended so as to have the above-mentioned contents, and uniformly mixed by a tumbler, a Henschel mixer (registered trademark), or the like, whereby a resin mixture can be obtained.

Thereafter, when the resin (C) is a thermoplastic resin, the obtained resin mixture is charged into a melt-kneading extruder such as a twin-screw kneading extruder and melt-kneaded at a temperature in a range of the melting temperature of the resin (C) or higher and lower than the melting temperature of the thermoplastic resin (B), whereby the resin composition of the present invention can be obtained. Furthermore, the resin composition can be extruded into a strand shape and then allowed to stand at room temperature, or cooled by immersion in water at a temperature in a range of 5° C. or higher and 60° C. or lower, and cut into particles such as pellets or chips. Subsequently, the obtained resin composition is melt-molded to obtain a molded object.

When a thermosetting resin is used as the resin (C), since the resin (C) still exists as a prepolymer or an intermediate of an initial polycondensation product in the obtained resin mixture, a curing agent is added to the resin mixture if necessary, and the resin mixture is further molded (shaped) and then subjected to a heating step, whereby the resin (C) forms a three dimensional structure and the resin composition of the present invention can be obtained as a molded object. During the polymerization, the heating step is preferably performed in a temperature range from room temperature to lower than the melting temperature of the thermoplastic resin (B).

In the case of producing a resin composition containing a resin having a crosslinked structure such as a crosslinked polyolefin resin as the resin (C), the resin composition can be obtained as a molded object according to an ordinary method employing a conventionally known crosslinking method such as a chemical crosslinking method using a crosslinking agent (organic peroxide), an active energy ray crosslinking method using irradiation with an electron beam or X-rays, or a water crosslinking method using a dehydration condensation reaction of alkoxysilane after silane-modifying the thermoplastic resin (B) such as a polyolefin resin. Therefore, the resin composition of the present invention containing a resin having a crosslinked structure as the resin (C) can be obtained as a molded object by: a step of uniformly mixing the resin (C) before crosslinking (and further a crosslinking agent in the case of a chemical crosslinking method) with the near-infrared fluorescent material (A) and the thermoplastic resin (B) (or a silane-modified thermoplastic resin (B) in advance in the case of a water crosslinking method); a step of kneading and molding the obtained resin mixture using a well-known kneading apparatus such as a two-roll mill, a kneader, a Banbury mixer, or an extruder under conditions in which the temperature is in a range equal to or higher than the melting temperature of the resin (C) and equal to or lower than the melting temperature of the resin (B), and further under conditions in which the temperature is in a range lower than the thermal decomposition temperature of the crosslinking agent in the case where the crosslinking agent is blended; and a crosslinking step corresponding to each crosslinking method (for example, heating to the thermal decomposition temperature of the crosslinking agent or higher in the chemical crosslinking method, irradiation with an active energy ray in the active energy ray crosslinking method, and exposure to a water atmosphere in the water crosslinking method).

In the resin composition according to the present invention, the diameter (dispersion diameter) of the dispersed phase formed by the near-infrared fluorescent material (A) and the thermoplastic resin (B) may be preferably in a range of 1 nm or more, and may be preferably in a range of 300 μm or less, and more preferably in a range of 200 μm or less. By setting the diameter in such a range, the light-emitting efficiency of the resin composition and the molded object according to the present invention is further improved.

The diameter of the dispersed phase can be controlled by conditions for freeze-pulverization of particles containing the near-infrared fluorescent material (A) and the thermoplastic resin (B), conditions for melt-kneading when the resin (C) is mixed, and the like. The diameter of the dispersed phase can be measured by the method described in Examples.

In a case where the near-infrared fluorescent material (A) is dispersed in the thermoplastic resin (B) by melt-kneading the thermoplastic resin (B) and the near-infrared fluorescent material (A), even in a case where the melt-kneading is performed at a temperature lower than the decomposition point of the near-infrared fluorescent material (A), depending on the type of the thermoplastic resin (B) or the near-infrared fluorescent material (A) and the kneading conditions, fluorescence may not be generated due to a cause such as poor dispersion or decomposition of the near-infrared fluorescent material (A). Whether or not the near-infrared fluorescent material (A) can be dispersed in the thermoplastic resin (B) is difficult to predict from the thermal physical properties of the near-infrared fluorescent material (A) or the like.

On the other hand, the compound represented by General Formula ($II_1$), General Formula ($II_2$), General Formula ($II_3$), or General Formula ($II_4$) can be uniformly mixed and dispersed in the thermoplastic resin (B) other than a polyamide resin, and can emit fluorescence with high quantum yield even in the resin. The reason for this is not clear, but can be presumed as follows. In a case where the near-infrared fluorescent material (A) is dispersed by a method such as melt-kneading, if the near-infrared fluorescent material (A) causes aggregation or the like, it is considered that the quantum yield of fluorescence decreases due to concentration quenching. Therefore, in order for the fluorescent material to efficiently emit fluorescence, it is desirable that the fluorescent material has high compatibility with the thermoplastic resin (B) and can be uniformly dispersed. One index of whether or not the compatibility is high is the SP value. In a case where the difference between the SP value of the near-infrared fluorescent material (A) and the SP value of the thermoplastic resin (B) is small, the compatibility is high and the near-infrared fluorescent material (A) can be uniformly dispersed. On the other hand, even in a case where the SP values and the like are different, the difference can be explained by other physical property parameters. For example, the compatibility with the thermoplastic resin (B) can be explained from the calculated values or measured values of the solubility, partition coefficient, relative dielectric constant, polarizability and the like of the fluorescent material. Further, the compatibility between the near-infrared fluorescent material (A) and the thermoplastic resin (B) may vary depending on the crystallinity of the thermoplastic resin (B).

In addition, the compatibility between the thermoplastic resin (B) and the near-infrared fluorescent material (A) can be controlled by the functional group possessed by the molecule itself of the near-infrared fluorescent material (A). For example, in a case where the fluorescent material is dispersed in fat solubility (hydrophobic) polyolefin-based resins such as polypropylene and polyethylene, it is preferable that the molecule of the fluorescent material has a hydrophobic group. For example, by introducing a hydrophobic group such as an alicyclic alkyl group, a long-chain alkyl group, a halogenated alkyl group, or an aromatic ring into the molecule of the fluorescent material, the compatibility with the resin can be improved. However, it is not limited to these functional groups. Furthermore, in a case where the near-infrared fluorescent material (A) is dispersed in a resin having high polarity, such as polyurethane, it is preferable that the molecule of the near-infrared fluorescent material (A) has a hydrophilic group such as a carboxy group, a hydroxy group, an amino group, an alkoxy group, an aryloxy group, an alkylamino group, an ester, or an amide. However, the present invention is not limited thereto.

In order to enhance the compatibility between the thermoplastic resin (B) and the near-infrared fluorescent material (A), it is necessary to suppress the aggregation of the near-infrared fluorescent material (A). In the case of the near-infrared fluorescent material (A), an aromatic ring or a heterocyclic ring is introduced into the molecule in order to extend the conjugated system or ensure planarity. However, due to the introduction of these rings, the intermolecular interaction becomes strong, stacking is likely to occur, and aggregation is likely to occur. It is presumed that since the compound represented by General Formula ($II_1$), General Formula ($II_2$), General Formula ($II_3$), or General Formula ($II_4$) has a skeleton consisting of a wide conjugate plane centered on a boron atom, it is easy to aggregate, but aggregation of the pigment is suppressed by introducing an electron-donating group or an electron-withdrawing substituent to polarize the compound or by introducing a bulky functional group, and thus, compatibility with the thermoplastic resin (B) can be achieved.

The near-infrared fluorescent material (A) used in the present invention can be melt-kneaded with the thermoplastic resin (B) to be uniformly dispersed and mixed, and a resin composition constituted by further containing the resin (C) or a molded object obtained from the resin composition can stably emit near-infrared fluorescence at a high emission quantum yield. In particular, the reason why the near-infrared fluorescent material (A) represented by any one of General Formulas ($II_1$) to ($II_4$) used in the present invention shows high light emission characteristics even in a case where the near-infrared fluorescent material (A) is melt-kneaded with the thermoplastic resin (B), unlike many other organic near-infrared fluorescent materials, is not clear, but it is presumed that the near-infrared fluorescent material (A) used in the present invention has a robust skeleton consisting of a wide conjugate plane and thus has high heat resistance and excellent compatibility with the thermoplastic resin (B). In addition, by forming the dispersed phase in a form in which the near-infrared fluorescent material (A) is included in the thermoplastic resin (B) other than a polyamide resin, deactivation of the near-infrared fluorescent material (A) is suppressed, and various resins can be used as the resin (C) forming the continuous phase. In the resin composition according to the present invention having such a form, even a resin capable of deactivating the near-infrared fluorescent material (A), such as a polyamide resin or a thermosetting resin, can be used as the resin (C).

When the resin composition according to the present invention contains a light-emitting substance having a high quantum yield [(the number of emitted photons)/(the number of absorbed photons)] of 20% or more, there is no particular problem, but when a light-emitting substance having a low quantum yield is contained, understanding of the Stokes shift (the difference between the maximum absorption wavelength and the maximum emission wavelength) of the resin composition according to the present invention is also important.

When a general light emission detector provided with a filter for cutting noise caused by the excitation light is used, if the Stokes shift of the resin composition according to the present invention is small, light emission is cut by the filter, and thus it is difficult to detect the light emission with high sensitivity. Therefore, the Stokes shift (the difference between the maximum absorption wavelength and the maximum emission wavelength) of the resin composition according to the present invention is preferably 10 nm or more, and more preferably 20 nm or more. As the Stokes shift is larger, light emission emitted from the molded object can be detected with higher sensitivity even when a general detector provided with a filter for cutting noise caused by the excitation light is used.

However, even when the Stokes shift is small, near-infrared fluorescence from the resin composition according to the present invention can be detected with high sensitivity under the following conditions. For example, if excitation can be performed with light having a wavelength shorter than the maximum absorption wavelength, fluorescence can be detected even if noise is cut. In addition, if the fluorescence spectrum is broad, fluorescence can be sufficiently detected even if noise is cut. On the other hand, some fluorescent materials have a plurality of fluorescence peaks. In this case, even when the Stokes shift is small, if there is a fluorescence peak (second peak) on a longer wavelength side, detection can be performed with high sensitivity even when a detector provided with a filter for noise cutting is used. In the case where the resin composition according to the present invention has a plurality of fluorescences, the difference between the fluorescence peak wavelengths on a long wavelength side and the maximum absorption wavelengths may be 30 nm or more, and preferably 50 nm or more. The conditions are not limited to those described above as long as an excitation light source, a cut filter, and the like are appropriately selected.

The resin composition according to the present invention containing the near-infrared fluorescent material (A) does not change in color in a visual state even when excited by excitation light in the near-infrared region, emits invisible fluorescence in the near-infrared region, and can be detected by a detector. Therefore, the maximum absorption wavelength may be 600 nm or longer with respect to the excitation light in the near-infrared region, but from the viewpoint of absorption efficiency, the maximum absorption wavelength is preferably close to that of the excitation light, more preferably 650 nm or longer, still more preferably 665 nm or longer, and particularly preferably 680 nm or longer. Furthermore, when used as medical tools such as implants, 700 nm or longer is preferable.

The resin composition according to the present invention containing the near-infrared fluorescent material (A) and a molded object obtained from the composition have no practical problem as long as the color of the irradiated object does not change and the maximum fluorescence wavelength is 650 nm or longer in consideration of detection sensitivity, but the maximum fluorescence wavelength is preferably 700 nm or longer, and more preferably 720 nm or longer. In the case of having a plurality of fluorescence peaks, even when the wavelength of the maximum fluorescence peak is 720 nm or shorter, a fluorescence peak having sufficient detection sensitivity in 740 nm or longer is sufficient. In this case, the intensity of the fluorescence peak (second peak) on a long wavelength side is preferably 5% or more, and more preferably 10% or more, of the intensity at the maximum fluorescence wavelength.

It is preferable that the resin composition according to the present invention and a molded object obtained from the composition have strong absorption in a range of 650 nm or longer and 1500 nm or shorter and emit strong fluorescence in this range. Light at 650 nm or longer is less likely to be affected by hemoglobin, and light at 1500 nm or shorter is less likely to be affected by water. That is, light in a range of 650 nm or longer and 1500 nm or shorter has high skin permeability and is hardly affected by contaminants in a living body, and thus is suitable as a wavelength region of light used for visualizing a medical implant embedded under the skin or the like. When the maximum absorption wavelength and maximum fluorescence wavelength are in the range of 650 nm or longer and 1500 nm or shorter, the resin composition according to the present invention and a molded object obtained from the composition are suitable for detection with light in the range of 650 nm or longer and 1500 nm or shorter, and are suitable as medical tools and the like used in a living body.

The resin composition according to the present invention may contain components other than the resin component and the near-infrared fluorescent material (A) as long as the effects of the present invention are not impaired. Examples of the other components include an ultraviolet absorber, a heat stabilizer, a light stabilizer, an antioxidant, a flame retardant, a flame retardant aid, a crystallization accelerator, a plasticizer, an antistatic agent, a colorant, and a release agent.

<Molded Object>

By molding the resin composition according to the present invention, a molded object capable of light emission detection is obtained. That is, according to another embodiment of the present invention, a molded object obtained from the resin composition according to the present invention is provided.

The molding method is not particularly limited, and examples thereof include casting (casting method), injection molding using a mold, compression molding, extrusion molding using a T-die or the like, and blow molding.

In the production of a molded object, the molded object may be formed from only the resin composition according to the present invention, or the resin composition according to the present invention and another resin composition may be used as raw materials. For example, the entire molded object may be molded from the resin composition according to the present invention, or only a part of the molded object may be molded from the resin composition according to the present invention. The resin composition according to the present invention is preferably used as a raw material constituting a surface portion of the molded object. For example, in the case of molding a catheter, a catheter in which only the tip portion emits near-infrared fluorescence can be produced by molding only the tip portion of the catheter with the resin composition according to the present invention and molding the remaining portion with a resin composition that does not contain a near-infrared fluorescent material. Further, by alternately laminating and molding the resin composition according to the present invention and a resin composition that does not contain a near-infrared fluorescent material, a molded object emitting near-infrared fluorescence in a stripe shape can be produced. In addition, surface coating for enhancing visibility of the molded object may be performed.

The light emission detection can be carried out by a conventional method using a commercially available fluorescence or phosphorescence detection apparatus or the like. As the excitation light used for fluorescence or phosphorescence detection, an arbitrary light source can be used, and in addition to a near-infrared lamp having a long wavelength width, a laser, an LED, or the like having a narrow wavelength width can be used.

The molded object obtained from the resin composition according to the present invention containing the near-infrared fluorescent material (A) does not change in color even when irradiated with light in the near-infrared region, and emits near-infrared fluorescence that can be detected with higher sensitivity than in the related art. Therefore, the molded object is particularly suitable for a medical tool at least a part of which is inserted or indwelled in the body of a patient.

When a molded object obtained from the resin composition according to the present invention containing the near-infrared fluorescent material (A) is subjected to fluorescence detection, it is preferable to irradiate the molded object with excitation light in the near-infrared region, but when the color of the irradiated article may be slightly reddish, it is not always necessary to use excitation light in the near-infrared region. For example, when a medical tool in the body is subjected to fluorescence detection by irradiating excitation light, it is necessary to use excitation light in a wavelength region having high permeability to a living body such as skin, and in this case, excitation light having high permeability to the living body and having a wavelength of 650 nm or longer may be used.

Examples of the medical tool include a stent, a coil embolus, a catheter tube, an injection needle, an indwelling needle, a port, a shunt tube, a drain tube, and an implant.

<Detection Method, Detection Apparatus, and Confirmation System>

The detection method of the present invention includes a step of irradiating the above-described molded object with near-infrared rays, and a step of detecting near-infrared light emitted from the molded object with a device.

In addition, the detection apparatus of the present invention includes a means for irradiating the molded object with near-infrared rays and a means for detecting near-infrared light emitted from the molded object.

As the means for irradiating the molded object with near-infrared rays, an arbitrary light source can be used as long as it can emit excitation light used for light emission detection, and a near-infrared lamp having a long wavelength width, a laser, an LED, or the like having a narrow wavelength width can be used. The wavelengths of the light sources for irradiation may be wavelengths capable of exciting the near-infrared fluorescent pigment contained in the molded object, and there is no particular problem as long as the wavelengths are generally called near infrared light. For example, the wavelengths are preferably 650 nm or longer, more preferably 700 nm or longer, and are preferably 2500 nm or shorter, more preferably 1100 nm or shorter.

The irradiation of the molded object with near-infrared rays is not particularly limited as long as it is an ordinary method. For example, the molded object may be irradiated with one or more light sources from above or below in the vertical direction of the molded object, may be irradiated from an oblique direction, or may be irradiated from different directions with respect to the molded object. When the light source and a detection apparatus for near-infrared light emission to be described later are disposed at substantially the same position with respect to the molded object, it is preferable to use ring illumination or line illumination as the light source.

The means for detecting near-infrared light emission may be a generally commercially available detection apparatus for near-infrared light emission, and is not particularly limited. For example, an imaging device such as a digital camera using an imaging element such as a charge coupled device (CCD) or a complementary MOS (CMOS), or a detection apparatus such as a spectroscope, a photomultiplier tube, a PbS detector, or a photodiode can be used. The imaging device may be an area camera or a line camera. For example, when a detector other than the imaging device, such as a photodiode, is used as the means for detecting near-infrared light emission, an electric signal from the detector is amplified by a circuit board on which a signal amplification unit such as a head amplifier is mounted, and the presence or absence of light emission can be detected based on an output value of the amplified electric signal.

Further, the presence or absence of the molded object of the present invention can be determined based on the light emission information by providing a means for analyzing the presence or absence of near-infrared light emission detection. The analysis means may be generally commercially available and is not particularly limited, but for example, a personal computer in which image analysis software is installed, hardware capable of realizing an image processing algorithm (for example, a microcomputer, a programmable controller (PLC), a field-programmable gate array (FPGA), or the like), or the like can be used.

The position confirmation system of the present invention includes a monitor that displays a captured image in addition to the detection apparatus of the present invention. In a case where the molded object of the present invention is a medical tool, it can be used as a medical tool position confirmation system, and the position of a medical tool inserted or indwelled in the body by surgery or the like can be visually recognized.

EXAMPLES

The present invention will be described in more detail with reference to the following Examples and Comparative Examples. However, the technical scope of the present invention is not limited only to the following Examples. In the following Examples, the expressions "%" and "part(s)" are used, and they represent "% by mass" and "part(s) by mass", respectively, unless otherwise specified.

(Preparation of Near-Infrared Fluorescent Material (A))

Near-infrared fluorescent materials 1 to 3 (pigments 1 to 3 of the following formulas) were synthesized with reference to Chemistry A European Journal, 2009, Vol. 15, pages 4857 to 4864.

Pigment 1 (Compound of Chemical Formula 6-4-1)

[Chem. 22]

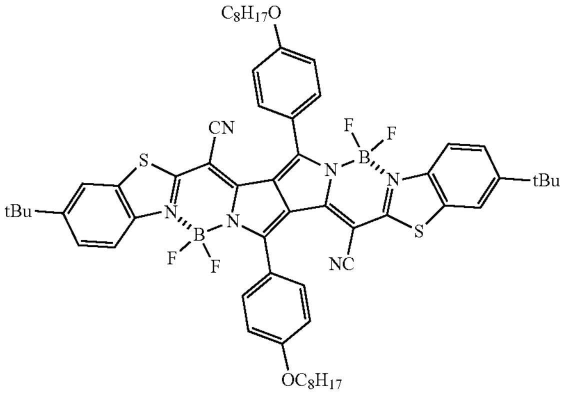

Synthesis Example of Pigment 1

[Chem. 23]

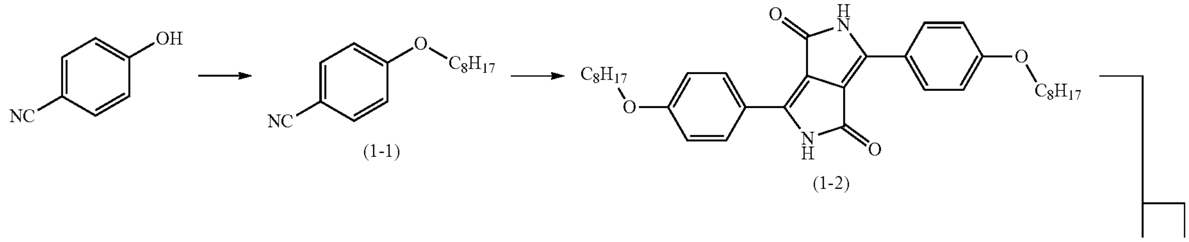

(1-1)

(1-2)

-continued

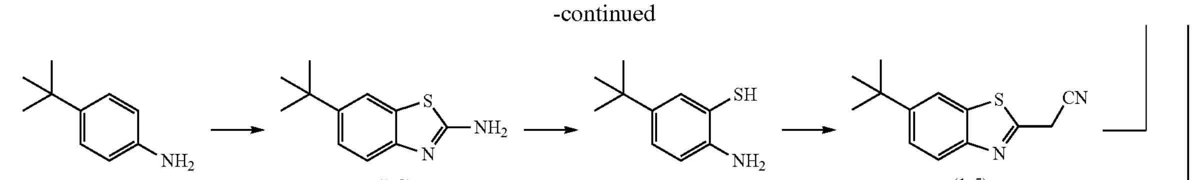

(1-3) (1-4) (1-5)

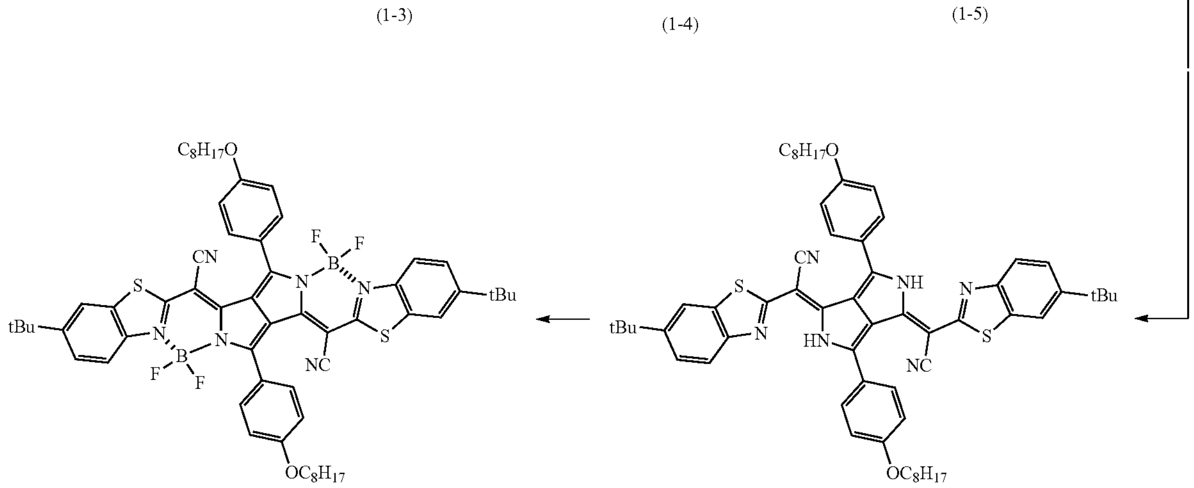

Pigment 1 (1-6)

<Synthesis of Pigment 1>

The synthesis of Pigment 1 was carried out with reference to Organic Letters, 2012, Vol. 4, pages 2670 to 2673, and Chemistry A European Journal, 2009, Vol. 15, pages 4857 to 4864, as follows.

A 2 L four-neck flask was charged with 4-hydroxybenzonitrile (25.3 g, 212 mmol), acetone (800 mL), potassium carbonate (100 g, 724 mmol), and 1-bromooctane (48 g, 249 mmol) and heated to reflux overnight. After filtration of the inorganic salts, acetone was removed under reduced pressure. To the obtained residue was added ethyl acetate, and the organic layer was washed with water and saturated brine, and treated with anhydrous magnesium sulfate. The magnesium sulfate was filtered off and the solvent was removed under reduced pressure, and then the residue was purified by silica gel column chromatography (eluent: hexane/ethyl acetate) to obtain a colorless transparent liquid of 4-octoxybenzonitrile (1-1) (yield: 45.2 g, yield rate: 92%).

Next, under an argon stream, tert-butyloxypotassium (25.18 g, 224.4 mmol) and tert-amyl alcohol (160 mL) were put into a 500 mL four-neck flask, and then a solution of the previously synthesized compound (1-1) (14.8 g, 64 mmol) mixed with tert-amyl alcohol (7 mL) was added thereto, and the mixture was heated under reflux. Under heating and reflux, a solution in which succinic acid diisopropyl ester (6.5 g, 32 mmol) was mixed with tert-amyl alcohol (10 mL) was added dropwise over about 3 hours, and after completion of the dropwise addition, heating and reflux was performed for 6 hours. After the temperature was returned to room temperature, the obtained highly viscous reaction liquid was put into a solution of acetic acid:methanol:water=1:1:1 (volume ratio), and the mixture was heated under reflux for several minutes, so that a red solid was precipitated. The solid was filtered off and washed with heated methanol and water, thereby obtaining a red solid of 3,6-(4-octyloxyphenyl)pyrrolo[3,4-c]pyrrole-1,4(2H,5H)-dione (1-2) (yield: 5.6 g, yield rate: 32%).

A 200 mL three-neck flask was also charged with 4-tert-butylaniline (10 g, 67 mmol), acetic acid (70 mL), and sodium thiocyanate (13 g, 160 mmol). While maintaining the inside of the system at 15° C. or lower, bromine (4.5 mL, 87 mmol) was added dropwise over about 20 minutes, and then the mixture was stirred at 15° C. or lower for 3.5 hours. The reaction liquid was put into 28% aqueous ammonia (150 mL) and stirred for a while, the precipitated solid was filtered off, the solid was extracted with diethyl ether, and the organic layer was washed with water. After removing the diethyl ether under reduced pressure, the residue was purified by silica gel column chromatography (eluent: dichloromethane/ethyl acetate) to obtain 2-amino-6-tert-butylbenzothiazole (1-3) as a pale yellow solid (yield: 10.32 g, yield rate: 69%).

Next, under water cooling, a 1 L four-neck flask was charged with potassium hydroxide (75.4 g, 1340 mmol) and ethylene glycol (175 mL). The inside of the system was placed under an argon atmosphere, and the compound (1-3) (7.8 g, 37.8 mmol) was charged. In order to remove oxygen in the system, bubbling was performed with argon, and then the reaction was carried out at 110° C. for 18 hours. The reaction liquid was cooled with water to 40° C. or lower, and 2 mol/L hydrochloric acid, which had been subjected to argon bubbling in advance, was added dropwise to the system for neutralization (at about pH 7). The precipitated white solid was filtered off, washed with water, and dried under reduced pressure. Thereafter, the white solid was purified by silica gel column chromatography (eluent: hexane/ethyl acetate) to obtain a white solid of 4-tert-butyl-2-mercaptoaniline (1-4) (yield: 2.39 g, yield rate: 35%).

Furthermore, acetic acid (872 mg, 14.5 mmol) and acetonitrile (30 mL) were put into a 100 mL three-neck flask, and the inside of the system was placed under an argon atmosphere. Malononitrile (2.4 g, 36.3 mmol) and the compound (1-4) (2.39 g, 13.2 mmol) were added under an argon atmosphere, and the mixture was heated under reflux for 2 hours. The acetonitrile was removed under reduced pressure, the residue was dissolved in ethyl acetate, and the organic layer was washed with water and saturated brine, and treated with anhydrous magnesium sulfate. The magnesium sulfate was filtered off, and the solvent was removed under reduced pressure, and then the residue was purified by silica gel column chromatography (eluent: hexane/ethyl acetate) to obtain a pale yellow solid of 2-(6-tert-butylbenzothiazol-2-yl)acetonitrile (1-5) (yield: 1.98 g, yield rate: 65%).

Subsequently, under an argon stream, the compound (b-2) (1.91 g, 3.5 mmol), the compound (1-5) (1.77 g, 7.68 mmol), and dehydrated toluene (68 mL) were added to a 200 mL three-neck flask, and the mixture was heated under reflux. Under heating under reflux, phosphoryl chloride (2.56 mL, 27.4 mmol) was added dropwise using a syringe, and the mixture was further heated under reflux for 2 hours. After completion of the reaction, dichloromethane (40 mL) and a saturated aqueous sodium hydrogen carbonate solution (40 mL) were added under ice-cooling, and the mixture was extracted with dichloromethane. The organic layer was treated with anhydrous magnesium sulfate, the magnesium sulfate was filtered off, the solvent was removed under reduced pressure, and the residue was subjected to silica gel column chromatography (eluent: hexane/ethyl acetate) to roughly remove impurities. The solvent was distilled off, and the obtained residue was again purified by silica gel column chromatography (eluent: hexane/dichloromethane) to obtain a green solid of a precursor (1-6) (yield: 1.56 g, yield rate: 46%).

Finally, the precursor (1-6) (1.52 g, 1.57 mmol), toluene (45 mL), triethylamine (4.35 mL, 31.4 mmol), and boron trifluoride diethyl ether complex (7.88 mL, 62.7 mmol) were added to a 200 mL three-neck flask under an argon stream, and the mixture was heated under reflux for 1 hour. The reaction liquid was cooled with ice, and the precipitated solid was filtered off. The solid was washed with water, a saturated aqueous sodium hydrogen carbonate solution, a 50% aqueous solution of methanol, and methanol, and dried under reduced pressure. The obtained residue was dissolved in toluene, and methanol was added thereto to cause precipitation, thereby obtaining a dark green solid of a pigment 1 (yield: 1.25 g, yield rate: 75%).

Pigment 2 (Compound of Chemical Formula 6-5-1)

[Chem. 24]

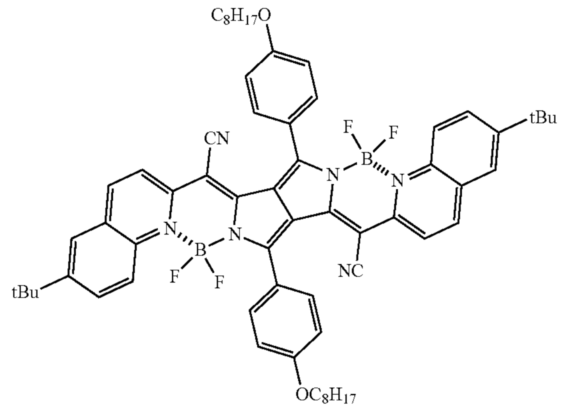

Synthesis Example of Pigment 2

[Chem. 25]

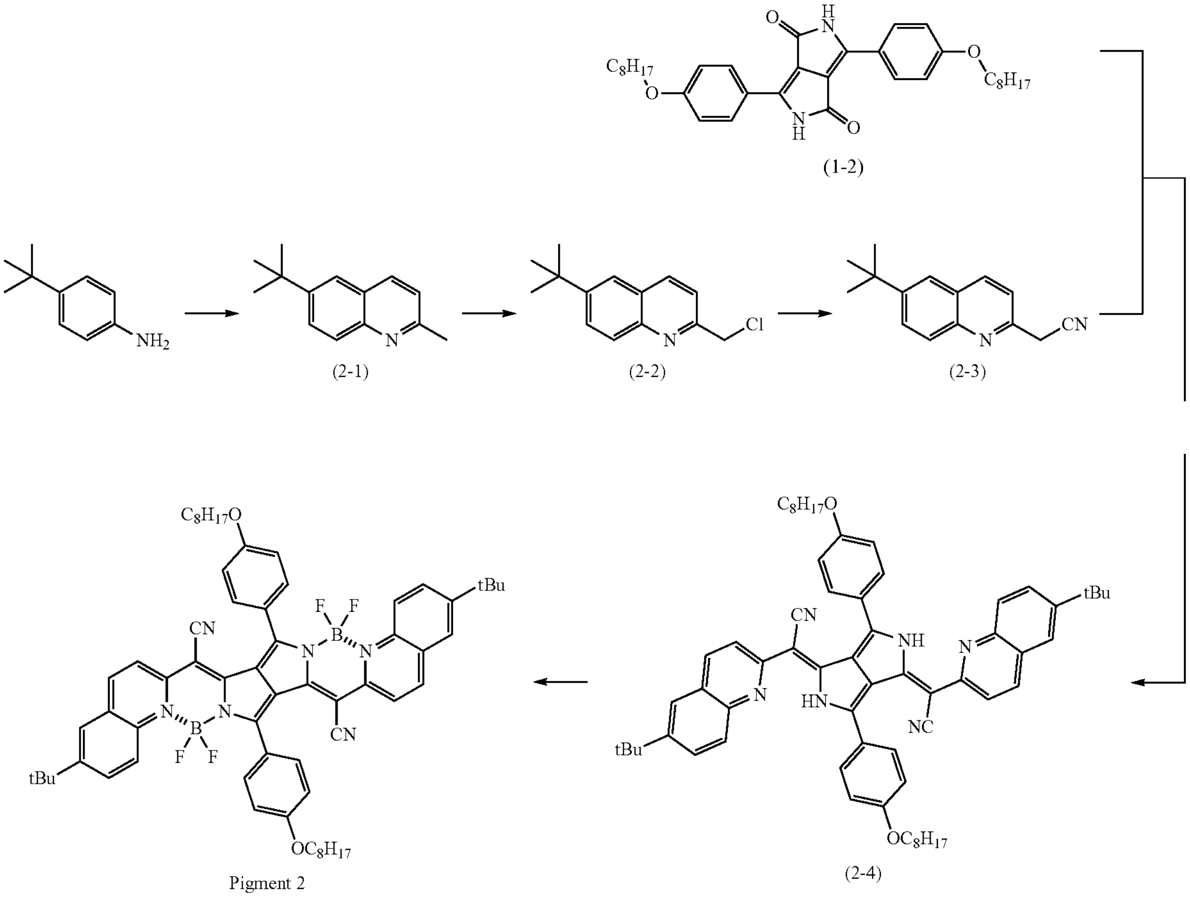

(1-2)

(2-1)

(2-2)

(2-3)

Pigment 2

(2-4)

<Synthesis of Pigment 2>

The synthesis of Pigment 2 was carried out with reference to Organic Letters, 2012, Vol. 4, pages 2670 to 2673, and Chemistry A European Journal, 2009, Vol. 15, pages 4857 to 4864, as follows.

To a 300 mL three-neck flask, 4-tert-butylaniline (29.8 g, 0.2 mol) and 6 mol/L hydrochloric acid (100 mL) were added, crotonaldehyde (15.4 g, 0.22 mol) was added dropwise while refluxing, and the mixture was further refluxed for 2 hours. The reflux was stopped, zinc chloride (27.2 g, 0.2 mol) was added while hot, and the mixture was stirred at room temperature overnight. The supernatant liquid was removed, and isopropanol was added to the yellow syrupy residue, followed by refluxing for 2 hours. The mixture was cooled to 70° C., petroleum ether (200 mL) was added, and the precipitated crystals were collected by filtration, washed with diethyl ether, and dried to obtain a zinc complex. This zinc complex was added to a liquid mixture of water/ammonia (120 mL/60 mL), and extracted three times with diethyl ether (80 mL). The obtained organic layer was dried over anhydrous magnesium sulfate and then concentrated to obtain a yellow liquid of 6-tert-butyl-2-methyl-quinoline (2-1) (yield: 16.2 g, yield rate: 41%).

Next, the compound (2-1) (16.0 g, 80 mmol) and chloroform (50 mL) were put into a 200 mL two-neck flask and stirred, and trichloroisocyanuric acid (6.52 g, 28 mmol) was added thereto while being divided. After the mixture was refluxed for 1 hour, the precipitated solid was filtered and washed with chloroform, and the obtained organic layer was extracted three times with 1 mol/L sulfuric acid. The aqueous layers were combined, adjusted to pH 3 with aqueous sodium carbonate solution, and extracted three times with diethyl ether. The organic layer was dried with anhydrous magnesium sulfate and then concentrated to obtain light yellow crystals of 2-chloromethyl-6-tert-butyl-quinoline (2-2) (yield: 4.8 g, yield rate: 25.7%).

Further, the compound (c-2) (4.7 g, 20 mmol), sodium cyanide (1.47 g, 30 mmol), a small amount of sodium iodide, and DMF (50 mL) were put into a 100 mL three-neck flask, and the mixture was reacted at 60° C. for 2 hours. After cooling, the reaction liquid was extracted with water (200 mL)/ethyl acetate (300 mL), and the obtained ethyl acetate layer was further washed with water. The organic layer was dried with anhydrous magnesium sulfate, concentrated, and recrystallized with petroleum ether to obtain white crystals of 2-(6-tert-butylquinolin-2-yl)acetonitrile (2-3) (yield: 1.9 g, yield rate: 42.4%).

Subsequently, under an argon stream, the compound (1-2) (2.18 g, 4.0 mmol) used in the synthesis of the pigment 1, the compound (2-3) (1.9 g, 8.5 mmol), and dehydrated toluene (68 mL) were added to a 200 mL three-neck flask, and the mixture was heated under reflux. Under heating under reflux, phosphorus oxychloride (2.62 mL, 28 mmol) was added dropwise using a syringe, and the mixture was further heated under reflux for 2 hours. After completion of the reaction, dichloromethane (40 mL) and a saturated aqueous sodium hydrogen carbonate solution (40 mL) were added under ice-cooling, and the mixture was extracted with dichloromethane. The organic layer was treated with anhydrous magnesium sulfate, after the magnesium sulfate was filtered off, the solvent was removed under reduced pressure, and the residue was subjected to silica gel column chromatography (eluent: hexane/ethyl acetate) to roughly remove impurities. The solvent was distilled off, and the obtained residue was again purified by silica gel column chromatography (eluent: hexane/dichloromethane) to obtain a green solid of a precursor (1-4) (yield: 1.84 g, yield rate: 48%).

Finally, the precursor (2-4) (1.72 g, 1.8 mmol), toluene (45 mL), triethylamine (4.35 mL, 31.4 mmol), and boron trifluoride diethyl ether complex (7.88 mL, 62.7 mmol) were added to a 200 mL three-neck flask under an argon stream, and the mixture was heated under reflux for 1 hour. The reaction liquid was cooled with ice, and after the precipitated solid was filtered off, the solid was washed with water, a saturated aqueous sodium hydrogen carbonate solution, a 50% aqueous solution of methanol, and methanol, and dried under reduced pressure. The obtained residue was dissolved in toluene, and methanol was added thereto to cause precipitation, thereby obtaining a dark green solid of a pigment 2 (yield: 1.10 g, yield rate: 58%).

Pigment 3 (Compound of Chemical Formula 6-11-1)

[Chem. 26]

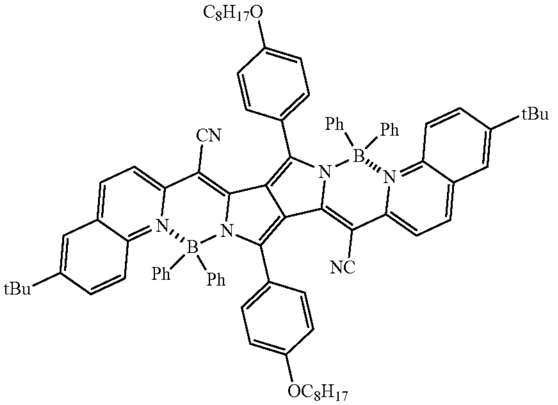

<Synthesis of Pigment 3>

The precursor 2-4 used in the synthesis of the pigment 2 was used in the synthesis of a pigment 3. Under an argon stream, the precursor (2-4) (630 mg, 0.65 mmol), N,N-diisopropylethylamine (258 mg, 2.0 mmol), and dichloromethane (20 mL) were put into a 100 mL two-neck flask, chlorodiphenylborane (600 mg, 3.0 mmol) was added thereto while refluxing, and the mixture was reacted overnight. The reaction liquid was washed with water, and the organic layer was dried with anhydrous magnesium sulfate and concentrated. The residue was washed with methanol, and then purified by column chromatography (eluent: dichloromethane/ethyl acetate=100/10) to obtain a brown solid of a pigment 3 (yield: 186 mg, yield rate: 22%).

Production Examples 1 to 9

<Preparation of Resin Composition for Dispersed Phase>

The near-infrared fluorescent material (A) and the thermoplastic resin (B) were premixed with a tumbler in the blending amounts shown in Table 1 below, and then melt-kneaded in a twin-screw vent extruder having a diameter of 30 mm at the set temperature shown in Table 1. The obtained kneaded product was cooled and then pelletized by a pelletizer to produce pellets of Production Examples 1 to 8 (pellets (1) to (8)).

As the thermoplastic resin (B), the following resins were used. Further, the numerical values in Table 1 are based on parts by mass.

B1: Polycarbonate resin (SD POLYCA (trademark) 301-4, manufactured by Sumika Polycarbonate Ltd)

B2: Polymethyl methacrylate (PMMA) resin (ACRYPET (trademark) VH001, manufactured by Mitsubishi Chemical Corporation)

B3: Polystyrene resin (DICSTYRENE CR-4500, manufactured by DIC CORPORATION)

B4: Polypropylene resin (Prime Polypro (registered trademark) J106G, manufactured by Prime Polymer Co., Ltd.)

<Pulverization of Resin Composition for Dispersed Phase>

Next, the pellets (1) to (8) obtained above were pulverized using a freezing pulverizer JFC-2000, manufactured by Japan Analytical Industry Co., Ltd. That is, the pellets and tungsten steel balls were placed in a stainless steel container, which was then covered and subjected to freeze pulverization under the conditions of preliminary cooling with liquid nitrogen for 10 minutes, a pulverization time of 15 minutes, and a number of reciprocating motions of 1200 times/minute to obtain a powder. Next, the powder was dispersed in ethanol, and the obtained dispersion liquid was subjected to pressure filtration using a filter having a determined capture particle diameter (300 m) to obtain powders (1) to (8) having average particle diameters shown in Table 1.

Separately, the pellet (1) was subjected to freeze pulverization using the same freeze pulverizer under the conditions of preliminary cooling with liquid nitrogen for 5 minutes, a pulverization time of 8 minutes, and a number of reciprocating motions of 1200 times/minute to obtain a powder. Next, the powder was dispersed in ethanol, and the obtained dispersion liquid was subjected to pressure filtration using a filter having a determined capture particle diameter (500 μm) to obtain a powder (9) having an average particle diameter shown in Table 2. The maximum particle diameter of the powder (9) measured by the method described below (Measurement of Average Particle Diameter of Pulverized Product) was 324 μm.

(Measurement of Average Particle Diameter of Pulverized Product)

The volume-average particle diameter of the obtained powder was determined by an image analysis particle size distribution analyzer (IF-3200, manufactured by JASCO INTERNATIONAL CO., LTD.) using SOLMIX (registered trademark) A-7 (manufactured by Japan Alcohol Trading CO., LTD.). The maximum particle diameter (cumulative percentage: 100%) of the powder (9) was also determined.

(Light Emission Evaluation)

Light emission evaluation of the obtained powders (1) to (9) was performed by the following method.

Camera: STC-MBCM200U3V-NIR, manufactured by OMRON SENTECH CO., LTD.

Light-source unit: A lamp with wavelengths of 720 to 850 nm was installed on an SPL-CC substrate manufactured by REVOX Co., Ltd.

The distance between the light source and the sample (0.5 g of powder was placed flat on a 52×76 mm glass plate) was set to 20 cm, the sample was placed horizontally, the sample was placed at a distance of 30 cm from the camera in a vertical position, and the imaging state of the camera was visually evaluated based on the following criteria.

A: Very clear

B: Clear

C: Confirmation of light emission

X: No confirmation of light emission (no light emission)

The constitutions and evaluation results of the powders (1) to (9) are shown in Table 1 below. A blank in Table 1 indicates that the material is not used.

TABLE 1

| | | Production Example | | | | | | | | |
|---|---|---|---|---|---|---|---|---|---|---|
| | | 1 | 2 | 3 | 4 | 5 | 6 | 7 | 8 | 9 |
| Pellet No. | | (1) | (2) | (3) | (4) | (5) | (6) | (7) | (8) | (c1) |
| Pigment | Pigment 1 | 0.005 | 0.005 | 0.005 | 0.005 | 0.010 | 0.001 | | | 0.005 |
| | Pigment 2 | | | | | | | 0.005 | | |
| | Pigment 3 | | | | | | | | 0.005 | |
| | Pigment 4 | | | | | | | | | |
| Resin | A1 | 99.995 | | | | 99.990 | 99.999 | 99.995 | 99.995 | 99.995 |
| | A2 | | 99.995 | | | | | | | |
| | A3 | | | 99.995 | | | | | | |
| | A4 | | | | 99.995 | | | | | |
| Set temperature (° C.) | | 300 | 220 | 200 | 200 | 300 | 300 | 300 | 300 | 300 |
| Powder No. | | (1) | (2) | (3) | (4) | (5) | (6) | (7) | (8) | (c1) |
| Light emission evaluation | | A | A | A | B | A | C | A | A | A |
| Volume-average particle diameter (μm) | | 49 | 27 | 19 | 32 | 51 | 51 | 49 | 49 | 152 |

Example 1: Island of Production Example 1 (Pigment-Including PC) and Sea of Polyamide 20 parts by mass of the powder (1) obtained in Production Example 1 and 80 parts by mass of a polyamide resin (PEBAX (registered trademark) 4033SA01, manufactured by Arkema Co., Ltd.) as the resin (C) were stirred and mixed with a tumbler, then melt-kneaded in a twin-screw vent extruder having a diameter of 30 mm (set temperature: 200° C.), and then pelletized to produce a resin composition (1). The obtained resin composition (1) was molded by an extruder (set temperature: 220° C.) equipped with a T-die to prepare a sheet sample (1) having a length of 127 mm, a width of 12.7 mm, and a thickness of 1 mm.

Example 2: Island of Production Example 1 (Pigment-Including PC) and Sea of Crosslinked Polyethylene 20 parts by mass of the powder (1) obtained in Production Example 1, 78 parts by mass of a polyethylene resin (Novatec (trademark) LL UJ580, manufactured by Japan Polyethylene Corporation, linear low-density polyethylene) as the resin (C), and 2 parts by mass of a crosslinking agent (PERHEXA (registered trademark) 25B-40, 2,5-dimethyl-2,5-di(t-butylperoxy)hexane, manufactured by NOF CORPORATION) were stirred and mixed with a tumbler, and then kneaded with a two-roll mill under a 125° C. environment to obtain a resin composition (2). Thereafter, the resin composition was heated and pressed at 200° C. for 2 minutes at 10 MPa to prepare a sheet sample (2) having a length of 127 mm, a width of 12.7 mm, and a thickness of 1 mm.

Example 3: Island of Production Example 2 (Pigment-Including PMMA) and Sea of Crosslinked Polyethylene 20 parts by mass of the powder (2) obtained in Production Example 2, 78 parts by mass of a polyethylene resin (Novatec (trademark) LL UJ580, manufactured by Japan Polyethylene Corporation, linear low-density polyethylene) as the resin (C), and 2 parts by mass of a crosslinking agent (PERHEXA (registered trademark) 25B-40, 2,5-dimethyl-2,5-di(t-butylperoxy)hexane, manufactured by NOF CORPORATION) were stirred and mixed with a tumbler, and then kneaded with a two-roll mill under a 125° C. environment to obtain a resin composition (3). Thereafter, the resin composition was heated and pressed at 200° C. for 2 minutes at 10 MPa to prepare a sheet sample (3) having a length of 127 mm, a width of 12.7 mm, and a thickness of 1 mm.

Example 4: Island of Production Example 3 (Pigment-Including PS) and Sea of Crosslinked Polyethylene 20 parts by mass of the powder (3) obtained in Production Example 3, 78 parts by mass of a polyethylene resin (Novatec (trademark) LL UJ580, manufactured by Japan Polyethylene Corporation, linear low-density polyethylene) as the resin (C), and 2 parts by mass of a crosslinking agent (PERHEXA (registered trademark) 25B-40, 2,5-dimethyl-2,5-di(t-butylperoxy)hexane, manufactured by NOF CORPORATION) were stirred and mixed with a tumbler, and then kneaded with a two-roll mill under a 125° C. environment to obtain a resin composition (4). Thereafter, the resin composition was heated and pressed at 200° C. for 2 minutes at 10 MPa to prepare a sheet sample (4) having a length of 127 mm, a width of 12.7 mm, and a thickness of 1 mm.

Example 5: Island of Production Example 1 (Pigment-Including PC) and Sea of Epoxy Resin 20 parts by mass of the powder (1) obtained in Production Example 1 and 80 parts by mass of an epoxy resin composition (a mixture of 100 parts by mass of EPICLON (registered trademark) 850 manufactured by DIC CORPORATION and 90 parts by mass of a curing agent (EPICLON (registered trademark) B-5001 manufactured by DIC CORPORATION)) were stirred and mixed with a stirrer, and then defoamed under reduced pressure to obtain a resin composition (5). Next, the obtained resin composition (5) was injected into a molding die, and then was heated and cured at 120° C. for 1 hour to prepare a sheet sample (5) having a length of 127 mm, a width of 12.7 mm, and a thickness of 1 mm.

Example 6: Island of Production Example 4 (Pigment-Including PP) and Sea of Polyethylene Resin 20 parts by mass of the powder (4) obtained in Production Example 4 and 80 parts by mass of a polyethylene resin (Novatec (trademark) LL UJ580, manufactured by Japan Polyethylene Corporation, linear low-density polyethylene) as the resin (C) were stirred and mixed with a tumbler, then melt-kneaded in a twin-screw vent extruder having a diameter of 30 mm (set temperature: 140° C.), and then pelletized to produce a resin composition (6). The obtained resin composition (6) was molded by an extruder (set temperature: 140° C.) equipped with a T-die to prepare a sheet sample (6) having a length of 127 mm, a width of 12.7 mm, and a thickness of 1 mm.

Example 7: Island of Production Example 1 (Pigment-Including PC) and Sea of TPU Resin 20 parts by mass of the powder (1) obtained in Production Example 1 and 80 parts by mass of a thermoplastic polyurethane resin (Tecoflex EG65D, manufactured by Lubrizol Corporation) as the resin (C) were stirred and mixed with a tumbler, then melt-kneaded in a twin-screw vent extruder having a diameter of 30 mm (set temperature: 190° C.), and then pelletized to produce a resin composition (7). The obtained resin composition (7) was molded by an extruder (set temperature: 200° C.) equipped with a T-die to prepare a sheet sample (7) having a length of 127 mm, a width of 12.7 mm, and a thickness of 1 mm.

Example 8: Island of Production Example 5 (Pigment-Including PC) and Sea of Polyamide 20 parts by mass of the powder (5) obtained in Production Example 5 and 80 parts by mass of a polyamide resin (PEBAX (registered trademark) 4033SA01, manufactured by Arkema Co., Ltd.) as the resin (C) were stirred and mixed with a tumbler, then melt-kneaded in a twin-screw vent extruder having a diameter of 30 mm (set temperature: 200° C.), and then pelletized to produce a resin composition (8). The obtained resin composition (8) was molded by an extruder (set temperature: 220° C.) equipped with a T-die to prepare a sheet sample (8) having a length of 127 mm, a width of 12.7 mm, and a thickness of 1 mm.

Example 9: Island of Production Example 6 (Pigment-Including PC) and Sea of Polyamide 20 parts by mass of the powder (6) obtained in Production Example 6 and 80 parts by mass of a polyamide resin (PEBAX (registered trademark) 4033SA01, manufactured by Arkema Co., Ltd.) as the resin (C) were stirred and mixed with a tumbler, then melt-kneaded in a twin-screw vent extruder having a diameter of 30 mm (set temperature: 200° C.), and then pelletized to produce a resin composition (9). The obtained resin composition (9) was molded by an extruder (set temperature: 220° C.) equipped with a T-die to prepare a sheet sample (9) having a length of 127 mm, a width of 12.7 mm, and a thickness of 1 mm.

Example 10: Island of Production Example 7 (Pigment-Including PC) and Sea of Polyamide 20 parts by mass of the powder (7) obtained in Production Example 7 and 80 parts by mass of a polyamide resin (PEBAX (registered trademark) 4033SA01, manufactured by Arkema Co., Ltd.) as the resin (C) were stirred and mixed with a tumbler, then melt-kneaded in a twin-screw vent extruder having a diameter of 30 mm (set temperature: 200° C.), and then pelletized to produce a resin composition (10). The obtained resin composition (10) was molded by an extruder (set temperature: 220° C.) equipped with a T-die to prepare a sheet sample (10) having a length of 127 mm, a width of 12.7 mm, and a thickness of 1 mm.

Example 11: Island of Production Example 8 (Pigment-Including PC) and Sea of Polyamide 20 parts by mass of the powder (8) obtained in Production Example 8 and 80 parts by mass of a polyamide resin (PEBAX (registered trademark) 4033SA01, manufactured by Arkema Co., Ltd.) as the resin (C) were stirred and mixed with a tumbler, then melt-kneaded in a twin-screw vent extruder having a diameter of 30 mm (set temperature: 200° C.), and then pelletized to produce a resin composition (11). The obtained resin composition (11) was molded by an extruder (set temperature: 220° C.) equipped with a T-die to prepare a sheet sample (11) having a length of 127 mm, a width of 12.7 mm, and a thickness of 1 mm.

Example 12: Island of Production Example 9 (Pigment-Including PC Coarse Product) and Sea of Polyamide 20 parts by mass of the powder (9) obtained in Production Example 9 and 80 parts by mass of a polyamide resin (PEBAX (registered trademark) 4033SA01, manufactured by Arkema Co., Ltd.) as a resin (C) were stirred and mixed with a tumbler, then melt-kneaded in a twin-screw vent extruder having a diameter of 30 mm (set temperature: 200° C.), and then pelletized to produce a resin composition (12). The obtained resin composition (12) was molded by an extruder (set temperature: 220° C.) equipped with a T-die to prepare a sheet sample (12) having a length of 127 mm, a width of 12.7 mm, and a thickness of 1 mm.

Comparative Example 1: Island of Pigment and Sea of Polyamide 0.001 parts by mass of the near-infrared fluorescent material (pigment 1) obtained in Synthesis Example 1 and 99.995 parts by mass of a polyamide resin (PEBAX (registered trademark) 4033SA01, manufactured by Arkema Co., Ltd.) were stirred and mixed with a tumbler, then melt-kneaded in a twin-screw vent extruder having a diameter of 30 mm (set temperature: 200° C.), and then pelletized to produce a resin composition (c2). The obtained resin composition (c2) was molded by an extruder (set temperature: 220° C.) equipped with a T-die to prepare a sheet sample (c1) having a length of 127 mm, a width of 12.7 mm, and a thickness of 1 mm.

Comparative Example 2: Island of Pigment and Sea of Crosslinked Polyethylene 0.001 parts by mass of the near-infrared fluorescent material (pigment 1) obtained in Synthesis Example 1, 97.495 parts by mass of a polyethylene resin (Novatec (trademark) LL UJ580, manufactured by Japan Polyethylene Corporation), and 2.500 parts by mass of a crosslinking agent (PERHEXA (registered trademark) 25B-40, 2,5-dimethyl-2,5-di(t-butylperoxy)hexane, manufactured by NOF CORPORATION) were stirred and mixed with a tumbler, and then kneaded with a two-roll mill under a 125° C. environment to obtain a resin composition (c2). The obtained resin composition (c2) was heated and pressed at 200° C. for 2 minutes at 10 MPa to prepare a sheet sample (c2) having a length of 127 mm, a width of 12.7 mm, and a thickness of 1 mm.

Comparative Example 3: Island of Pigment and Sea of Epoxy Resin 0.001 parts by mass of the near-infrared fluorescent material (pigment 1) obtained in Synthesis Example 1 and 99.995 parts by mass of an epoxy resin composition (100 parts by mass of EPICLON (registered trademark) 850 manufactured by DIC CORPORATION and a curing agent (EPICLON (registered trademark) B-5001 manufactured by DIC CORPORATION)) were stirred and mixed with a stirrer, and then defoamed under reduced pressure to obtain a resin composition (c3). Next, the obtained resin composition (c3) was injected into a molding die, and then was heated and cured at 120° C. for 1 hour to prepare a sheet sample (c3) having a length of 127 mm, a width of 12.7 mm, and a thickness of 1 mm.

[Evaluation]

(Diameter of Dispersed Phase)

The average diameters of the dispersed phases of the obtained sheet samples (1) to (12) and the comparative sheet samples (c1) to (c3) were evaluated by the following method.

That is, each of the sheet samples (1) to (12) and the comparative sheet samples (c1) to (c3) was cut in a vertical direction from the surface thereof, the exposed cut surface was polished to be smooth, and then the cut surface was observed with a digital microscope (manufactured by KEYENCE CORPORATION: VHX-7000) to take an image. Next, at a magnification (200 times), arbitrary 50 dispersed phases (island portions of the sea-island structure) not overlapping each other were selected and measured as equivalent circle diameters, and the particle size distribution thereof was obtained. The average diameter was calculated as the number average.

(Light-Emitting Efficiency)

The light-emitting efficiencies of the obtained sheet samples (1) to (12) and the comparative sheet samples (c1) to (c3) were evaluated by the following method.

Camera: STC-MBCM200U3V-NIR, manufactured by SENTECH CO., LTD.

Light-source unit: A lamp with wavelengths of 720 to 850 nm was installed on an SPL-CC substrate manufactured by REVOX Co., Ltd. in a dark room.

The distance between the light source and the sheet sample was set to 20 cm, the sheet sample was placed horizontally, the sample was placed at a distance of 30 cm from the camera in a vertical position, and the image was captured by the camera (see FIG. 1). The obtained image was evaluated by processing in 256 stages from stage 0 to stage 255 using image processing software "Image". The case where no light was emitted was defined as stage 0, and the highest number of stages in the image was defined as the light-emitting efficiency of the sheet. The higher the number of stages, the higher the light-emitting efficiency.

The evaluation results are shown in Table 2 below. In the column of "Average diameter of dispersed phase" in Table 2 below, "Not confirmed" means that the dispersed phase was not confirmed.

TABLE 2

| | Seat sample No. | Average diameter of dispersed phase (μm) | Light-emitting efficiency (Number of stages) |
|---|---|---|---|
| Example 1 | (1) | 52 | 98 |
| Example 2 | (2) | 49 | 88 |
| Example 3 | (3) | 27 | 87 |
| Example 4 | (4) | 19 | 82 |
| Example 5 | (5) | 49 | 96 |
| Example 6 | (6) | 48 | 54 |
| Example 7 | (7) | 83 | 52 |

TABLE 2-continued

| | Seat sample No. | Average diameter of dispersed phase (μm) | Light-emitting efficiency (Number of stages) |
|---|---|---|---|
| Example 8 | (8) | 125 | 49 |
| Example 9 | (9) | 50 | 46 |
| Example 10 | (10) | 49 | 101 |
| Example 11 | (11) | 49 | 96 |
| Example 12 | (12) | 150 | 32 |
| Comparative Example 1 | (c1) | Not confirmed | 11 |
| Comparative Example 2 | (c2) | Not confirmed | 5 |
| Comparative Example 3 | (c3) | Not confirmed | 8 |

As is clear from Table 2 above, it was found that the resin compositions of Examples 1 to 12 exhibited excellent light-emitting efficiency as compared with the resin compositions of Comparative Examples 1 to 3.

REFERENCE SIGNS LIST

1: Camera
2: Analyzer
3: Light source unit
4: Sample (sheet sample)

The invention claimed is:

1. A resin composition, comprising: a near-infrared fluorescent material (A); a thermoplastic resin (B) other than a polyamide resin; and a resin (C) different from the thermoplastic resin (B), wherein the resin (C) forms a continuous phase, and a dispersed phase containing the near-infrared fluorescent material (A) and the thermoplastic resin (B) is formed in the continuous phase.

2. The resin composition according to claim 1, wherein the near-infrared fluorescent material (A) is at least one compound selected from the group consisting of compounds represented by the following General Formulas ($II_1$), ($II_2$), ($II_3$), and ($II_4$) and the resin composition has a maximum fluorescence wavelength of 650 nm or longer:

[Chem. 1]

($II_1$)

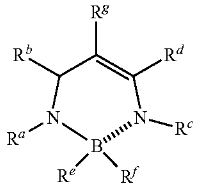

in Formula ($II_1$), $R^a$ and $R^b$ form an aromatic 5-membered ring, an aromatic 6-membered ring, or a condensed aromatic ring formed by condensation of two or three 5-membered rings or 6-membered rings together with the nitrogen atom to which $R^a$ is bonded and the carbon atom to which $R^b$ is bonded; $R^c$ and $R^d$ form an aromatic 5-membered ring, an aromatic 6-membered ring, or a condensed aromatic ring formed by condensation of two or three 5-membered rings or 6-membered rings together with the nitrogen atom to which $R^c$ is bonded and the carbon atom to which $R^d$ is bonded; each of $R^e$ and $R^f$ independently represents a halogen atom or an oxygen atom; and $R^g$ represents a hydrogen atom or an electron-withdrawing group; provided that, in a case where $R^e$ and $R^f$ are oxygen atoms, $R^e$, the boron atom bonded to $R^e$, $R^a$, and the nitrogen atom to which $R^a$ is bonded may together form a ring, and $R^f$, the boron atom bonded to $R^f$, $R^c$, and the nitrogen atom to which $R^c$ is bonded may together form a ring; in a case where $R^e$ is an oxygen atom and does not form a ring, $R^e$ is an oxygen atom having a substituent, and in a case where $R^f$ is an oxygen atom and does not form a ring, $R^f$ is an oxygen atom having a substituent;

[Chem. 2]

($II_2$)

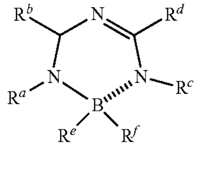

in Formula ($II_2$), each of $R^a$ to $R^f$ is the same as that in Formula ($II_1$);

[Chem. 3]

($II_3$)

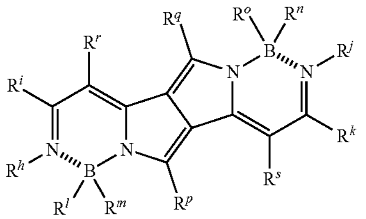

in Formula ($II_3$), $R^h$ and $R^i$ form an aromatic 5-membered ring, an aromatic 6-membered ring, or a condensed aromatic ring formed by condensation of two or three 5-membered rings or 6-membered rings together with the nitrogen atom to which $R^h$ is bonded and the carbon atom to which $R^i$ is bonded; $R^j$ and $R^k$ form an aromatic 5-membered ring, an aromatic 6-membered ring, or a condensed aromatic ring formed by condensation of two or three 5-membered rings or 6-membered rings together with the nitrogen atom to which $R^j$ is bonded and the carbon atom to which $R^k$ is bonded; each of $R^l$, $R^m$, $R^n$, and $R^o$ independently represents a halogen atom, a $C_{1-20}$ alkyl group, a $C_{1-20}$ alkoxy group, an aryl group, or a heteroaryl group; each of $R^p$ and $R^q$ independently represents a hydrogen atom, a halogen atom, a $C_{1-20}$ alkyl group, a $C_{1-20}$ alkoxy group, an aryl group, or a heteroaryl group; and each of $R^r$ and $R^s$ independently represents a hydrogen atom or an electron-withdrawing group;

[Chem. 4]

($II_4$)

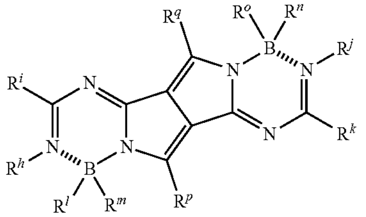

in Formula ($II_4$), each of $R^h$ to $R^q$ is the same as that in Formula ($II_3$).

3. The resin composition according to claim 2, wherein the near-infrared fluorescent material (A) contains at least one compound selected from the group consisting of compounds represented by any one of the following General Formulas ($II_3$-1) to ($II_3$-6) and compounds represented by any one of the following General Formulas ($II_4$-1) to ($II_4$-6):

[Chem. 5]

($II_3$-1)

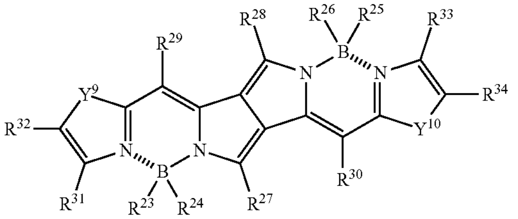

in Formula ($II_3$-1), each of $R^{23}$, $R^{24}$, $R^{25}$, and $R^{26}$ independently represents a halogen atom, a $C_{1-20}$ alkyl group, a $C_{1-20}$ alkoxy group, an aryl group, or a heteroaryl group; each of $R^{27}$ and $R^{28}$ independently represents a hydrogen atom, a halogen atom, a $C_{1-20}$ alkyl group, a $C_{1-20}$ alkoxy group, an aryl group, or a heteroaryl group; each of $R^{29}$ and $R^{30}$ independently represents a hydrogen atom or an electron-withdrawing group; each of $Y^9$ and $Y^{10}$ independently represents a sulfur atom, an oxygen atom, a nitrogen atom, or a phosphorus atom; (p4) each of $R^{31}$ and $R^{32}$ independently represents a hydrogen atom, a halogen atom, a $C_{1-20}$ alkyl group, a $C_{1-20}$ alkoxy group, an aryl group, or a heteroaryl group, or (p5) $R^{31}$ and $R^{32}$ together form an aromatic 5-membered ring which may have a substituent or an aromatic 6-membered ring which may have a substituent; and (q4) each of $R^{33}$ and $R^{34}$ independently represents a hydrogen atom, a halogen atom, a $C_{1-20}$ alkyl group, a $C_{1-20}$ alkoxy group, an aryl group, or a heteroaryl group, or (q5) $R^{33}$ and $R^{34}$ together form an aromatic 5-membered ring which may have a substituent or an aromatic 6-membered ring which may have a substituent;

[Chem. 6]

($II_3$-2)

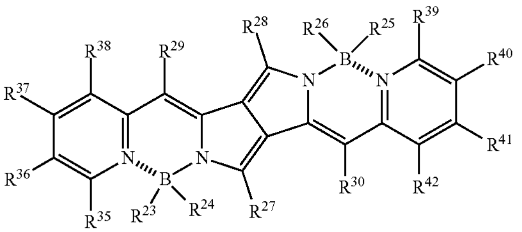

($II_3$-3)

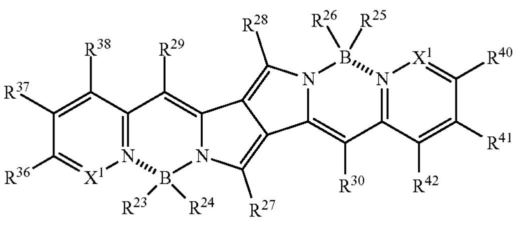

-continued ($II_3$-4)

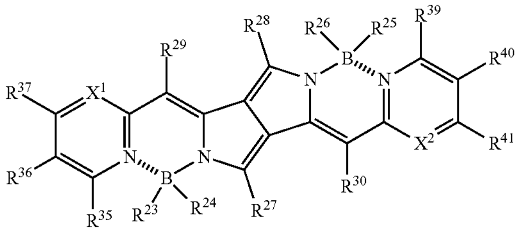

($II_3$-5)

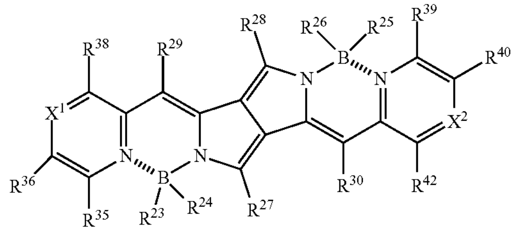

($II_3$-6)

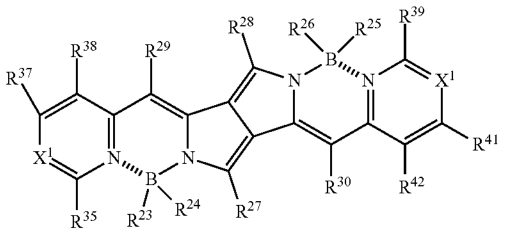

in Formulas ($II_3$-2) to ($II_3$-6), each of $R^{23}$ to $R^{30}$ is the same as that in Formula ($II_3$-1); each of $X^1$ and $X^2$ independently represents a nitrogen atom or a phosphorus atom; (p6) each of $R^{35}$, $R^{36}$, $R^{37}$, and $R^{38}$ independently represents a hydrogen atom, a halogen atom, a $C_{1-20}$ alkyl group, a $C_{1-20}$ alkoxy group, an aryl group, or a heteroaryl group, or (p7) $R^{35}$ and $R^{36}$ together form an aromatic 5-membered ring which may have a substituent or an aromatic 6-membered ring which may have a substituent, and each of $R^{37}$ and $R^{38}$ independently represents a hydrogen atom, a halogen atom, a $C_{1-20}$ alkyl group, a $C_{1-20}$ alkoxy group, an aryl group, or a heteroaryl group, or (p8) $R^{36}$ and $R^{37}$ together form an aromatic 5-membered ring which may have a substituent or an aromatic 6-membered ring which may have a substituent, and each of $R^{35}$ and $R^{38}$ independently represents a hydrogen atom, a halogen atom, a $C_{1-20}$ alkyl group, a $C_{1-20}$ alkoxy group, an aryl group, or a heteroaryl group, or (p9) $R^{37}$ and $R^{38}$ together form an aromatic 5-membered ring which may have a substituent or an aromatic 6-membered ring which may have a substituent, and each of $R^{35}$ and $R^{36}$ independently represents a hydrogen atom, a halogen atom, a $C_{1-20}$ alkyl group, a $C_{1-20}$ alkoxy group, an aryl group, or a heteroaryl group; and (q6) each of $R^{39}$, $R^{40}$, $R^{41}$, and $R^{42}$ independently represents a hydrogen atom, a halogen atom, a $C_{1-20}$ alkyl group, a $C_{1-20}$ alkoxy group, an aryl group, or a heteroaryl group, or (q7) $R^{39}$ and $R^{40}$ together form an aromatic 5-membered ring which may have a substituent or an aromatic 6-membered ring which may have a substituent, and each of $R^{41}$ and $R^{42}$ independently represents a hydrogen atom, a halogen atom, a $C_{1-20}$ alkyl group, a $C_{1-20}$ alkoxy group, an aryl group, or a heteroaryl group, or (q8) $R^{40}$ and $R^{41}$ together form an aromatic 5-membered ring which may have a substituent or an aromatic 6-membered ring which may have a substituent, and each of $R^{39}$ and $R^{42}$ independently represents a hydrogen atom, a halogen atom, a $C_{1-20}$ alkyl group, a $C_{1-20}$ alkoxy group, an aryl group, or a heteroaryl group, or (q9) $R^{41}$ and $R^{42}$ together form an aromatic 5-membered ring which may have a substituent or an aromatic 6-membered ring which may have a substituent, and each of $R^{39}$ and $R^{40}$ independently represents a hydrogen atom, a halogen atom, a $C_{1-20}$ alkyl group, a $C_{1-20}$ alkoxy group, an aryl group, or a heteroaryl group;

[Chem. 7]

($II_4$-1)

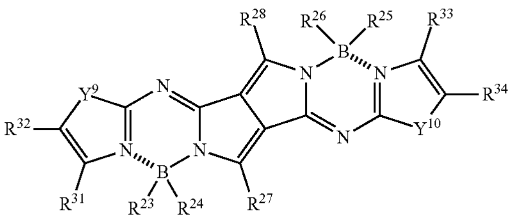

($II_4$-2)

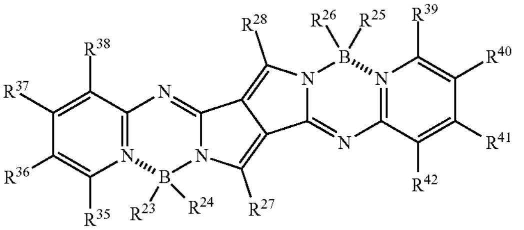

($II_4$-3)

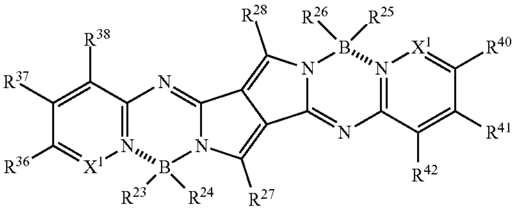

($II_4$-4)

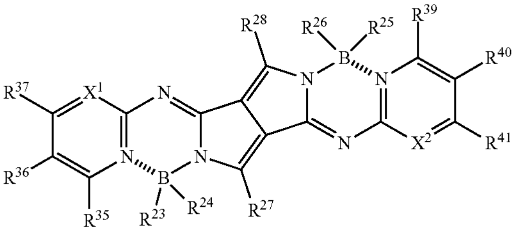

($II_4$-5)

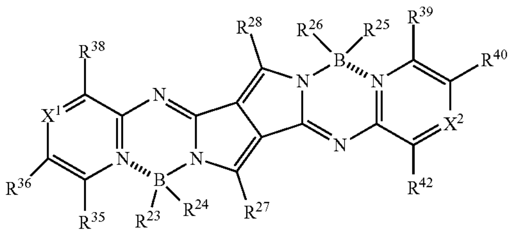

-continued ($II_4$-6)

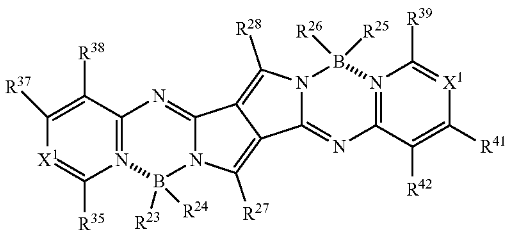

in Formulas ($II_4$-1) to ($II_4$-6), each of $R^{23}$ to $R^{28}$ is the same as that in Formula ($II_3$-1), and in Formula ($II_4$-1), each of $R^{31}$ to $R^{34}$, $Y^9$, and $Y^{10}$ is the same as that in Formula ($II_3$-1), in Formulas ($II_4$-2) to ($II_4$-6), each of $R^{35}$ to $R^{42}$ is the same as that in Formula ($II_3$-2), and in Formulas ($II_4$-3) to ($II_4$-6), each of $X^1$ and $X^2$ is the same as that in Formula ($II_3$-3).

4. The resin composition according to claim 3, wherein the near-infrared fluorescent material (A) contains at least one compound selected from the group consisting of compounds represented by any one of the following General Formulas ($II_3$-7) to ($II_3$-9) and ($II_4$-7) to ($II_4$-9):

[Chem. 8]

($II_3$-7)

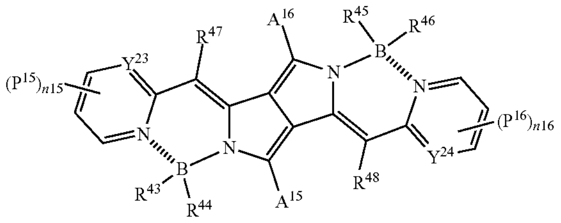

($II_3$-8)

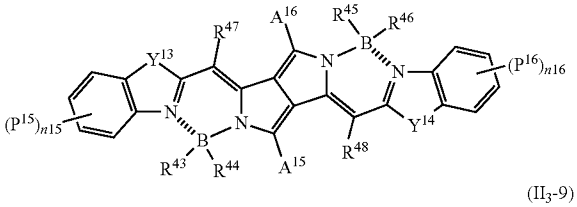

($II_3$-9)

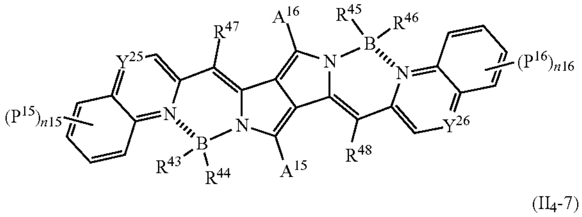

($II_4$-7)

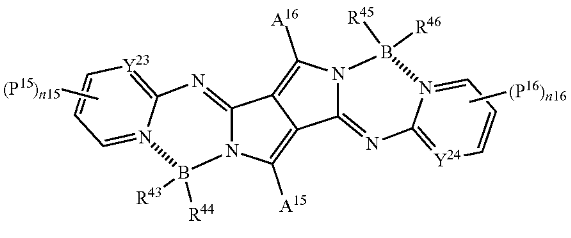

-continued (II4-8)

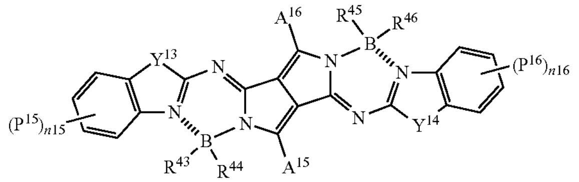

(II4-9)

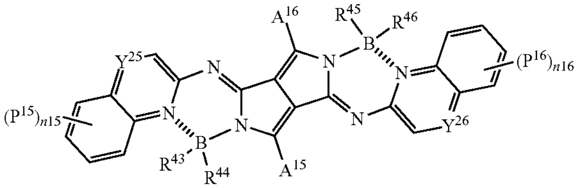

in the formulas, each of $Y^{23}$ and $Y^{24}$ independently represents a carbon atom or a nitrogen atom; each of $Y^{13}$ and $Y^{14}$ independently represents an oxygen atom or a sulfur atom; each of $Y^{25}$ and $Y^{26}$ independently represents a carbon atom or a nitrogen atom; each of $R^{47}$ and $R^{48}$ independently represents a hydrogen atom or an electron-withdrawing group; each of $R^{43}$, $R^{44}$, $R^{45}$, and $R^{46}$ independently represents a halogen atom or an aryl group which may have a substituent; each of $P^{15}$ and $P^{16}$ independently represents a halogen atom, a $C_{1-20}$ alkyl group, a $C_{1-20}$ alkoxy group, an amino group, a monoalkylamino group, or a dialkylamino group; each of n15 and n16 independently represents an integer of 0 to 3; and each of $A^{15}$ and $A^{16}$ independently represents a phenyl group which may have one to three substituents selected from the group consisting of a hydrogen atom, a halogen atom, a $C_{1-20}$ alkyl group, a $C_{1-20}$ alkoxy group, an amino group, a monoalkylamino group, and a dialkylamino group.

5. The resin composition according to claim 1, wherein a content of the near-infrared fluorescent material (A) with respect to a total of 100% by mass of the near-infrared fluorescent material (A) and the thermoplastic resin (B) other than the polyamide resin is 0.001% by mass or more and 0.5% by mass or less.

6. The resin composition according to claim 1, wherein the thermoplastic resin (B) other than the polyamide resin includes at least one selected from the group consisting of a thermoplastic polyurethane (TPU) resin, a polycarbonate (PC) resin, a vinyl chloride resin, an acrylic resin, a polyester resin, a polystyrene resin, an olefin resin, and a polyacetal (POM) resin.

7. The resin composition according to claim 1, wherein the resin (C) includes at least one selected from the group consisting of a polyamide resin, a polyethylene resin, a polypropylene resin, a thermosetting resin, and a crosslinked polyethylene resin.

8. The resin composition according to claim 7, wherein the resin (C) includes a polyamide resin.

9. The resin composition according to claim 7, wherein the resin (C) includes a thermosetting resin.

10. The resin composition according to claim 1, wherein a total content of the near-infrared fluorescent material (A) and the thermoplastic resin (B) is 5% by mass or more and 60% by mass or less with respect to a total of 100% by mass of the near-infrared fluorescent material (A), the thermoplastic resin (B), and the resin (C).

11. A medical material comprising the resin composition according to claim 1.

12. A molded object obtained from the resin composition according to claim 1.

13. The molded object according to claim 12, wherein at least a part of the molded object is a medical tool used in a body of a patient.

14. The resin composition according to claim 2, wherein a content of the near-infrared fluorescent material (A) with respect to a total of 100% by mass of the near-infrared fluorescent material (A) and the thermoplastic resin (B) other than the polyamide resin is 0.001% by mass or more and 0.5% by mass or less.

15. The resin composition according to claim 3, wherein a content of the near-infrared fluorescent material (A) with respect to a total of 100% by mass of the near-infrared fluorescent material (A) and the thermoplastic resin (B) other than the polyamide resin is 0.001% by mass or more and 0.5% by mass or less.

16. The resin composition according to claim 2, wherein the thermoplastic resin (B) other than the polyamide resin includes at least one selected from the group consisting of a thermoplastic polyurethane (TPU) resin, a polycarbonate (PC) resin, a vinyl chloride resin, an acrylic resin, a polyester resin, a polystyrene resin, an olefin resin, and a polyacetal (POM) resin.

17. The resin composition according to claim 2, wherein the resin (C) includes at least one selected from the group consisting of a polyamide resin, a polyethylene resin, a polypropylene resin, a thermosetting resin, and a crosslinked polyethylene resin.

18. The resin composition according to claim 2, wherein a total content of the near-infrared fluorescent material (A) and the thermoplastic resin (B) is 5% by mass or more and 60% by mass or less with respect to a total of 100% by mass of the near-infrared fluorescent material (A), the thermoplastic resin (B), and the resin (C).

19. A medical material comprising the resin composition according to claim 2.

20. A molded object obtained from the resin composition according to claim 2.

* * * * *